(12) United States Patent
Kusumoto et al.

(10) Patent No.: US 12,157,218 B2
(45) Date of Patent: Dec. 3, 2024

(54) POWER TOOL

(71) Applicant: MAKITA CORPORATION, Anjo (JP)

(72) Inventors: Kihiro Kusumoto, Anjo (JP); Kenji Abe, Anjo (JP)

(73) Assignee: MAKITA CORPORATION, Anjo (JP)

(*) Notice: Subject to any disclaimer, the term of this patent is extended or adjusted under 35 U.S.C. 154(b) by 0 days.

(21) Appl. No.: 18/233,483

(22) Filed: Aug. 14, 2023

(65) Prior Publication Data

US 2023/0381942 A1    Nov. 30, 2023

Related U.S. Application Data

(63) Continuation of application No. 17/144,207, filed on Jan. 8, 2021, now Pat. No. 11,738,441.

(30) Foreign Application Priority Data

Mar. 10, 2020    (JP) .................... 2020-041327

(51) Int. Cl.
*B25F 5/00*    (2006.01)
*B25F 5/02*    (2006.01)

(52) U.S. Cl.
CPC .............. *B25F 5/008* (2013.01); *B25F 5/001* (2013.01); *B25F 5/02* (2013.01)

(58) Field of Classification Search
CPC ............. B25F 5/008; B25F 5/001; B25F 5/02
See application file for complete search history.

(56) References Cited

U.S. PATENT DOCUMENTS

| | | |
|---|---|---|
| 2005/0257945 A1 | 11/2005 | Justis et al. |
| 2009/0126964 A1 | 5/2009 | Schroeder et al. |
| 2014/0131059 A1 | 5/2014 | Verbrugge et al. |
| 2019/0240825 A1 | 8/2019 | Herr et al. |

FOREIGN PATENT DOCUMENTS

| | | |
|---|---|---|
| JP | 2005-329537 A | 12/2005 |
| JP | 2019-155548 A | 9/2019 |

OTHER PUBLICATIONS

"Service Parts List" for catalog No. 2804-20 (Year: 2018).
Wayback Machine Printout for Website Milwaukee 2867-20—"https://www.milwaukeetool.com/Products/Power-Tools/Fastening/Impact-Wrenches/2867-20" (Year: 2020).
Apr. 14, 2023 Office Action issued in Chinese Patent Application No. 202110153599.2.
Sep. 26, 2023 Office Action issued in Japanese Patent Application No. 2020-041327.

*Primary Examiner* — Daniel Jeremy Leeds
(74) *Attorney, Agent, or Firm* — Oliff PLC

(57) ABSTRACT

A power tool includes a motor including a stator and a rotor rotatable relative to the stator about a rotation axis, a gear drivable in response to rotation of the rotor, a motor compartment accommodating the motor, a rear cover covering a rear opening in the motor compartment, a gear case accommodating the gear and covering a front opening in the motor compartment, a first screw fastening the rear cover and the motor compartment together, and a second screw fastening the motor compartment and the gear case together, and at a different position from the first screw in a plane orthogonal to the rotation axis.

20 Claims, 33 Drawing Sheets

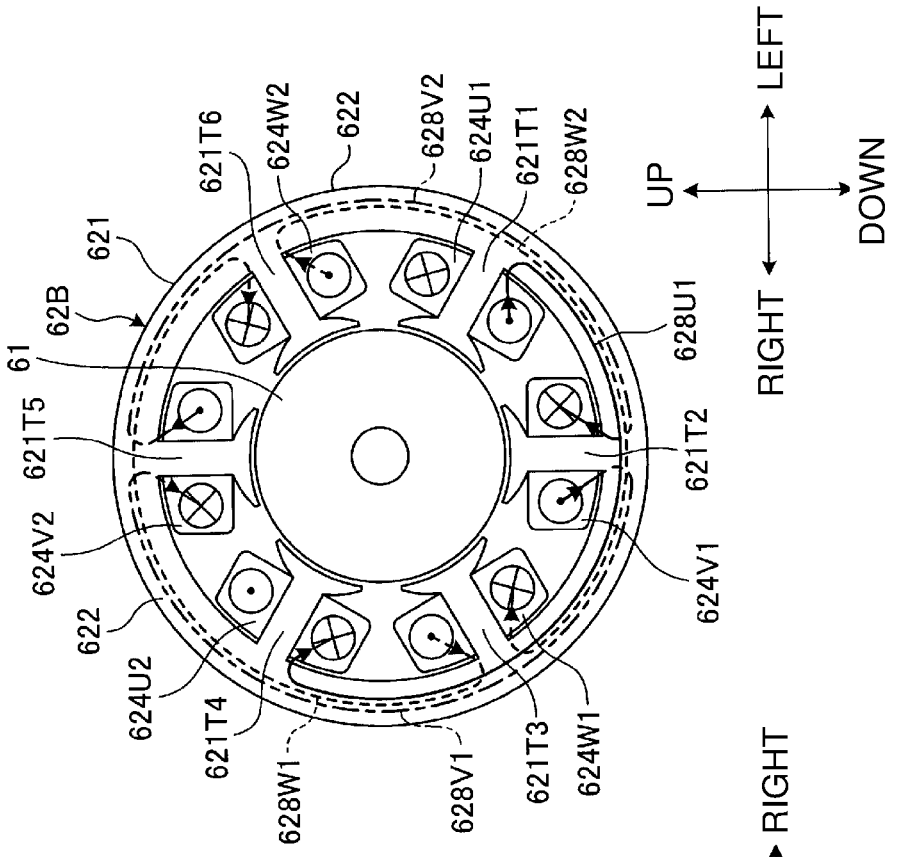
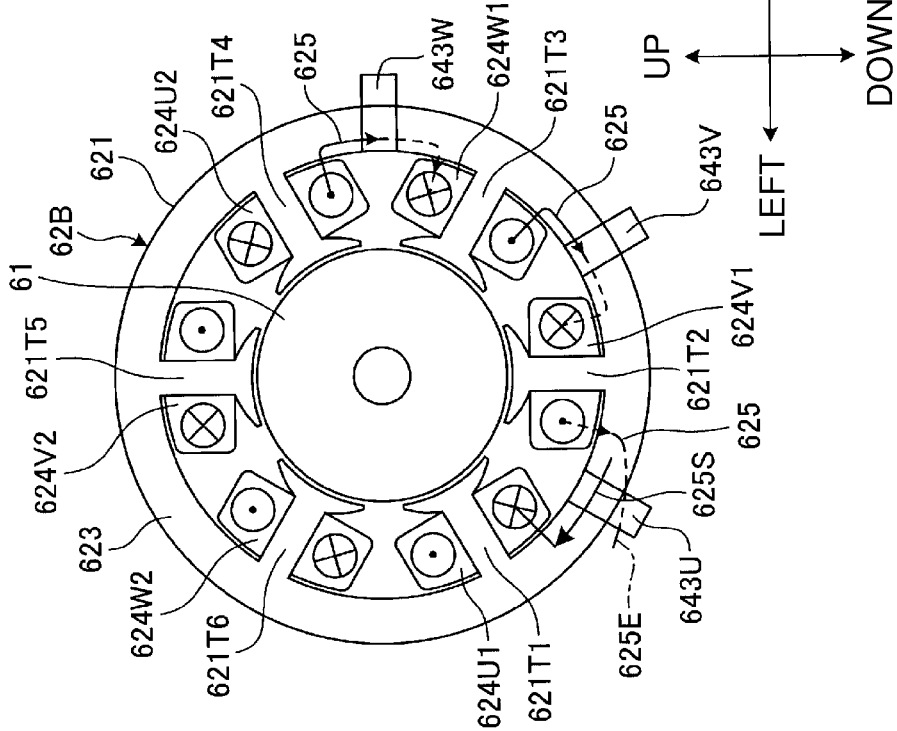

POWER TOOL

CROSS-REFERENCE TO RELATED APPLICATIONS

This application is a continuation of U.S. application Ser. No. 17/144,207 filed Jan. 8, 2021, which claims the benefit of priority to Japanese Patent Application No. 2020-041327, filed on Mar. 10, 2020, the entire contents of which are hereby incorporated by reference.

BACKGROUND

1. Technical Field

The present disclosure relates to a power tool.

2. Description of the Background

In the technical field of power tools, a power tool is known as described in Japanese Unexamined Patent Application Publication No. 2019-155548.

BRIEF SUMMARY

A power tool includes an enclosure including multiple parts assembled together. Such parts cannot be assembled smoothly depending on the structure of the enclosure. The power tool can also be larger depending on the structure of the enclosure.

One or more aspects of the present disclosure are directed to a power tool including an enclosure that can be assembled smoothly while reducing the likelihood of the power tool being upsized.

A first aspect of the present disclosure provides a power tool, including:
  a motor including a stator and a rotor rotatable relative to the stator about a rotation axis;
  a gear drivable in response to rotation of the rotor;
  a motor compartment accommodating the motor;
  a rear cover covering a rear opening in the motor compartment;
  a gear case accommodating the gear and covering a front opening in the motor compartment;
  a first screw fastening the rear cover and the motor compartment together; and
  a second screw fastening the motor compartment and the gear case together, the second screw being at a different position from the first screw in a plane orthogonal to the rotation axis.

A second aspect of the present disclosure provides a power tool, including:
  a motor including a stator and a rotor rotatable relative to the stator about a rotation axis;
  a motor compartment accommodating the motor;
  a rear cover covering a rear opening in the motor compartment; and
  four first screws fastening the rear cover and the motor compartment together, the four first screws surrounding the rotation axis.

A third aspect of the present disclosure provides a power tool, including:
  a motor including a stator and a rotor rotatable relative to the stator about a rotation axis;
  a gear drivable in response to rotation of the rotor;
  a motor compartment accommodating the motor;
  a rear cover covering a rear opening in the motor compartment,
  a gear case accommodating the gear and covering a front opening in the motor compartment;
  a first screw fastening the rear cover and the motor compartment together, the first screw being screwed from a rear; and
  a second screw fastening the motor compartment and the gear case together, the second screw being screwed from the rear.

The power tool according to the above aspects of the present disclosure includes the enclosure that can be assembled smoothly while reducing the likelihood of the power tool being upsized.

BRIEF DESCRIPTION OF DRAWINGS

FIGS. 26A and 26B are schematic diagrams of a stator in the first modification.

DETAILED DESCRIPTION

Although one or more embodiments of the present disclosure will now be described with reference to the drawings, the present disclosure is not limited to the present embodiments. The components in the embodiments described below may be combined as appropriate. One or more components may be eliminated.

In the embodiments, the positional relationships between the components will be described using the directional terms such as right and left (or lateral), front and rear (or forward and backward), and up and down (or vertical). The terms indicate relative positions or directions with respect to the center of a power tool 1. The lateral direction, the front-rear direction, and the vertical direction are orthogonal to one another.

The power tool 1 includes a motor 6. In the embodiments, a direction parallel to a rotation axis AX of the motor 6 is referred to as an axial direction for convenience. A direction about the rotation axis AX is referred to as a circumferential direction or circumferentially, or a rotation direction for convenience. A direction radial from the rotation axis AX is referred to as a radial direction or radially for convenience.

In the embodiments, the rotation axis AX extends in a front-rear direction. The axial direction corresponds to the front-rear direction. The axial direction is from the front to the rear or from the rear to the front.

A position nearer the rotation axis AX in the radial direction, or a radial direction toward the rotation axis AX, is referred to as radially inside or radially inward for convenience. A position farther from the rotation axis AX in the radial direction, or a radial direction away from the rotation axis AX, is referred to as radially outside or radially outward for convenience.

Overview of Power Tool

Figure 1:
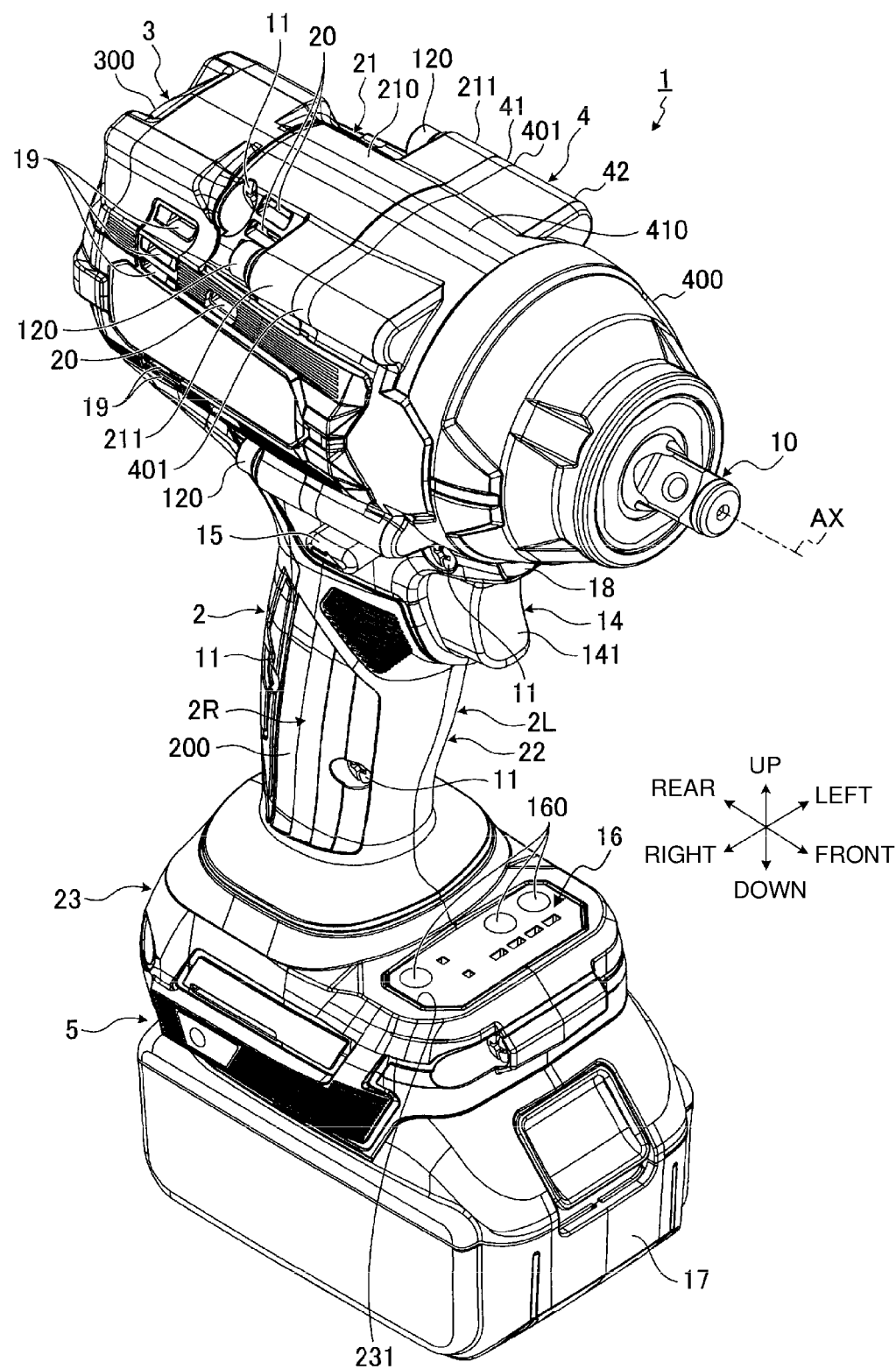
FIG. 1 is a front perspective view of a power tool according to an embodiment.
Figure 2:
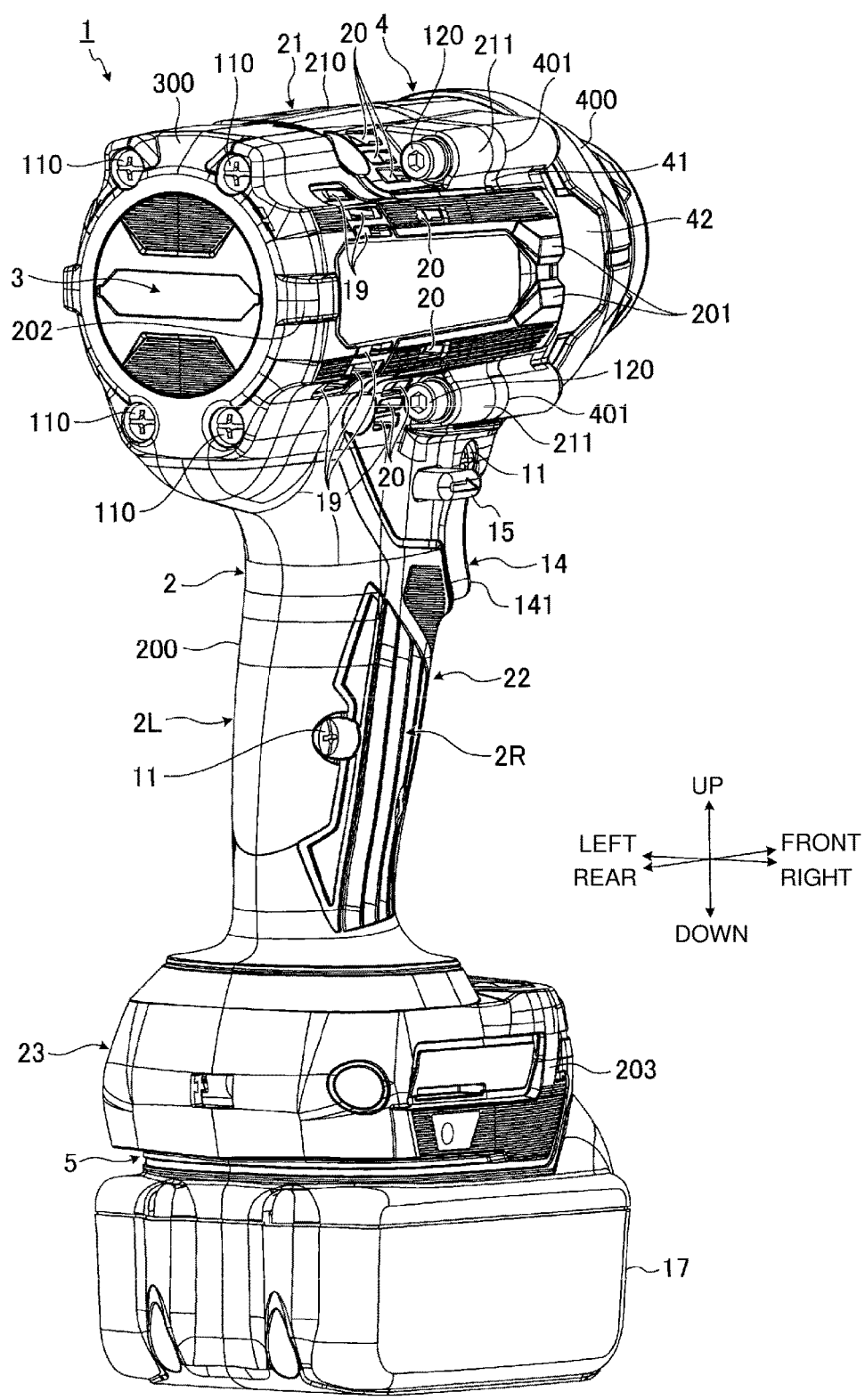
FIG. 2 is a rear perspective view of the power tool according to the embodiment.
Figure 3:
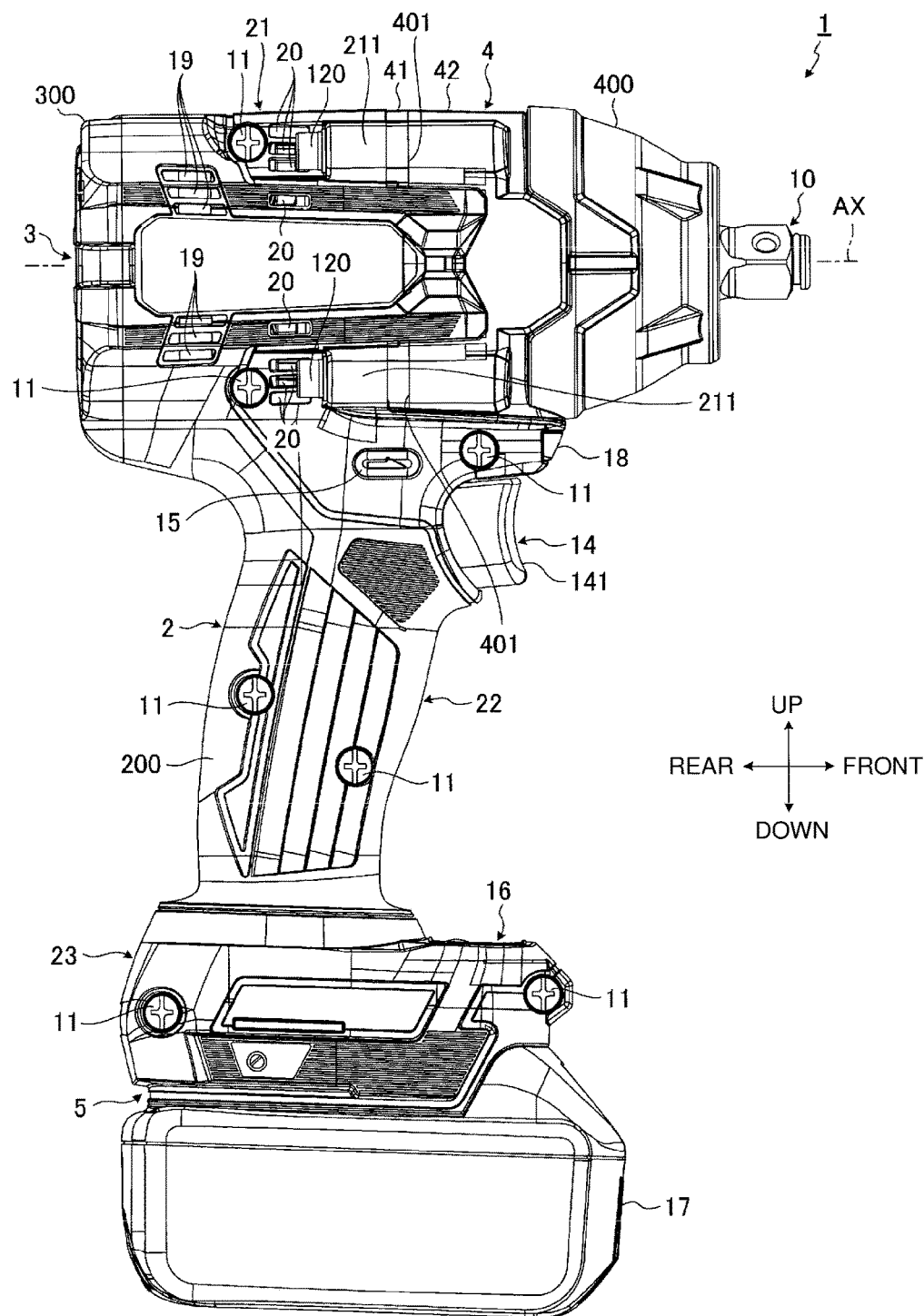
FIG. 3 is a side view of the power tool according to the embodiment.
Figure 4:
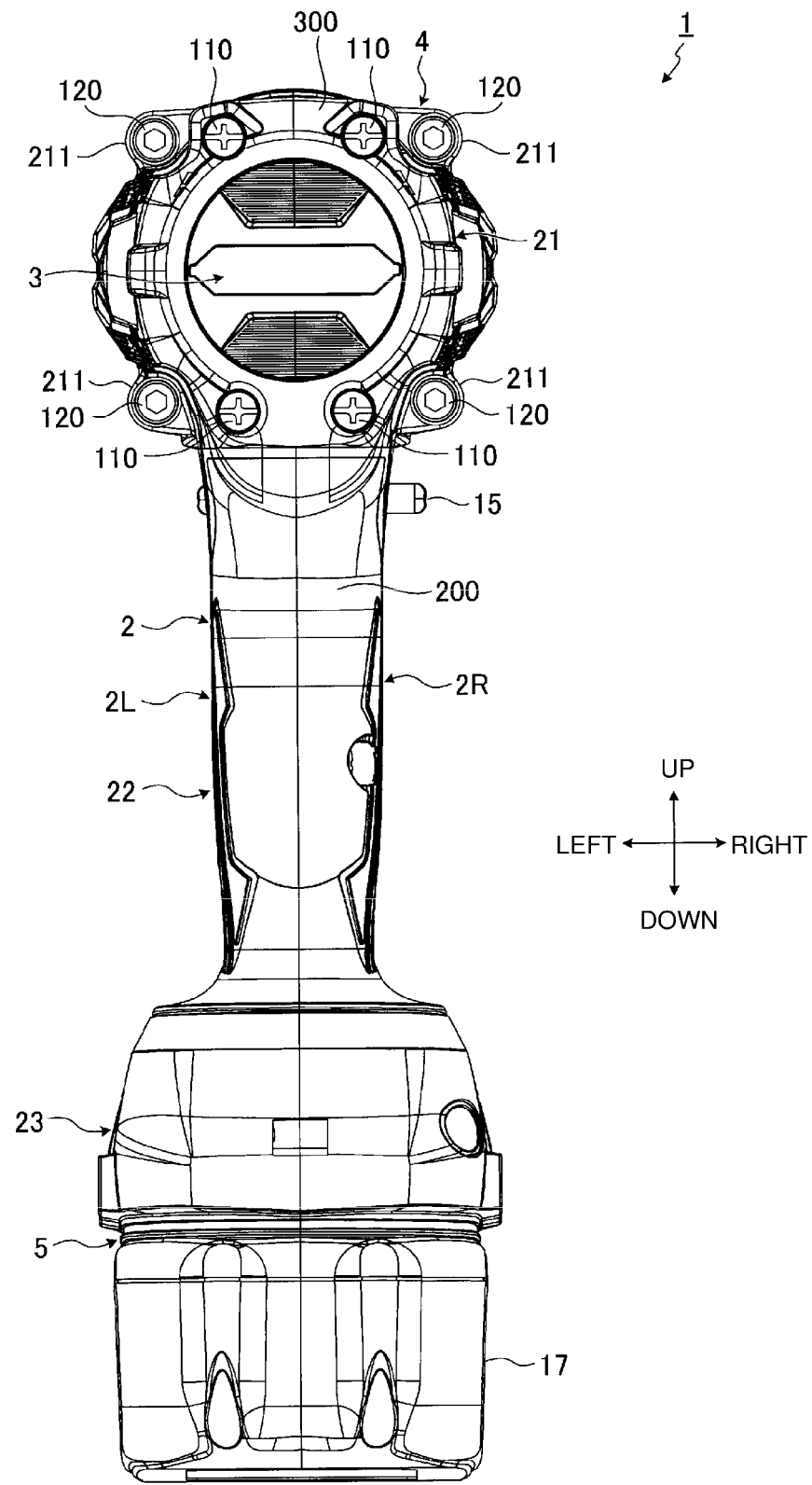
FIG. 4 is a rear view of the power tool according to the embodiment.
Figure 5:
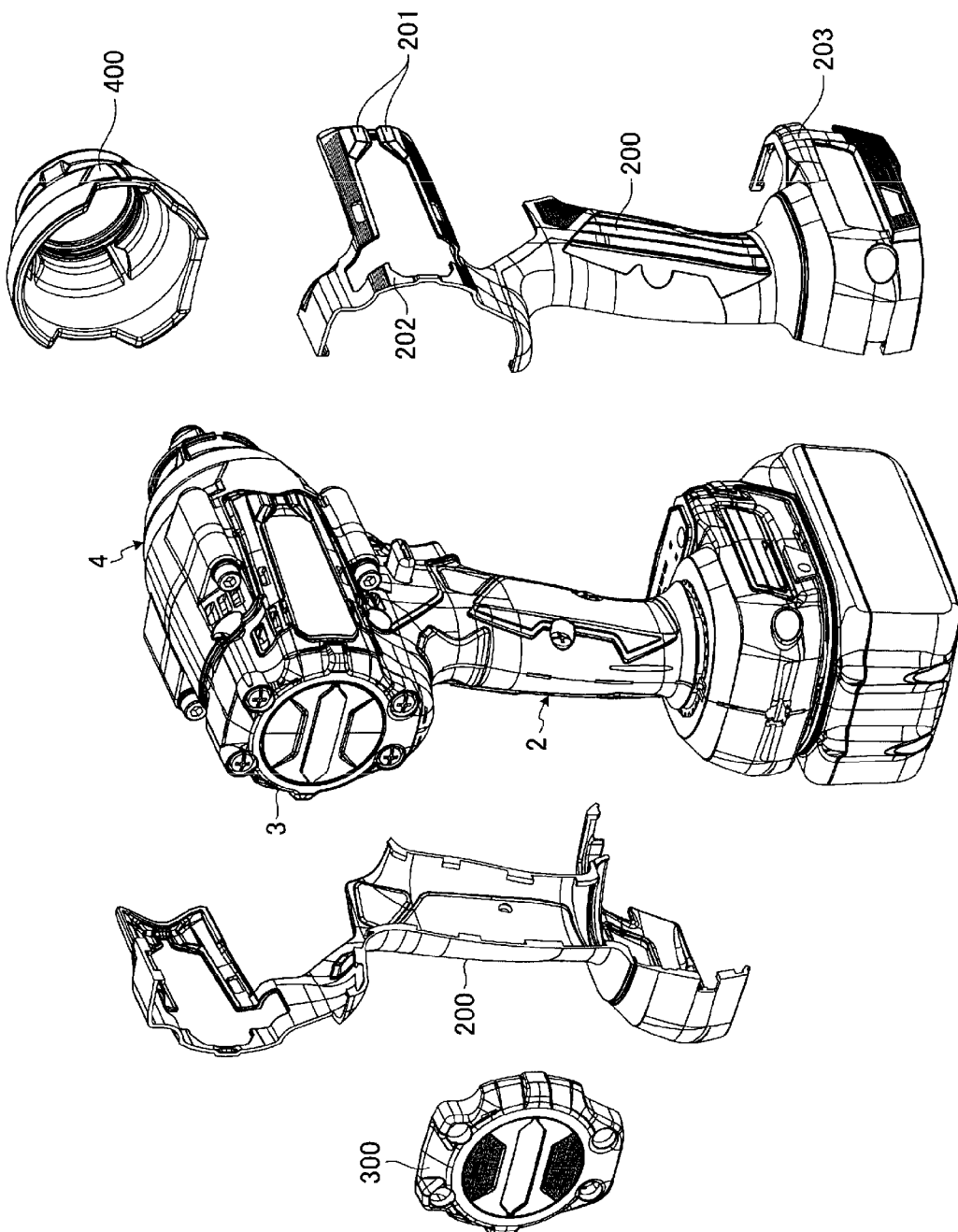
FIG. 5 is a view of covers in the embodiment.
Figure 6:
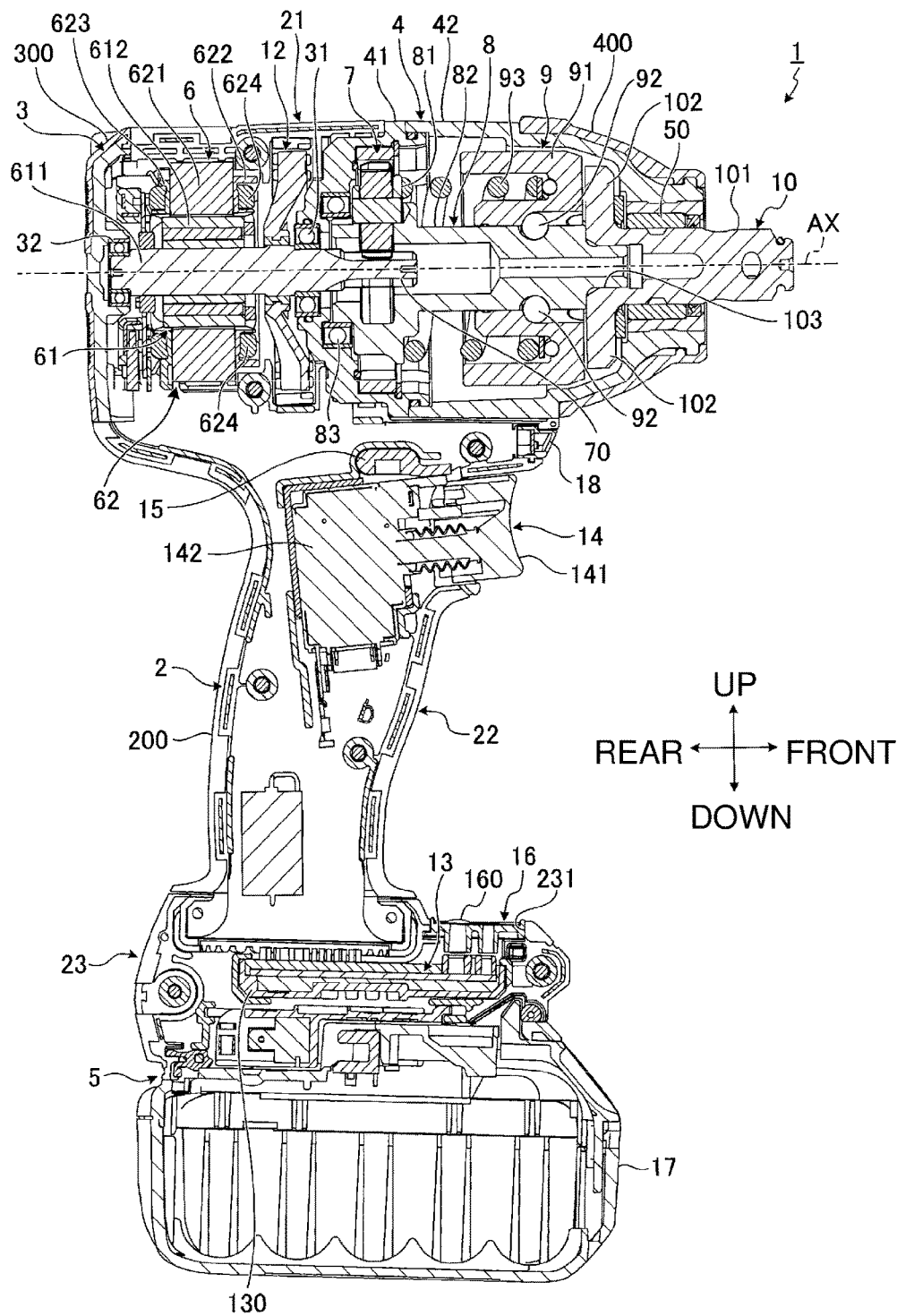
FIG. 6 is a longitudinal sectional view of the power tool according to the embodiment.

FIG. 1 is a front perspective view of the power tool 1 according to an embodiment. FIG. 2 is a rear perspective view of the power tool 1. FIG. 3 is a side view of the power tool 1. FIG. 4 is a rear view of the power tool 1. FIG. 5 is a view of covers 200, 300, and 400. FIG. 6 is a longitudinal sectional view of the power tool 1. In the embodiment, the power tool 1 is an impact wrench that is an impact tool.

As shown in FIGS. 1 to 6, the power tool 1 includes a housing 2, a rear cover 3, a gear case 4, a battery mount 5, the motor 6, a reduction mechanism 7, a spindle 8, a impact mechanism 9, an anvil 10, a fan 12, a controller 13, a trigger switch 14, a forward-reverse switch lever 15, an operation panel 16, and a lamp 18.

The housing 2 is formed from a synthetic resin. The housing 2 is formed from, for example, a nylon resin. The housing 2 includes a left housing 2L and a right housing 2R assembled together. The left housing 2L and the right housing 2R form a pair of housing halves. The right housing 2R is located on the right of the left housing 2L. The left and right housings 2L and 2R are fastened together with multiple screws 11. The center axis of each screw 11 extends laterally.

The housing 2 has a surface at least partially covered with the cover 200. The cover 200 is formed from an elastic material more flexible than the material for the housing 2. The cover 200 is formed from, for example, a thermoplastic elastomer. The cover 200 is integral with the housing 2.

The housing 2 includes a motor compartment 21, a grip 22, and a controller compartment 23. The grip 22 connects to a lower portion of the motor compartment 21. The controller compartment 23 is located below the grip 22.

The motor compartment 21 accommodates the motor 6. The motor compartment 21 is cylindrical. The motor compartment 21 has a front portion located to cover at least apart of the gear case 4.

The grip 22 is gripped by an operator. The grip 22 protrudes downward from the motor compartment 21.

The controller compartment 23 accommodates the controller 13. The controller compartment 23 connects to a lower end of the grip 22. The controller compartment 23 has larger outer dimensions than the grip 22 in the front-rear and lateral directions.

As shown in FIGS. 2 and 5, the cover 200 has first protrusions 201 and second protrusions 202. The first protrusions 201 and the second protrusions 202 protrude laterally from a portion of the cover 200 covering the motor compartment 21. The first protrusions 201 are located frontward from the second protrusions 202.

The cover 200 also has third protrusions 203. The third protrusions 203 protrude laterally from a portion of the cover 200 covering the controller compartment 23.

When the power tool 1 is laid on its side on a placement surface, such as the top surface of a table, the first to third protrusions 201 to 203 come in contact with the placement surface. Having the first to third protrusions 201 to 203 formed from a thermoplastic elastomer, the power tool 1 is less slippery on the placement surface. The first to third protrusions 201 to 203 also reduce the area of contact between the housing 2 or the gear case 4 and the placement surface. This reduces damage on the housing 2 and the gear case 4.

The rear cover 3 connects to a rear portion of the motor compartment 21. The rear cover 3 covers a rear opening in the motor compartment 21. The rear cover 3 is formed from a synthetic resin. The rear cover 3 is fastened to the motor compartment 21 with first screws 110. A center axis CX1 of each first screw 110 extends in the front-rear direction.

The rear cover 3 has a surface at least partially covered with the cover 300. The cover 300 is formed from an elastic material more flexible than the material for the rear cover 3. The cover 300 is formed from, for example, a thermoplastic elastomer. The cover 300 is integral with the rear cover 3.

The motor compartment 21 has inlets 19 and outlets 20. The inlets 19 are located rearward from the outlets 20. Air outside the housing 2 flows into the internal space of the housing 2 through the inlets 19. Air flowing into the internal space of the housing 2 comes in contact with at least a portion of the motor 6 and cools the motor 6. The air then flows out of the housing 2 through the outlets 20.

The gear case 4 accommodates the reduction mechanism 7 including gears, the spindle 8, the impact mechanism 9, and at least a part of the anvil 10. The gear case 4 is formed from a metal. The gear case 4 is formed from, for example, aluminum.

The gear case 4 connects to the front portion of the motor compartment 21. The gear case 4 has a rear portion in the motor compartment 21. The gear case 4 covers a front opening in the motor compartment 21. The gear case 4 is at least partially covered with the motor compartment 21. The gear case 4 is located at least partially frontward from the motor compartment 21. The gear case 4 is fastened to the motor compartment 21 with second screws 120. A center axis CX2 of each second screw 120 extends in the front-rear direction.

The gear case 4 includes a bearing holder 41 and a hammer case 42 assembled together. The hammer case 42 has a surface at least partially covered with the cover 400. The cover 400 is formed from an elastic material more flexible than the material for the gear case 4. The cover 400 is formed from, for example, rubber. The cover 400 is molded separately from the gear case 4 and is then fastened to the gear case 4.

The bearing holder 41 is located at least partially frontward from the motor compartment 21. The bearing holder 41 connects to the front portion of the motor compartment 21. The bearing holder 41 is annular and accommodates the reduction mechanism 7 and at least a part of the spindle 8.

The hammer case 42 is located at least partially frontward from the bearing holder 41. The hammer case 42 connects to a front portion of the bearing holder 41. The hammer case 42 is cylindrical. The hammer case 42 has a smaller inner diameter in its front portion than in its rear portion. The hammer case 42 accommodates at least a part of the spindle 8, the impact mechanism 9, and at least a part of the anvil 10.

The housing 2, the rear cover 3, and the gear case 4 are the parts of the enclosure of the power tool 1. The housing 2, the rear cover 3, and the gear case 4 are assembled into the enclosure of the power tool 1. The rear cover 3 and the motor compartment 21 in the housing 2 are fastened together with the first screws 110. The motor compartment 21 in the housing 2 and the gear case 4 are fastened together with the second screws 120.

The battery mount 5 is located below the controller compartment 23. A battery pack 17 is attached to the battery mount 5. The battery pack 17 is detachable from the battery mount 5. The battery pack 17 may be a secondary battery. The battery pack 17 in the embodiment may be a rechargeable lithium-ion battery. The battery pack 17 is attached to the battery mount 5 to power the power tool 1. The motor 6 is driven by power supplied from the battery pack 17. The controller 13 operates on power supplied from the battery pack 17.

The motor 6 is a power source for the power tool 1. The motor 6 is a brushless inner-rotor motor. The motor 6 includes a rotor 61 and a stator 62. The rotor 61 rotates about the rotation axis AX. The stator 62 surrounds the rotor 61. The rotor 61 is rotatable relative to the stator 62.

The rotor 61 includes a rotor shaft 611 and a rotor core 612. The rotor shaft 611 extends in the front-rear direction. The rotor core 612 surrounds the rotor shaft 611. The rotor core 612 is fixed to the rotor shaft 611.

The stator 62 includes a stator core 621, a front insulator 622, a rear insulator 623, and multiple coils 624. The front insulator 622 is located on the front of the stator core 621. The rear insulator 623 is located on the rear of the stator core 621. The coils 624 are wound around the stator core 621 with the front insulator 622 and the rear insulator 623 between them. The front insulator 622 and the rear insulator 623 may be integral with each other.

The rotor shaft 611 is rotatably supported by a front bearing 31 and a rear bearing 32. The front bearing 31 rotatably supports a front portion of the rotor shaft 611. The rear bearing 32 rotatably supports a rear portion of the rotor shaft 611. The front bearing 31 is held by the bearing holder 41. The rear bearing 32 is held by the rear cover 3. The rotor shaft 611 has its front end placed in the internal space of the hammer case 42 through an opening in the bearing holder 41.

A pinion gear 70 is located at the front end of the rotor shaft 611. The rotor shaft 611 connects to the reduction mechanism 7 via the pinion gear 70.

The reduction mechanism 7 rotates the spindle 8 at a lower rotational speed than the rotor shaft 611. The reduction mechanism 7 is located frontward from the motor 6. The reduction mechanism 7 includes a planetary gear assembly including multiple gears. The reduction mechanism 7 connects the rotor shaft 611 and the spindle 8 together. The reduction mechanism 7 transmits a rotational force generated by the motor 6 to the spindle 8. The rotor 61 rotates to drive the gears in the reduction mechanism 7.

The spindle 8 rotates with the rotational force transmitted from the motor 6 through the reduction mechanism 7. The spindle 8 rotates about the rotation axis AX. The spindle 8 is located frontward from the motor 6. The spindle 8 is located at least partially frontward from the reduction mechanism 7. The spindle 8 is rotatably supported by a rear bearing 83. The rear bearing 83 is held by the bearing holder 41. The rear bearing 83 supports the rear end of the spindle 8. The spindle 8 includes a flange 81 and a rod 82. The rod 82 protrudes frontward from the flange 81. The rod 82 extends in the front-rear direction.

The impact mechanism 9 strikes the anvil 10 in the rotation direction in response to rotation of the spindle 8. The impact mechanism 9 includes a hammer 91, balls 92, and an urging spring 93. The hammer 91 is supported by the spindle 8 in a manner movable in the front-rear direction and in the rotation direction. The balls 92 are placed between the spindle 8 and the hammer 91. The spring 93 urges the hammer 91 forward.

The hammer 91 is located frontward from the reduction mechanism 7. The hammer 91 rotates about the rotation axis AX. The hammer 91 is rotatable together with the spindle 8. The hammer 91 is movable relative to the spindle 8 in the front-rear direction and in the rotation direction.

The anvil 10 with a tip tool rotates. The tip tool in the embodiment is a socket that can hold a nut or a bolt head. The anvil 10 rotates about the rotation axis AX with a rotational force transmitted from the motor 6. The anvil 10 is struck by the hammer 91 in the rotation direction.

The anvil 10 is located at least partially frontward from the hammer 91. The anvil 10 is rotatable together with or relative to the spindle 8. The anvil 10 is rotatable together with or relative to the hammer 91. The anvil 10 is rotatably supported by a front bearing 50. The front bearing 50 is held by the gear case 4.

The anvil 10 includes a rod-like anvil body 101 and anvil protrusions 102. The anvil protrusions 102 are located in a rear portion of the anvil body 101. The anvil protrusions 102 protrude radially outward from the rear portion of the anvil body 101. The tip tool is attached to the front end of the anvil body 101.

The anvil 10 has a hole 103 to receive the front end of the spindle 8. The hole 103 is located in the rear end of the anvil 10. The front end of the spindle 8 is received in the hole 103.

The spindle 8 has its front end received in the hole 103. The spindle 8 thus serves as a bearing for the anvil 10 and the anvil 10 serves as a bearing for the spindle 8.

The fan 12 generates an airflow for cooling the motor 6. The fan 12 is located frontward from the stator 62 in the motor 6. The fan 12 is fixed to a portion of the rotor shaft 611 frontward from the stator 62. The fan 12 is located between the rotor core 612 and the front bearing 31. The fan 12 rotates as the rotor 61 rotates. The fan 12 rotates together with the rotor shaft 611 as the rotor shaft 611 rotates. In response to rotation of the fan 12, air outside the housing 2 flows into the internal space of the housing 2 through the inlets 19. Air flowing into the internal space of the housing 2 flows through the internal space of the housing 2 and cools the motor 6. The air then flows out of the housing 2 through the outlets 20.

The controller 13 outputs control signals for controlling the motor 6. The controller 13 changes the control mode of the motor 6 in response to the operator's operation on the operation panel 16. The control mode of the motor 6 refers to a method or a pattern for controlling the motor 6. The controller 13 includes a board on which multiple electronic components are mounted. Examples of the electronic components mounted on the board include a processor such as a central processing unit (CPU), a nonvolatile memory such as a read-only memory (ROM) or a storage device, a volatile memory such as a random-access memory (RAM), a field-effect transistor (FET), and a resistor. Examples of the FET includes a metal-oxide-semiconductor field-effect transistor (MOSFET) and an insulated-gate bipolar transistor (IGBT). For example, six FETs are mounted on the board.

The controller 13 is accommodated in the controller compartment 23. The controller 13 is at least partially accommodated in the internal space of the controller case 130 in the controller compartment 23.

The trigger switch 14 is operable by the operator to drive the motor 6. Driving the motor 6 refers to rotating the rotor 61 in response to the coils 624 in the stator 62 receiving a current. The trigger switch 14 is located on an upper portion of the grip 22. The trigger switch 14 includes a trigger 141 and a switch body 142. The switch body 142 is located in the internal space of the grip 22. The trigger 141 protrudes frontward from the upper front of the grip 22. The trigger 141 is operated by the operator to move backward. Thus, the motor 6 is driven. In response to a release operation on the trigger 141, the motor 6 is stopped.

The forward-reverse switch lever 15 is operable by the operator to change the rotation direction of the motor 6. The forward-reverse switch lever 15 is located between the lower end of the motor compartment 21 and the upper end of the grip 22. The forward-reverse switch lever 15 is operable by the operator to move left or right. The forward-reverse switch lever 15 is operable to switch the rotation direction of the motor 6 between forward and reverse. This operation switches the rotation direction of the anvil 10.

The operation panel 16 is operable by the operator to change the control mode of the motor 6. The operation panel 16 is located in the controller compartment 23. The operation panel 16 is a plate formed from a synthetic resin. The controller compartment 23 has an opening 231 to receive the operation panel 16. The opening 231 is formed in the upper surface of the controller compartment 23 frontward from the grip 22. The operation panel 16 is received at least partially in the opening 231. The operation panel 16 includes multiple operation buttons 160. The operation buttons 160 are operable by the operator to operate multiple operation switches in the controller 13 to change the control mode of the motor 6.

The lamp 18 emits illumination light to illuminate ahead of the power tool 1. The lamp 18 is located above the trigger 141 and below the gear case 4. The lamp 18 includes, for example, a light-emitting diode (LED).

Relationship Among Rear Cover, Motor Compartment, and Gear Case

Figure 7:
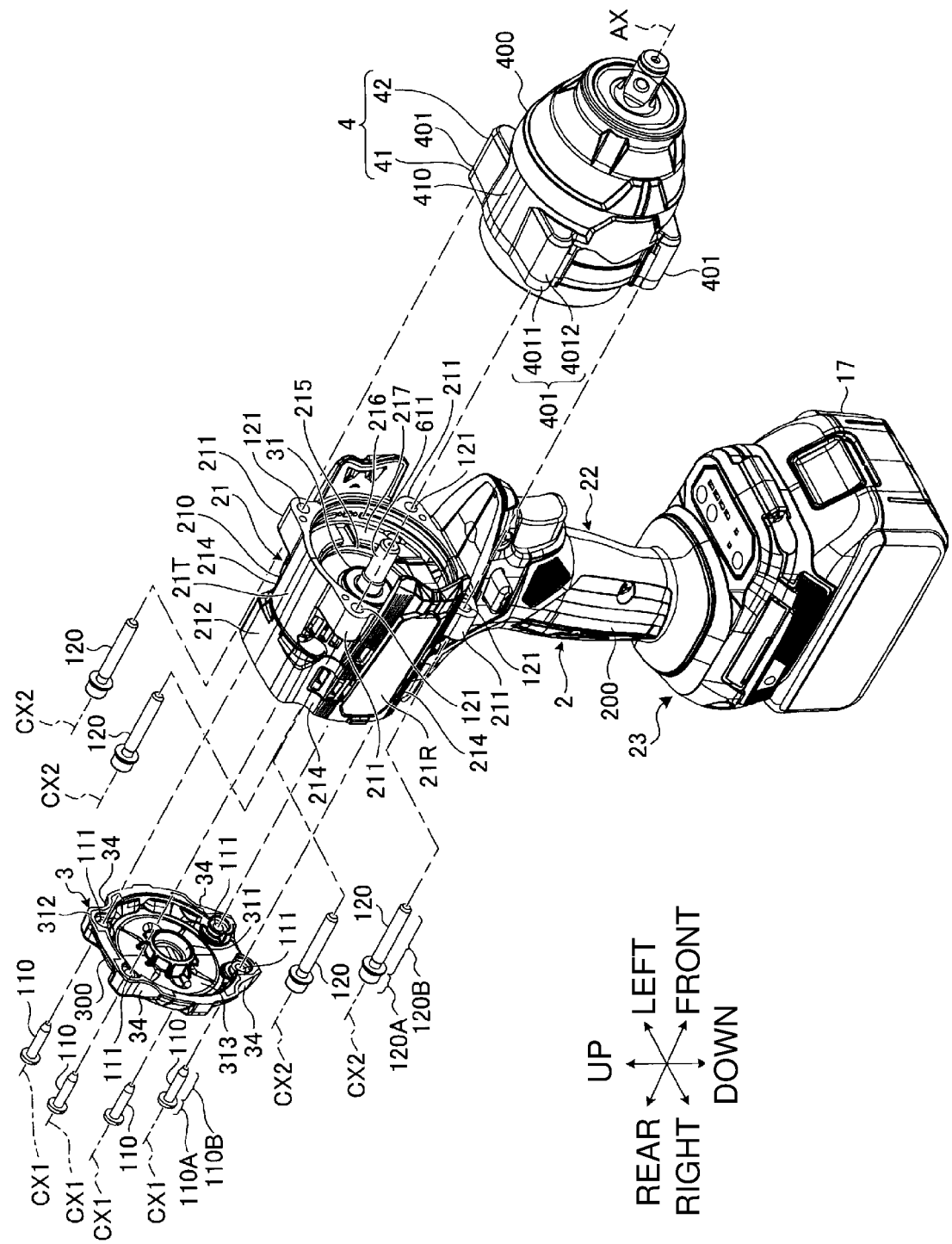
FIG. 7 is an exploded perspective view of the power tool according to the embodiment as viewed from the front.
Figure 8:
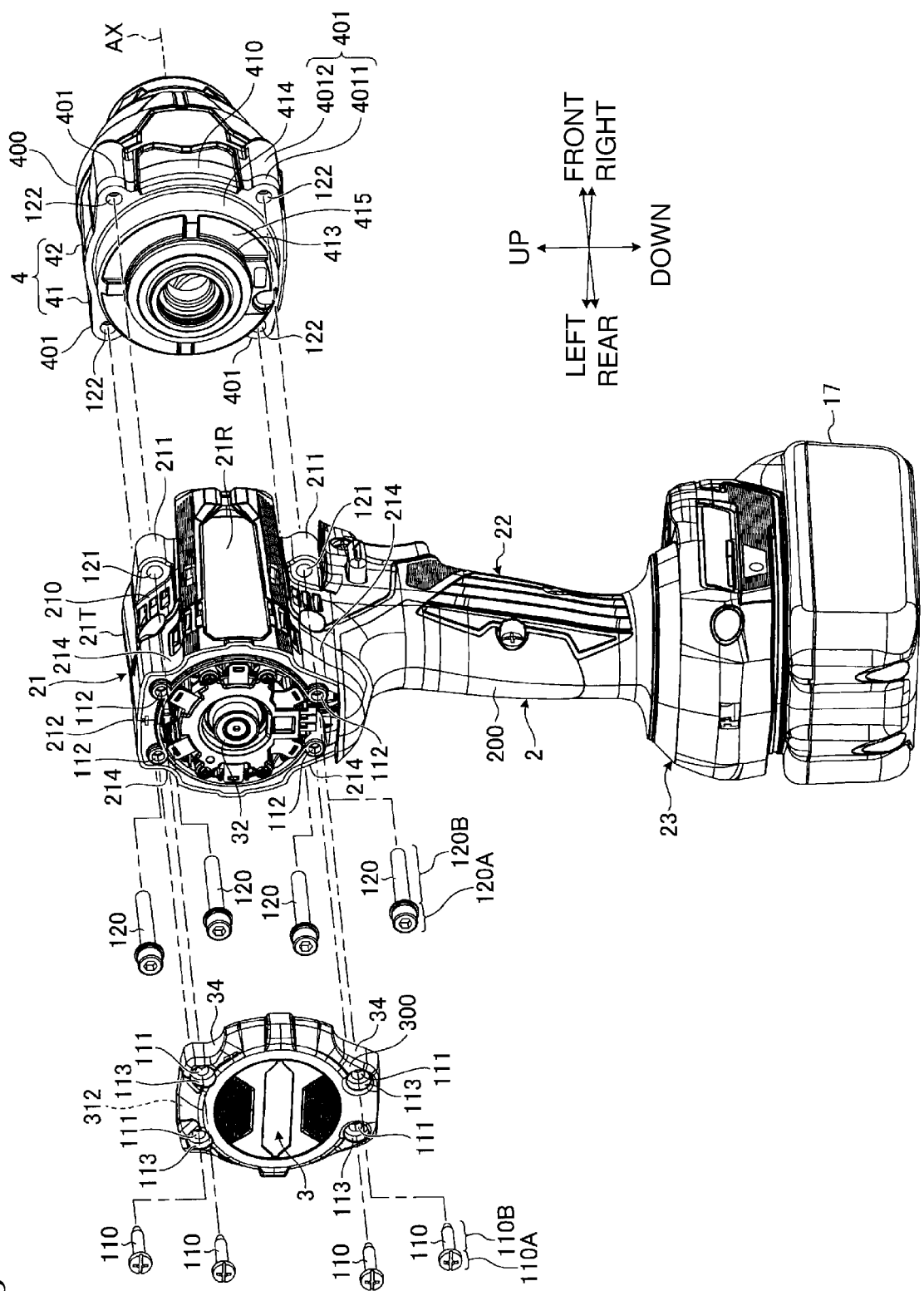
FIG. 8 an exploded perspective view of the power tool according to the embodiment as viewed from the rear.
Figure 9:
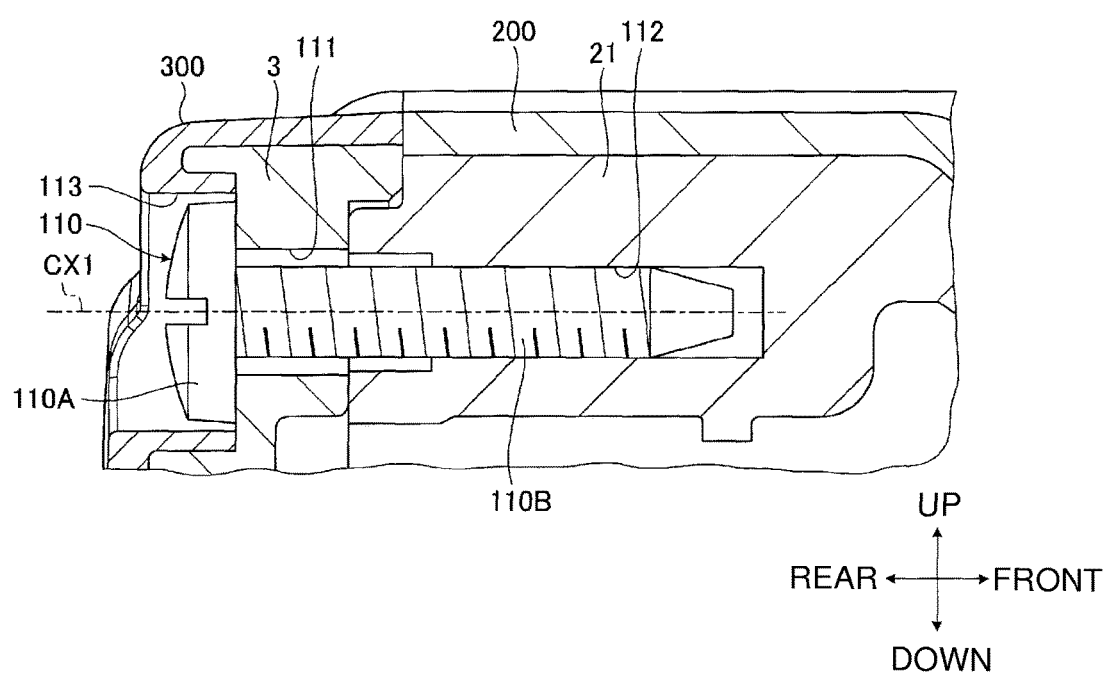
FIG. 9 is a sectional view of a first screw in the embodiment.
Figure 10:
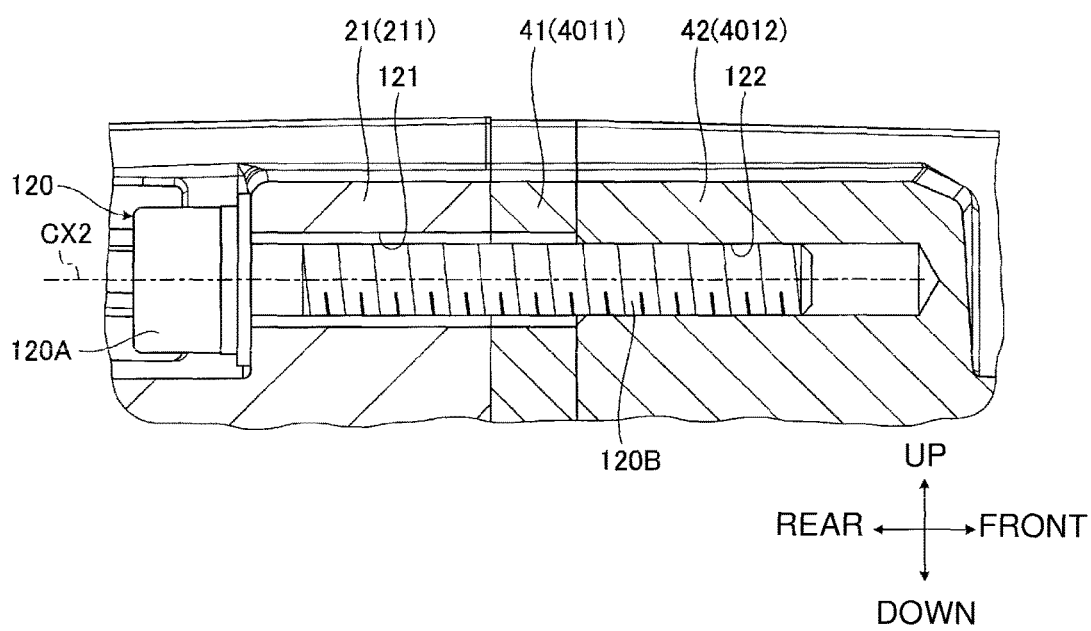
FIG. 10 is a sectional view of a second screw in the embodiment.
Figure 11:
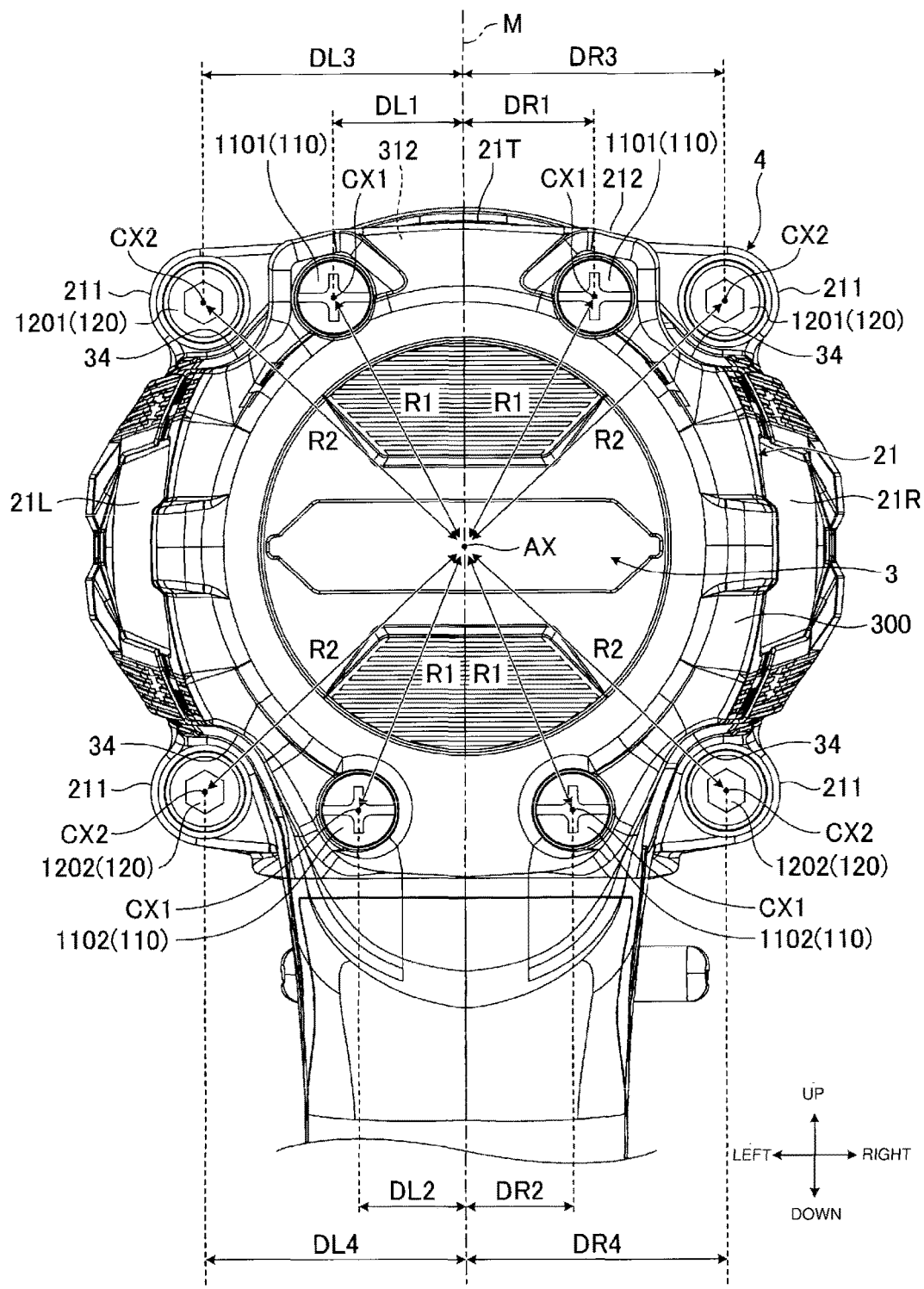
FIG. 11 is a partial rear view of the power tool according to the embodiment.

FIG. 7 is an exploded perspective view of the power tool 1 according to the embodiment as viewed from the front. FIG. 8 an exploded perspective view of the power tool 1 as viewed from the rear. FIG. 9 is a sectional view of the first screw 110. FIG. 10 is a sectional view of the second screw 120. FIG. 11 is a partial rear view of the power tool 1.

The rear cover 3 includes a disk-shaped base plate 313, a rear support 311, and a peripheral wall 312. The rear support 311 protrudes frontward from a center portion of the base plate 313. The peripheral wall 312 protrudes frontward from the peripheral edge of the base plate 313. The rear support 311 is cylindrical. The rear support 311 surrounds and supports the rear bearing 32. The peripheral wall 312 is cylindrical. The peripheral wall 312 flares radially outward toward the front. The peripheral wall 312 is in contact with the rear end of the motor compartment 21.

The power tool 1 includes the first screws 110 and the second screws 120. The first screws 110 are used to fasten the rear cover 3 and the motor compartment 21 together. The second screws 120 are used to fasten the motor compartment 21 and the gear case 4 together. The second screws 120 are longer than the first screws 110.

The first screws 110 surround the rotation axis AX. The second screws 120 surround the rotation axis AX. In the embodiment, four first screws 110 surround the rotation axis AX. Four second screws 120 surround the rotation axis AX.

The first screws 110 and the second screws 120 are at different positions in the axial direction parallel to the rotation axis AX. The second screws 120 are located frontward from the first screws 110.

The first screws 110 and the second screws 120 are at different positions in a plane orthogonal to the rotation axis AX. The first screws 110 and the second screws 120 are at different positions in the circumferential and radial directions about the rotation axis AX.

Each first screw 110 has a head 110A and a threaded portion 110B with threads. Each second screw 120 has a head 120A and a threaded portion 120B with threads.

The rear cover 3 has first openings 111. Each first opening 111 receives a middle portion of the first screw 110. The cover 300 has openings 113 aligned with the first openings 111. The motor compartment 21 has first screw holes 112 each for receiving the front end of the first screw 110.

The middle portion of the first screw 110 corresponds to a middle portion of the threaded portion 110B in a direction parallel to the center axis CX1 of the first screw 110. The front end of the first screw 110 corresponds to the front end of the threaded portion 110B in the direction parallel to the center axis CX1 of the first screw 110.

The first openings 111 are located circumferentially at intervals about the rotation axis AX. In the embodiment, four first openings 111 are located in the peripheral wall 312 of the rear cover 3. Each first opening 111 is a through-hole extending between the front surface and the rear surface of the peripheral wall 312. The openings 113 are located in the peripheral edge of the cover 300 to be aligned with the first openings 111. Each opening 113 is a through-hole extending between the front surface and the rear surface of the cover 300.

The first screw holes 112 are located circumferentially at intervals about the rotation axis AX. In the embodiment, four first screw holes 112 are located in the peripheral edge of the rear surface of the motor compartment 21. The first screw hole 112 has, on its inner surface, a threaded groove to be engaged with the threads on the threaded portion 110B. The first screw 110 and the first screw hole 112 are engageable with each other.

The motor compartment 21 has second openings 121. Each second opening 121 receives a middle portion of the second screw 120. The gear case 4 has second screw holes 122. Each second screw hole 122 receives the front end of the second screw 120.

The middle portion of the second screw 120 corresponds to a middle portion of the threaded portion 120B in a direction parallel to the center axis CX2 of the second screw 120. The front end of the second screw 120 corresponds to the front end of the threaded portion 120B in the direction parallel to the center axis CX2 of the second screw 120.

The motor compartment 21 includes a cylindrical body 210, screw bosses 211, and a bulge 212. The screw bosses 211 protrude from the outer surface of the body 210 radially outward about the rotation axis AX. The bulge 212 protrudes from the outer surface of the body 210 radially outward about the rotation axis AX. The screw bosses 211 are located circumferentially at intervals about the rotation axis AX. In the embodiment, four screw bosses 211 are located in the front peripheral edge of the body 210. The four screw bosses 211 each have the second opening 121. The second opening 121 is a through-hole extending between the front surface and the rear surface of the screw boss 211. The bulge 212 is located rearward from the screw bosses 211. The bulge 212 is located at the rear peripheral edge of the body 210. The bulge 212 has the first screw holes 112.

The gear case 4 includes a cylindrical body 410 and screw bosses 401. The screw bosses 401 protrude from the outer surface of the body 410 radially outward about the rotation axis AX. The screw bosses 401 are located circumferentially at intervals about the rotation axis AX. In the embodiment, four screw bosses 401 are located in the rear peripheral edge of the body 410. In the embodiment, the screw bosses 401 each include a screw boss 4011 and a screw boss 4012. The screw boss 4011 is in the bearing holder 41. The screw boss 4012 is in the rear of the hammer case 42. The four screw bosses 401 each have the second screw hole 122. The second screw hole 122 has, on its inner surface, a threaded groove to be engaged with the threads on the threaded portion 120B. The second screw 120 and the second screw hole 122 are engageable with each other.

The rear cover 3 has first recesses 34 on its outer surface. The first recesses 34 are recessed radially inward about the rotation axis AX. The first recesses 34 are grooves extending in the axial direction along the rotation axis AX. The first recesses 34 each connect the front end and the rear end of the rear cover 3. The first recesses 34 are located circumferentially at intervals about the rotation axis AX. In the embodiment, four first recesses 34 are located on the peripheral wall 312 of the rear cover 3. The second screws 120 are movable radially outside the first recesses 34 in the front-rear direction. More specifically, each second screw 120 is movable in the front-rear direction while facing the surface (recessed surface) of the first recess 34.

The motor compartment 21 has second recesses 214 on the outer surface of its body 210. The second recesses 214 are recessed radially inward about the rotation axis AX. The second recesses 214 are grooves extending in the axial direction along the rotation axis AX. The screw bosses 211 having the second openings 121 are located in front of the second recesses 214. The second recesses 214 each connect the rear end of the body 210 and the screw boss 211. The second recesses 214 are located circumferentially at intervals about the rotation axis AX. In the embodiment, four second recesses 214 are located on the rear peripheral edge of the body 210. The second screws 120 are movable radially outside the second recesses 214 in the front-rear direction.

The first recesses 34, the second recesses 214, and the second openings 121 are aligned with one another in a plane orthogonal to the rotation axis AX. In other words, the first recesses 34, the second recesses 214, and the second openings 121 are continuous with one another in a plane orthogonal to the rotation axis AX. The front end of the first recess 34 connects to the rear end of the second recess 214. The front end of the second recess 214 connects to the second opening 121.

To fasten the rear cover 3 and the motor compartment 21 together with the first screws 110, the threaded portion 110B on each first screw 110 is placed into the first opening 111 through the opening 113 at the rear of the rear cover 3. In this state, the front end of the threaded portion 110B is placed through the first screw hole 112. In this state, the first screw 110 is rotated using, for example, a screwdriver to place the threaded portion 110B on the first screw 110 engaged with the first screw hole 112. The threaded portion 110B on the first screw 110 is engaged with the first screw hole 112 with the rear cover 3 held between the head 110A and the motor compartment 21. This fastens the rear cover 3 and the motor compartment 21 together.

To fasten the motor compartment 21 and the gear case 4 with the second screws 120, the threaded portion 120B on each second screw 120 is placed into the second opening 121 from the rear of the screw boss 211. In this state, the front end of the threaded portion 120B is placed through the second screw hole 122. In this state, the second screw 120 is rotated using, for example, a screwdriver to place the threaded portion 120B on the second screw 120 engaged with the second screw hole 122. The threaded portion 120B on the second screw 120 is engaged with the second screw hole 122 with the screw boss 211 held between the head 120A and the screw boss 401. This fastens the motor compartment 21 and the gear case 4 together.

In the embodiment, the rear cover 3, which is a separate member from the motor compartment 21, covers the rear opening in the motor compartment 21. The first screws 110 for fastening the rear cover 3 and the motor compartment 21 extend in the front-rear direction. The power tool 1 can thus be smaller in the front-rear direction.

For example, a housing including a pair of housing halves without a rear cover uses a screw extending in the lateral direction to fasten the rear of the housing halves. In this case, the housing halves include screw bosses on their rears. The power tool may be larger in the front-rear direction.

In the embodiment, the rear cover 3 and the motor compartment 21 are fastened together with the first screws 110 extending in the front-rear direction. The power tool 1 can thus be smaller in the front-rear direction.

In the embodiment, the fan 12 is located frontward from the stator 62. In other words, the fan 12 is not located between the rear cover 3 and the motor compartment 21. This reduces the constraints on the shape and the dimensions of the rear cover 3. Thus, for example, the rear cover 3 can be smaller in the front-rear direction. The power tool 1 can thus be smaller in the front-rear direction.

The first screws 110 and the second screws 120 are at different positions in a plane orthogonal to the rotation axis AX. In other words, the first openings 111 and the first screw holes 112 are at positions different from the second openings 121 and the second screw holes 122 in a plane orthogonal to the rotation axis AX. This facilitates smooth assembly of the rear cover 3 and the motor compartment 21, and smooth assembly of the motor compartment 21 and the gear case 4. The first screws 110 and the second screws 120 are at different positions in the circumferential and radial directions about the rotation axis AX, reducing the likelihood of the power tool 1 being upsized.

In the embodiment, each first screw 110 is placed through the first opening 111 at the rear of the rear cover 3 into the first screw hole 112. Each second screw 120 is placed through the second opening 121 at the rear of the motor compartment 21 into the second screw hole 122. This facilitates smooth engagement of the first screw 110 with the first screw hole 112, and smooth engagement of the second screw 120 with the second screw hole 122 using a screwdriver without redirecting the screwdriver.

The motor compartment 21 and the gear case 4 are fastened together with the second screws 120 having the threaded portions 120B engaged with the gear case 4. This structure allows the second screws 120 to receive high torque applied to the gear case 4 during work using the power tool 1.

The first recesses 34, the second recesses 214, and the second openings 121 are aligned with one another in a plane orthogonal to the rotation axis AX. To engage each second screw 120 with the second screw hole 122 using a screwdriver, the above structure allows the second screw 120 to be rotated with the shaft of the screwdriver located radially outside the first and second recesses 34 and 214. This facilitates smooth engagement of the second screw 120 with the second screw hole 122.

The first screws 110 surround the rotation axis AX. This allows stable fastening between the rear cover 3 and the motor compartment 21 with improved workability. In the embodiment, the rear cover 3 and the motor compartment 21 are fastened together with the four first screws 110. This allows firm fastening between the rear cover 3 and the motor compartment 21 with improved workability.

The second screws 120 surround the rotation axis AX. This allows stable fastening between the motor compartment 21 and the gear case 4 with improved workability. In the embodiment, the motor compartment 21 and the gear case 4 are fastened together with the four second screws 120. This allows firm fastening between the motor compartment 21 and the gear case 4 with improved workability.

The four first screws 110 are parallel to one another. The four second screws 120 are parallel to one another. The first screws 110 and the second screws 120 in the embodiment are parallel to the rotation axis AX.

In other words, the center axes CX1 of the four first screws 110 are parallel to one another. The center axes CX2 of the four second screws 120 are parallel to one another. The center axes CX1, the center axes CX2, and the rotation axis AX are parallel to one another.

As shown in FIG. 11, the first screws 110 are at equal distances R1 from the rotation axis AX in the radial direction about the rotation axis AX. The distance R1 is the distance between the rotation axis AX and the center axis CX1 in the radial direction about the rotation axis AX. In other words, the four first screws 110 are arranged on one imaginary circle centered on the rotation axis AX.

The second screws 120 are at equal distances R2 from the rotation axis AX in the radial direction about the rotation axis AX. The distance R2 is the distance between the rotation axis AX and the center axis CX2 in the radial direction about the rotation axis AX. In other words, the four second screws 120 are arranged on one imaginary circle centered on the rotation axis AX.

In the radial direction about the rotation axis AX, the distance R2 is longer than the distance R1.

The motor compartment 21 has a left portion 21L and a right portion 21R. The left portion 21L is located on the left of the rotation axis AX and the right portion 21R is on the right of the rotation axis AX. The left portion 21L defines the left side surface of the motor compartment 21. The right portion 21R defines the right side surface of the motor compartment 21.

The first screws 110 are at positions other than the left portion 21L and the right portion 21R in the circumferential direction about the rotation axis AX. The second screws 120 are at positions other than the left portion 21L and the right portion 21R in the circumferential direction about the rotation axis AX. More specifically, the first screws 110 are located above or below the side surfaces (right and left side surfaces) of the motor compartment 21. The second screws 120 are located above or below the side surfaces (right and left side surfaces) of the motor compartment 21. In the embodiment, the first screws 110 are located above and below the side surfaces of the motor compartment 21. The second screws 120 are located above and below the side surfaces of the motor compartment 21.

In the embodiment, the side surfaces of the motor compartment 21 are each defined as follows. First, the power tool 1 is placed on a placement surface parallel to a horizontal surface with the grip 22 protruding downward from the motor compartment 21. In this state, the intersection between a horizontal plane including the rotation axis AX and the surface of the motor compartment 21 is used as a reference position. Each side surface of the motor compartment 21 refers to an area extending upward and downward between predetermined angles relative to the reference position in the circumferential direction of the rotation axis AX. The predetermined angle may be 20 to 60 degrees inclusive. In the embodiment, the side surface includes the internal region of the first protrusions 201, the second protrusions 202, and the third protrusions 203.

As shown in FIG. 11, two first screws 1101 are located above the rotation axis AX. Two first screws 1102 are located below the rotation axis AX.

The two first screws 1101 are located above and on the right and left of the rotation axis AX. The two first screws 1102 are located below and on the right and left of the rotation axis AX. In the embodiment, the two first screws 1101 located above the rotation axis AX are at equal positions in the vertical direction. The two first screws 1102 located below the rotation axis AX are at equal positions in the vertical direction.

A center line M of the housing 2 in the lateral direction is defined. A distance DL1 between the first screw 1101 on the left and the center line M is equal to a distance DR1 between the first screw 1101 on the right and the center line M. A distance DL2 between the first screw 1102 on the left and the center line M is equal to a distance DR2 between the first screw 1102 on the right and the center line M. The distances DL1 and DR1 are longer than the distances DL2 and DR2.

As shown in FIG. 11, two second screws 1201 are located above the rotation axis AX. Two second screws 1202 are located below the rotation axis AX.

The two second screws 1201 are located above and on the right and left of the rotation axis AX. The two second screws 1202 are located below and on the right and left of the rotation axis AX. In the embodiment, the two second screws 1201 located above the rotation axis AX are at equal positions in the vertical direction. The two second screws 1202 located below the rotation axis AX are at equal positions in the vertical direction.

A distance DL3 between the second screw 1201 on the left and the center line M is equal to a distance DR3 between the second screw 1201 on the right and the center line M. A distance DL4 between the second screw 1202 on the left and the center line M is equal to a distance DR4 between the second screw 1202 on the right and the center line M. The distances DL3 and DR3 are equal to the distances DL4 and DR4.

In the embodiment, the first screws 1101 and the second screws 1201 located above the rotation axis AX are at equal positions in the vertical direction. The first screws 1102 and the second screws 1202 located below the rotation axis AX are at equal positions in the vertical direction.

The first screws 110 and the second screws 120 are located below an upper end 21T of the motor compartment 21.

The four first screws 110 are parallel to one another. This allows each of the four first screws 110 to be smoothly engaged with the first screw hole 112 while reducing the likelihood of the power tool 1 being upsized. The four second screws 120 are parallel to one another. This allows each of the four second screws 120 to be smoothly engaged with the second screw hole 122 while reducing the likelihood of the power tool 1 being upsized.

The first screws 110 and the second screws 120 are parallel to each other. This allows smooth assembly of the rear cover 3 and the motor compartment 21, and smooth assembly of the motor compartment 21 and the gear case 4 while reducing the likelihood of the power tool 1 being upsized.

The first screws 110 and the second screws 120 are parallel to the rotation axis AX. This allows smooth assembly of the rear cover 3 and the motor compartment 21, and smooth assembly of the motor compartment 21 and the gear case 4 while reducing the likelihood of the power tool 1 being upsized.

In the embodiment, the first screws 110 are not located on the left portion 21L (left side surface) and the right portion 21R (right side surface) of the motor compartment 21. This reduces the likelihood of the rear cover 3 and the motor compartment 21 being upsized in the lateral direction. The second screws 120 are not located on the left portion 21L and the right portion 21R. This reduces the likelihood of the motor compartment 21 and the gear case 4 being upsized in the lateral direction.

The first screws 110 and the second screws 120 are arranged at the positions other than the left portion 21L and the right portion 21R. This provides a space for appropriate placement of a logotype or a label on the surface of the left portion 21L and the surface of the right portion 21R.

The first screws 110 and the second screws 120 are at substantially equal positions in the vertical direction. This facilitates smooth engagement of the first screws 110 with the first screw holes 112, and smooth engagement of the second screws 120 with the second screw holes 122. The first screws 110 and the second screws 120 may be at different positions in the vertical direction.

The first screws 110 and the second screws 120 are located below the upper end 21T of the motor compartment 21. This reduces the likelihood of the rear cover 3, the motor compartment 21, and the gear case 4 being upsized in the vertical direction. The screw bosses 211 and the screw bosses 401 do not protrude upward from the upper end 21T of the motor compartment 21. The operator can thus smoothly work with the power tool 1.

The first screws 110 are at equal distances R1 from the rotation axis AX in the radial direction about the rotation axis AX. This allows stable fastening between the rear cover 3 and the motor compartment 21 with improved workability.

The second screws 120 are at equal distances R2 from the rotation axis AX in the radial direction about the rotation axis AX. This allows stable fastening between the motor compartment 21 and the gear case 4 with improved workability.

The distance R2 between each of the second screws 120 and the rotation axis AX is longer than the distance R1 between each of the first screws 110 and the rotation axis AX in the radial direction about the rotation axis AX. This allows smooth assembly of the rear cover 3 and the motor compartment 21, and smooth assembly of the motor compartment 21 and the gear case 4. A greater reaction force acts on the gear case 4 than on the rear cover 3, and thus the distance R2 is designed to be longer than the distance R1. The second screws 120 are at the distances R2 from the rotation axis AX and thus more reliably accommodate the reaction force acting on the gear case 4.

The two first screws 1101 are located above the rotation axis AX. The two first screws 1102 are located below the rotation axis AX. This allows stable fastening between the rear cover 3 and the motor compartment 21 with improved workability.

The two second screws 1201 are located above the rotation axis AX. The two second screws 1202 are located below the rotation axis AX. This allows stable fastening between the motor compartment 21 and the gear case 4 with improved workability.

The distances DL1 and DR1 are different from the distances DL2 and DR2. Thus, for example, the rear cover 3 is less likely to be attached upside down to the motor compartment 21.

The distances DL2 and DR2 are shorter than the distances DL1 and DR1. The operator is thus less likely to feel discomfort when gripping the upper portion of the grip 22.

Motor

Figure 12:
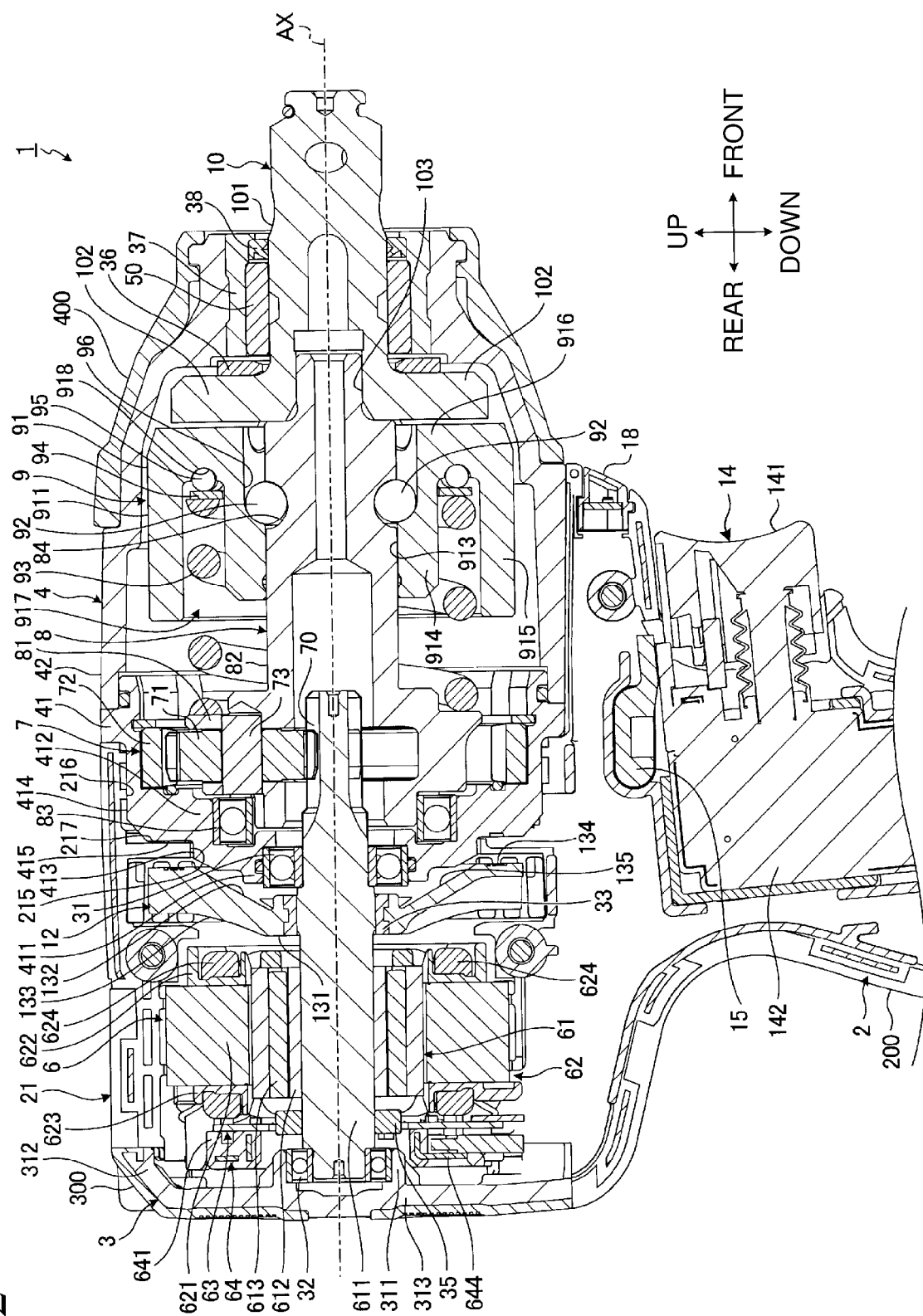
FIG. 12 is a partially enlarged longitudinal sectional view of the power tool according to the embodiment.
Figure 13:
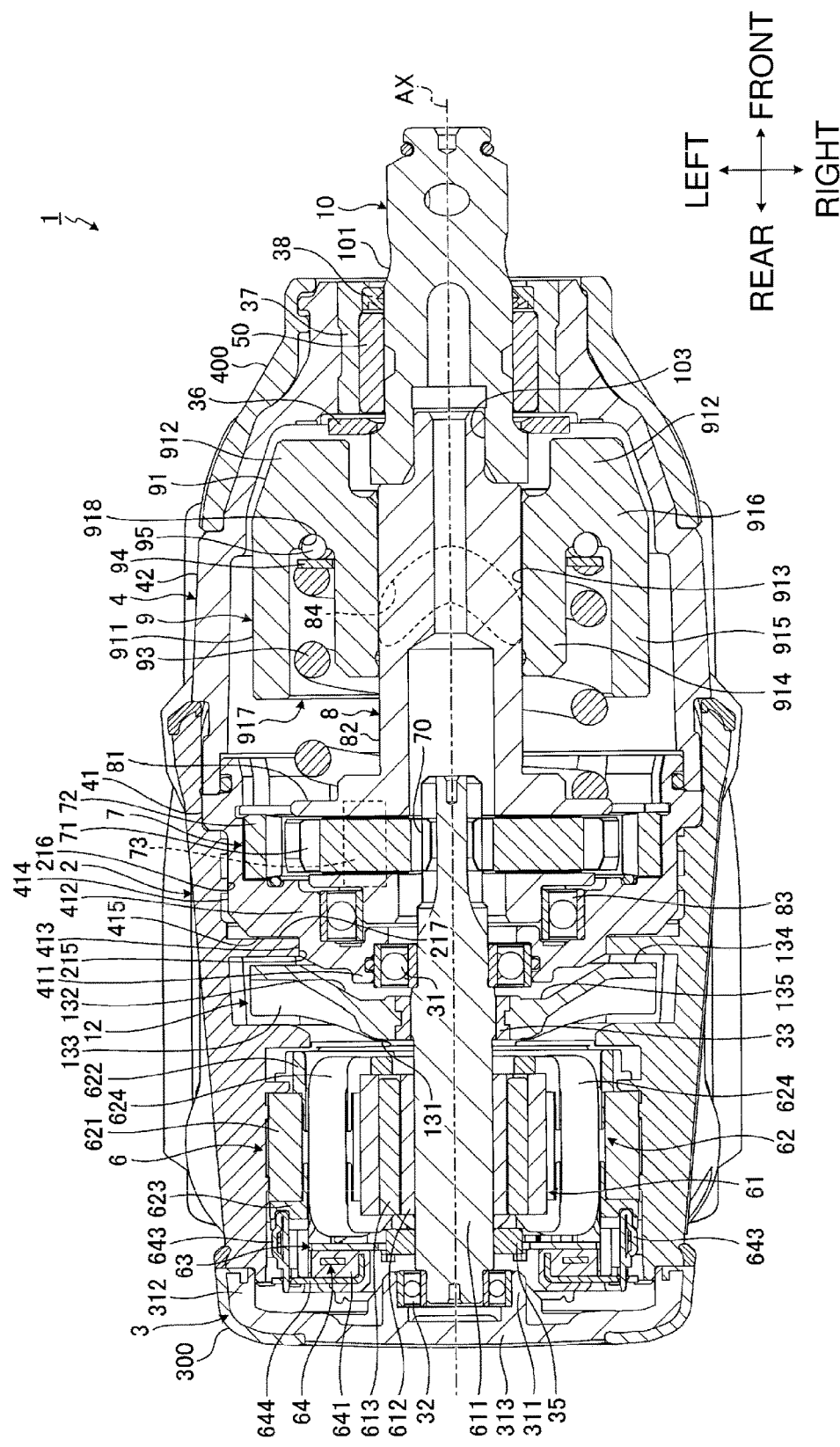
FIG. 13 is a partially enlarged transverse sectional view of the power tool according to the embodiment.
Figure 14:
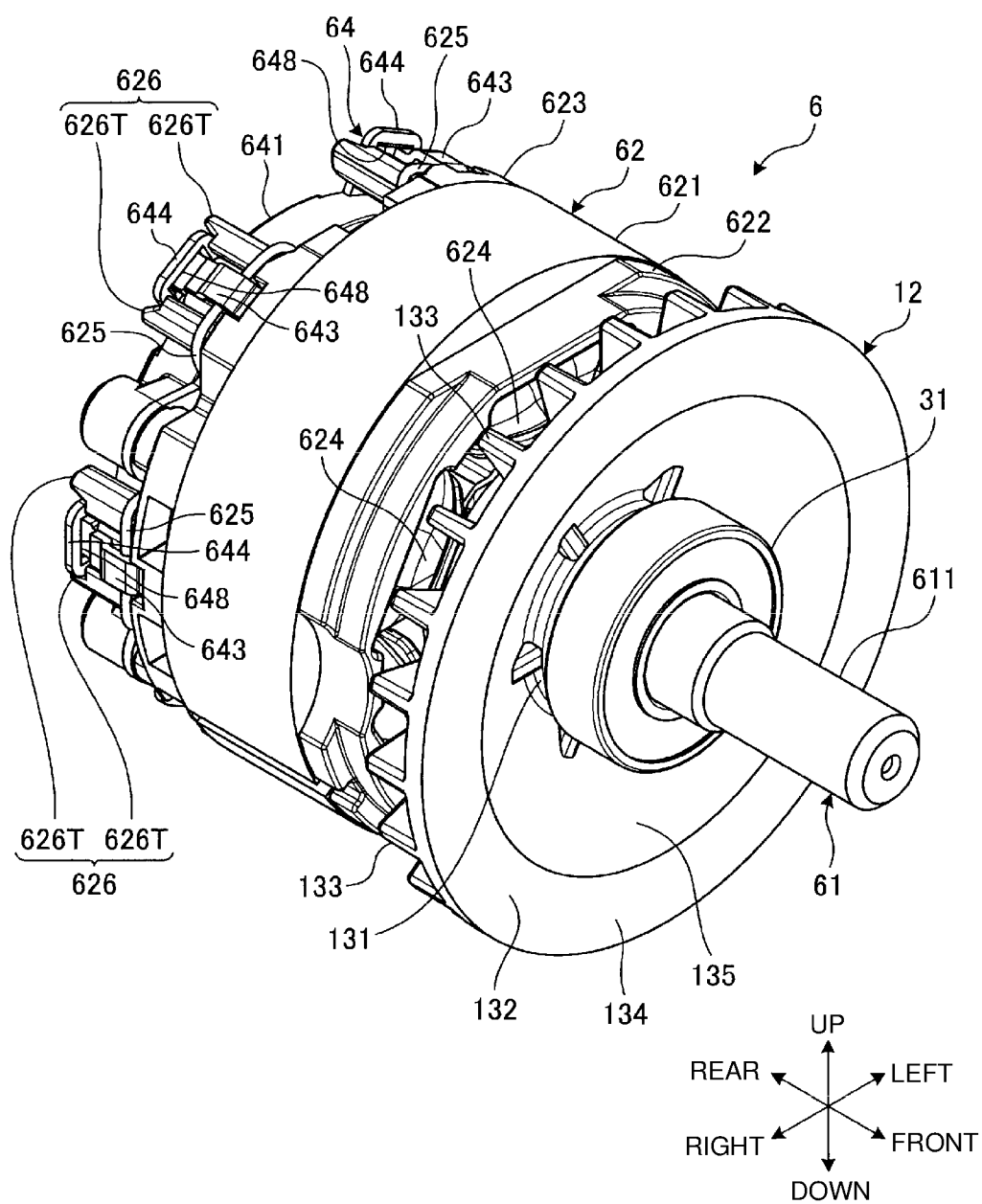
FIG. 14 is a front perspective view of a motor in the embodiment.
Figure 15:
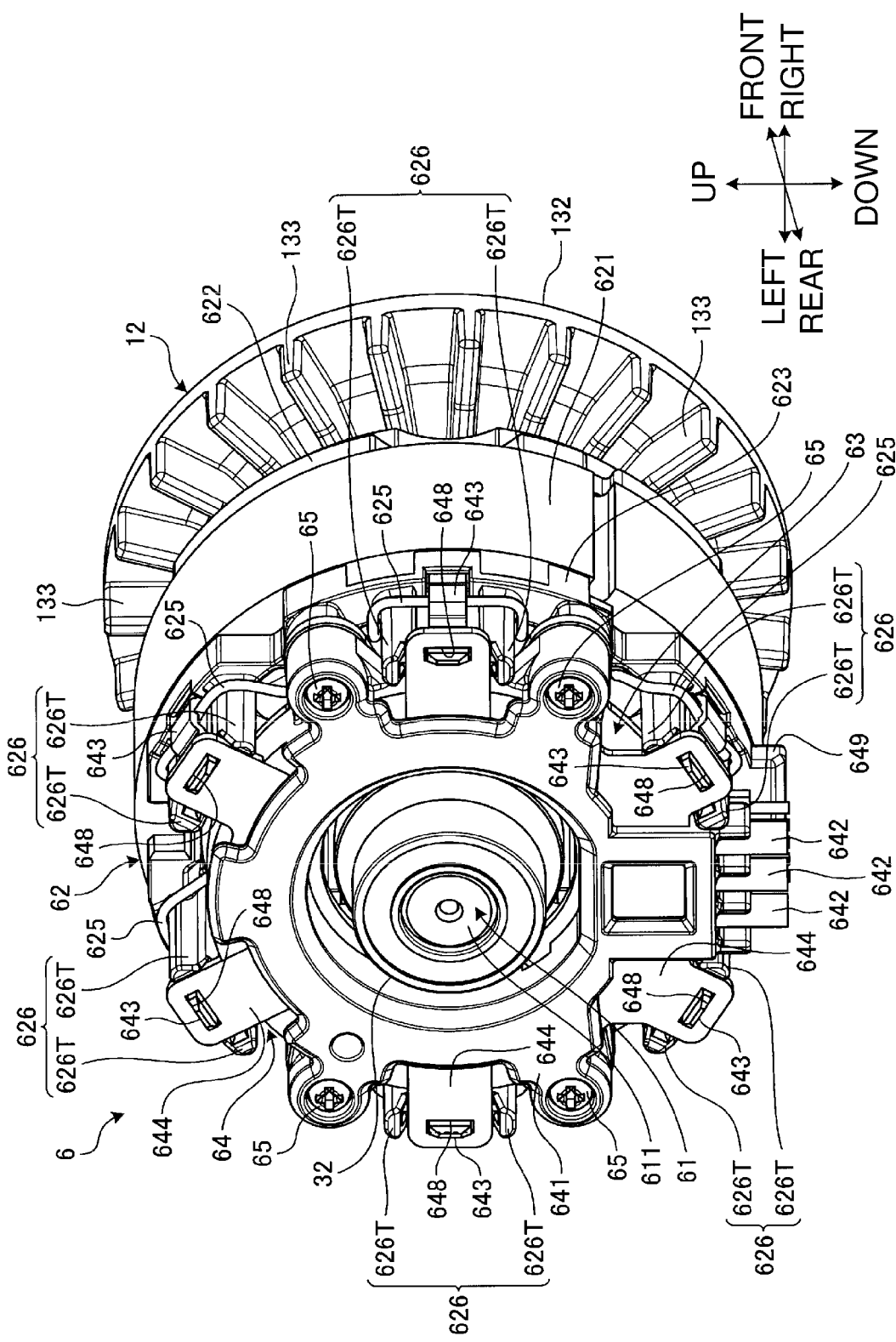
FIG. 15 is a rear perspective view of the motor in the embodiment.
Figure 16:
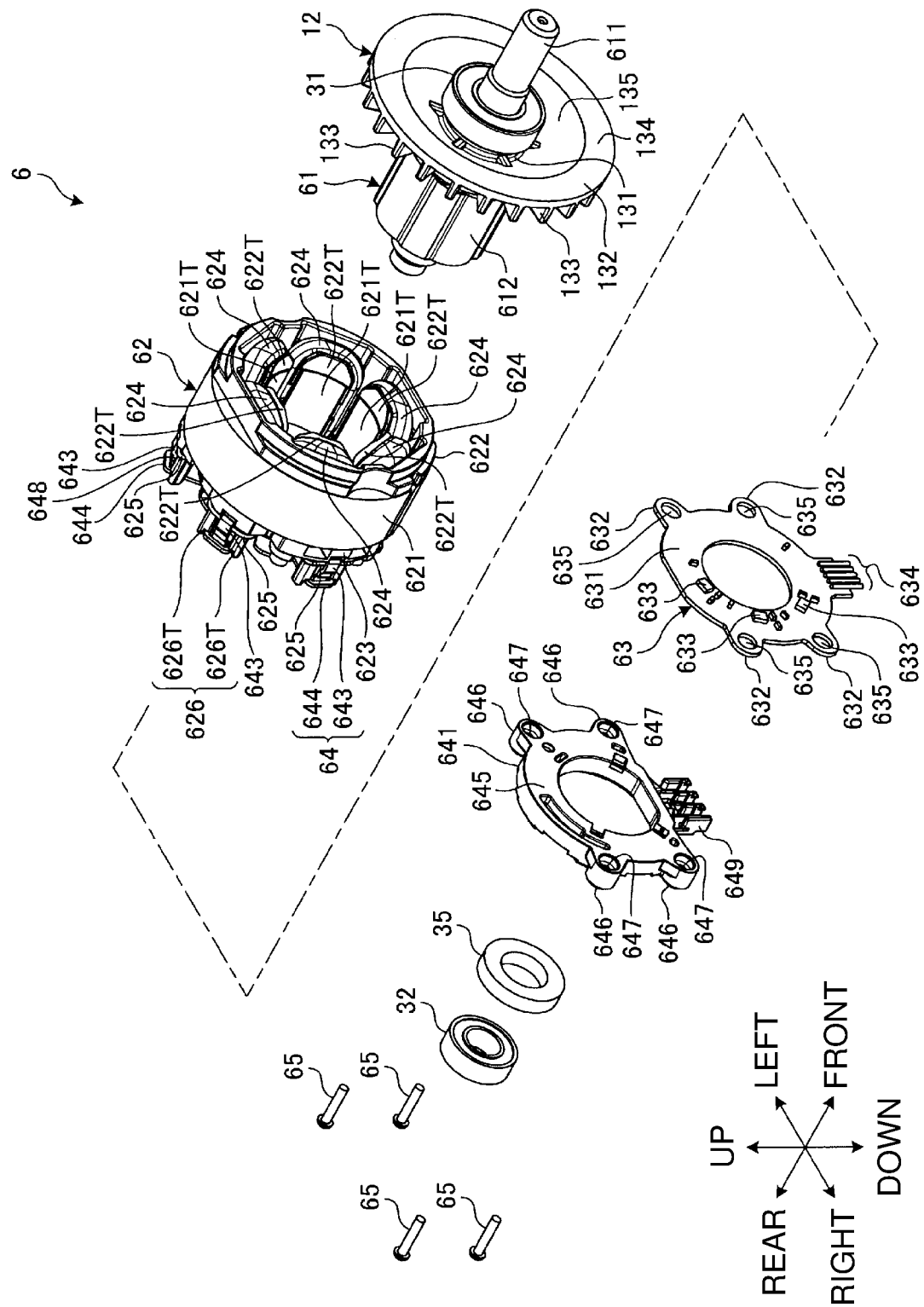
FIG. 16 is an exploded perspective view of the motor in the embodiment as viewed from the front.
Figure 17:
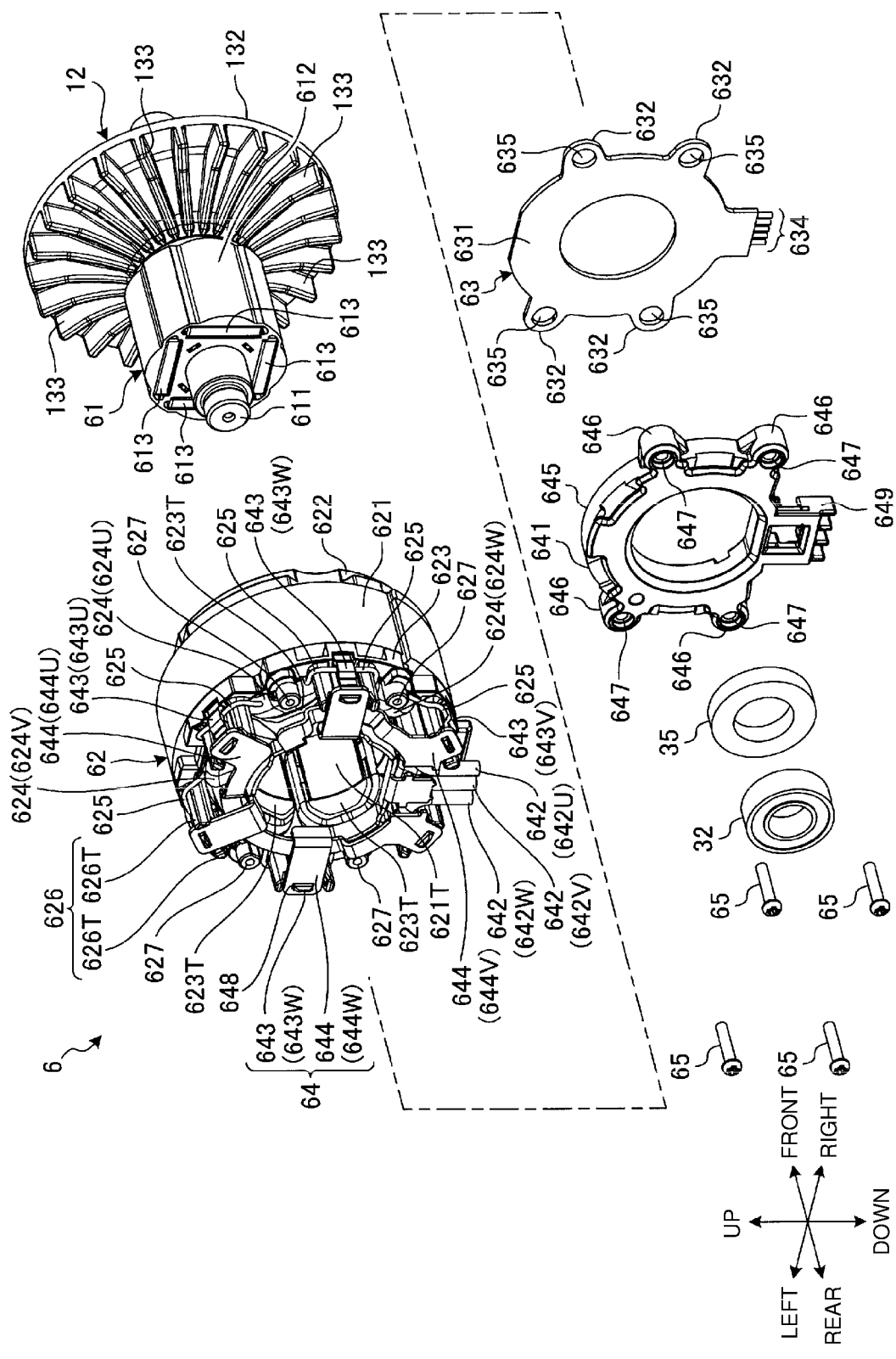
FIG. 17 is an exploded perspective view of the motor in the embodiment as viewed from the rear.
Figure 18:
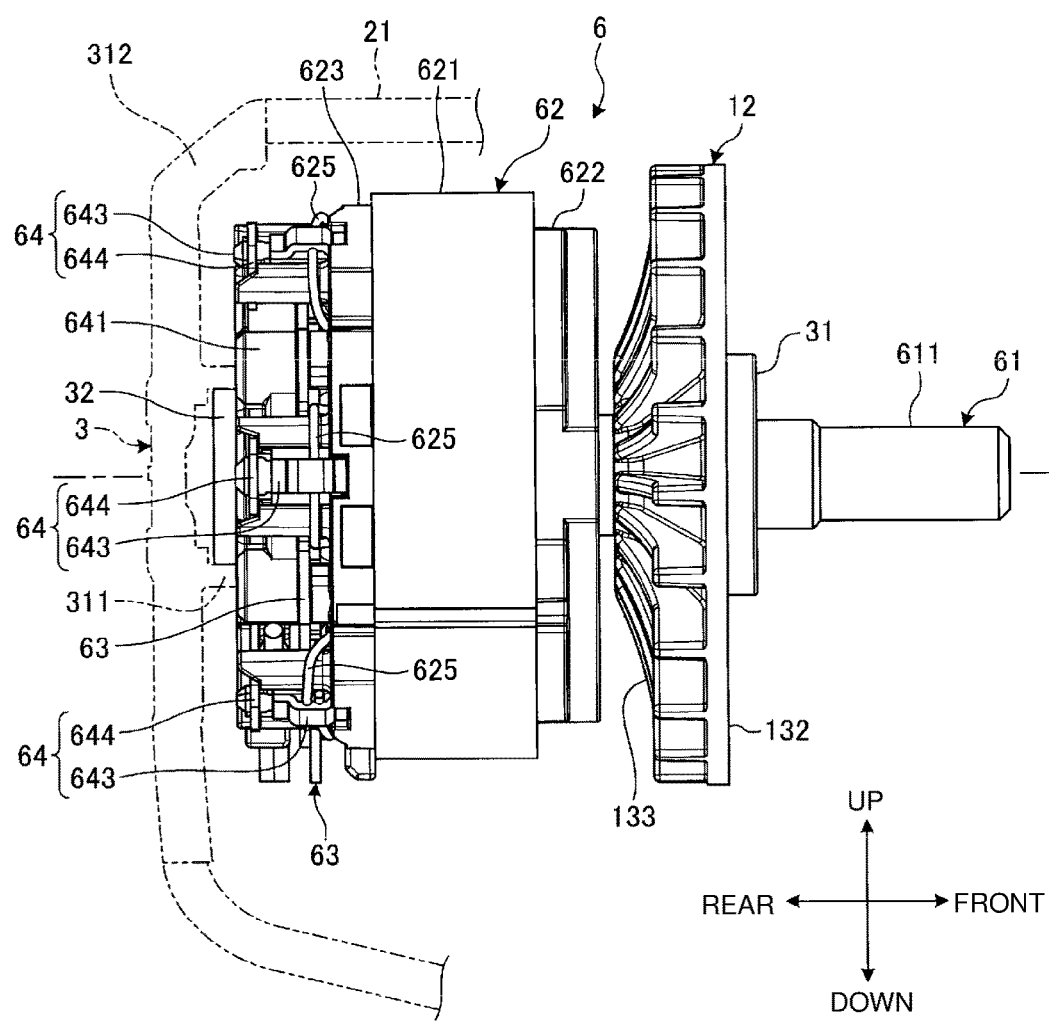
FIG. 18 is a side view of the motor in the embodiment.
Figure 19:
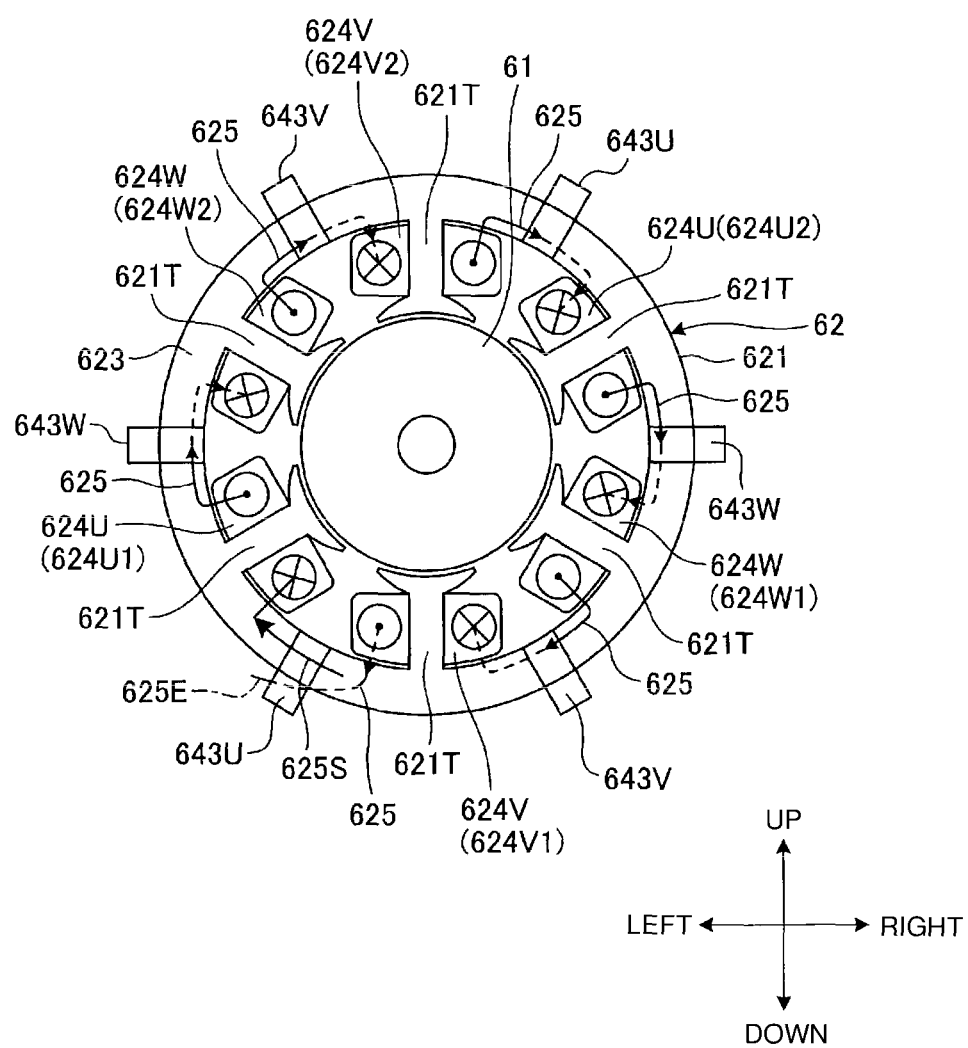
FIG. 19 is a schematic diagram of a stator in the embodiment.
Figure 20:
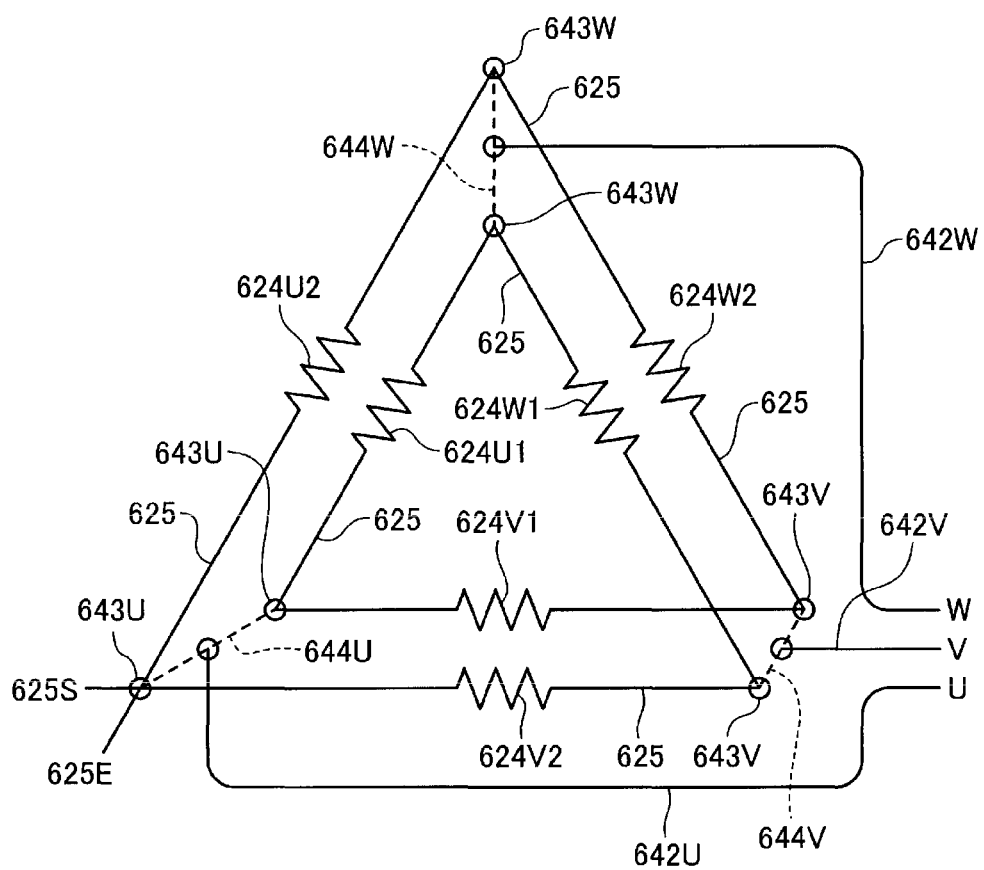
FIG. 20 is a schematic diagram of coils in the embodiment, describing connections between them.

FIG. 12 is a partially enlarged longitudinal sectional view of the power tool 1 according to the embodiment. FIG. 13 is a partially enlarged transverse sectional view of the power tool 1. FIG. 14 is a front perspective view of the motor 6. FIG. 15 is a rear perspective view of the motor 6. FIG. 16 is an exploded perspective view of the motor 6 as viewed from the front. FIG. 17 is an exploded perspective view of the motor 6 as viewed from the rear. FIG. 18 is a side view of the motor 6. FIG. 19 is a schematic diagram of the stator 62. FIG. 20 is a schematic diagram of the coils 624, describing connections between them. In FIG. 19, a symbol with a dot inside a circle indicates that the wire forming a coil 624 is wound backward. A symbol with a cross inside a circle indicates that the wire forming a coil 624 is wound forward.

The motor 6 includes the rotor 61 and the stator 62. The rotor 61 rotates about the rotation axis AX. The stator 62 surrounds the rotor 61.

The rotor 61 includes the rotor shaft 611, the rotor core 612, and rotor magnets 613. The rotor shaft 611 extends in the front-rear direction. The rotor core 612 surrounds the rotor shaft 611. The rotor magnets 613 are fixed in the rotor core 612.

The rotor core 612 is fastened to the rotor shaft 611. The rotor core 612 is cylindrical. The rotor core 612 includes multiple steel plates stacked on one another. The rotor shaft 611 and the rotor core 612 may be formed as a single member. The rotor magnets 613 are permanent magnets. Four rotor magnets 613 surround the rotation axis AX. The rotor magnets 613 include first permanent magnets with a first polarity and second permanent magnets with a second polarity. The first permanent magnets and the second permanent magnets are arranged alternately in the circumferential direction.

The rotor shaft 611 is rotatably supported by the front bearing 31 and the rear bearing 32. The front bearing 31 rotatably supports the front portion of the rotor shaft 611. The rear bearing 32 rotatably supports the rear portion of the rotor shaft 611. The rotor shaft 611 has its front end located in the internal space of the gear case 4 through the opening of the bearing holder 41.

The rotor shaft 611 receives the pinion gear 70 at the front end. The rotor shaft 611 connects to the reduction mechanism 7 via the pinion gear 70.

The front bearing 31 is held by the bearing holder 41 in the gear case 4. The bearing holder 41 includes a front support 411 and a spindle support 412. The front support 411 surrounds and supports the front bearing 31. The spindle support 412 surrounds and supports the rear bearing 83. The front support 411 and the spindle support 412 are cylindrical. The spindle support 412 has an inner diameter larger than the front support 411. The spindle support 412 is located in front of the front support 411. A step is defined between the front support 411 and the spindle support 412.

The rear bearing 32 is held by the rear cover 3. The rear cover 3 includes the rear support 311. The rear support 311 surrounds and supports the rear bearing 32. The rear support 311 is cylindrical. The rear bearing 32 is located inside the rear support 311.

The stator 62 includes the stator core 621, the front insulator 622, the rear insulator 623, and the multiple coils 624. The front insulator 622 is located on the front of the stator core 621. The rear insulator 623 is located on the rear of the stator core 621. The coils 624 are wound around the stator core 621 with the front insulator 622 and the rear insulator 623 between them.

The stator 62 further includes a sensor board 63 and a metal plate 64. The sensor board 63 detects the rotation of the rotor 61. The metal plate 64 is connected to the coils 624. The sensor board 63 includes sensors 633 for detecting the rotation of the rotor 61. The metal plate 64 is a conductive member connected to the coils 624.

The stator core 621 includes multiple steel plates stacked on one another. The steel plates are metal plates formed from iron as a main component. The stator core 621 is cylindrical. The stator core 621 has multiple teeth 621T to support the coils 624. Each tooth 621T protrudes radially inward from the inner surface of the stator core 621. The stator 62 in the embodiment includes six coils 624. The stator core 621 has six teeth 621T.

The front insulator 622 and the rear insulator 623 are electrical insulating members formed from a synthetic resin. The front insulator 622 and the rear insulator 623 are cylindrical.

The front insulator 622 has multiple protrusions 622T to support the coils 624. The protrusions 622T protrude radially inward from the inner surface of the front insulator 622. The front insulator 622 has six protrusions 622T.

The rear insulator 623 has multiple protrusions 623T to support the coils 624. The protrusions 623T protrude radially inward from the inner surface of the rear insulator 623. The rear insulator 623 has six protrusions 623T.

Each tooth 621T has a front end connecting to the rear end of the protrusion 622T. Each tooth 621T has a rear end connecting to the front end of the protrusion 623T. Each coil 624 surrounds the tooth 621T, the protrusion 622T, and the protrusion 623T. The coils 624 and the stator core 621 are electrically insulated from each other with the front insulator 622 and the rear insulator 623 between them.

The coil 624 includes a wound single wire. As shown in FIGS. 19 and 20, the wire starts being wound around the tooth 621T at a winding start 625S. The wire is sequentially wound around each of the circumferentially adjacent teeth 621T to form the six coils 624. The wire ends being wound at a winding end 625E.

The circumferentially adjacent coils 624 are connected with a connection wire 625, which is a part of the wire. The connection wire 625 extends between one coil 624 and another coil 624. The connection wire 625 is supported by fuse terminals 643 (described later).

The sensor board 63 is located rearward from the rear insulator 623. The sensor board 63 faces the rear insulator 623. The sensor board 63 includes an annular plate 631, screw bosses 632, the sensors 633, and signal lines 634. The screw bosses 632 protrude radially outward from the peripheral edge of the plate 631. The sensors 633 are supported on the plate 631. The signal lines 634 receive detection signals output from the sensors 633.

The plate 631 surrounds the rotor shaft 611. A sleeve 35 is located inside the plate 631 to support the plate 631. The sleeve 35 surrounds the rotor shaft 611. The plate 631 surrounds the rotor shaft 611 with the sleeve 35 between them.

The sensors 633 detect the positions of the rotor magnets 613 to detect the position of the rotor 61 in the rotation direction. The sensors 633 each include a Hall device. The sensor board 63 includes three sensors 633. The detection signals from the sensors 633 are output to the controller 13 through the signal lines 634. The controller 13 provides a drive current to the coils 624 based on the detection signals from the sensors 633.

The metal plate 64 is located at least partially rearward from the sensor board 63. The metal plate 64 is connected to the coils 624 through the connection wire 625. The metal plate 64 connects the coils 624 and the battery pack 17. The battery pack 17 serves as a power supply for the motor 6. The battery pack 17 provides a drive current to the motor 6. The controller 13 controls the drive current provided from the battery pack 17 to the motor 6. The motor 6 includes power lines 642 connected to the battery pack 17 via the controller 13. The battery pack 17 provides a drive current to the metal plate 64 through the power lines 642.

The metal plate 64 includes at least one of the fuse terminals 643 or short-circuiting members 644. The fuse terminals 643 are connected to the coils 624. The short-circuiting members 644 connect the fuse terminals 643 and the power lines 642. The fuse terminals 643 in the embodiment are connected to the connection wire 625. The fuse terminals 643 are connected to the coils 624 through the connection wire 625.

The fuse terminals 643 surround the rotation axis AX. The fuse terminals 643 are as many as the coils 624. The metal plate 64 in the embodiment includes six fuse terminals 643.

As shown in FIG. 20, each short-circuiting member 644 connects (short-circuits) paired fuse terminals 643. The short-circuiting member 644 connects each power line 642 and the pair of fuse terminals 643. The short-circuiting member 644 is curved in a plane orthogonal to the rotation axis AX. The metal plate 64 in the embodiment includes three short-circuiting members 644.

The drive current provided from the battery pack 17 to the power lines 642 is fed to the fuse terminals 643 via the short-circuiting members 644. The drive current fed to the fuse terminals 643 are fed to the coils 624 through the connection wire 625.

The motor 6 in the embodiment includes an annular insulating member 641 that supports the short-circuiting members 644. The insulating member 641 is formed from a synthetic resin. The insulating member 641 surrounds the rotor shaft 611 and the rear bearing 32. The insulating member 641 supports the power lines 642 and the short-circuiting members 644. In the embodiment, the short-circuiting members 644 are at least partially located in the insulating member 641. Each short-circuiting member 644 is held on (fixed to) the insulating member 641 by insert molding. The fuse terminals 643 are supported on the insulating member 641 with the short-circuiting members 644 between them. The insulating member 641 insulates the three short-circuiting members 644 to prevent electrical connection.

The fuse terminals 643 are located at least partially frontward from the short-circuiting members 644 and the insulating member 641. Each fuse terminal 643 has its rear connected to the short-circuiting member 644. Each fuse terminal 643 in the embodiment has the rear received in an opening 648 in the short-circuiting member 644. The fuse terminal 643 has a middle portion bent radially outward.

The fuse terminals 643 are supported on the rear insulator 623. The rear insulator 623 in the embodiment includes supports 626 for supporting the fuse terminals 643. Six supports 626 are arranged circumferentially at intervals about the rotation axis AX. Each support 626 has a pair of protrusions 626T protruding rearward from the rear surface of the rear insulator 623. The protrusions 626T have a first opposing surface, a second opposing surface, and an inner surface. The first opposing surface faces the peripheral edge of one surface of the fuse terminal 643. The second opposing surface faces the peripheral edge of the other surface of the fuse terminal 643. The inner surface connects the first opposing surface and the second opposing surface. The fuse terminal 643 is held between the pair of protrusions 626T and is thus supported by the support 626.

As described above, the metal plate 64 includes the six fuse terminals 643, whereas the rear insulator 623 includes the six supports 626. The six fuse terminals 643 are arranged in the circumferential direction of the rear insulator 623.

The connection wire 625 is supported on the supports 626. The connection wire 625 is supported on the radially outer surface of each protrusion 626T. The fuse terminal 643 is connected to the connection wire 625 protruding from the coil 624 while being held between the pair of protrusions 626T. The connection wire 625 is located inside the bent portion of the fuse terminal 643. The fuse terminal 643 and the connection wire 625 are welded together. The fuse terminal 643 is connected to the coil 624 through the connection wire 625.

In the embodiment, the drive current includes a U-phase drive current, a V-phase drive current, and a W-phase drive current.

As shown in FIGS. 17, 19, and 20, the power lines 642 include a U-phase power line 642U, a V-phase power line 642V, and a W-phase power line 642W. The U-phase power line 642U receives a U-phase drive current. The V-phase power line 642V receives a V-phase drive current. The W-phase power line 642W receives a W-phase drive current.

Each short-circuiting member 644 includes a U-phase short-circuiting member 644U, a V-phase short-circuiting member 644V, and a W-phase short-circuiting member 644W. The U-phase short-circuiting member 644U is connected to the U-phase power line 642U. The V-phase short-circuiting member 644V is connected to the V-phase power line 642V. The W-phase short-circuiting member 644W is connected to the W-phase power line 642W.

Each fuse terminal 643 includes a pair of (or first and second) U-phase fuse terminals 643U, a pair of (or first and second) V-phase fuse terminals 643V, and a pair of (or first and second) W-phase fuse terminals 643W. The pair of U-phase fuse terminals 643U are connected to the U-phase short-circuiting member 644U. The pair of V-phase fuse terminals 643V are connected to the V-phase short-circuiting member 644V. The pair of W-phase fuse terminals 643W are connected to the W-phase short-circuiting member 644W.

The six coils 624 are connected as U (U-V) phase, V (V-W) phase, and W (W-U) phase. A pair of coils 624 are assigned to each of the U, V, and W phases.

The six coils 624 include a pair of U-phase coils 624U assigned to the U-phase, a pair of V-phase coils 624V assigned to the V-phase, and a pair of W-phase coils 624W assigned to the W-phase.

The paired U-phase coils 624U face each other in the radial direction. The paired V-phase coils 624V face each other in the radial direction. The paired W-phase coils 624W face each other in the radial direction. As shown in FIG. 19, a V-phase coil 624V1 is located circumferentially adjacent to a U-phase coil 624U1. A W-phase coil 624W1 is located adjacent to the V-phase coil 624V1. A U-phase coil 624U2 is located adjacent to the W-phase coil 624W1. A V-phase coil 624V2 is located adjacent to the U-phase coil 624U2. A W-phase coil 624W2 is located adjacent to the V-phase coil 624V2.

As shown in FIG. 19, the first U-phase fuse terminal 643U is connected to the connection wire 625 connecting the circumferentially adjacent U-phase coil 624U1 and V-phase coil 624V1. The second U-phase fuse terminal 643U is connected to the connection wire 625 connecting the circumferentially adjacent U-phase coil 624U2 and V-phase coil 624V2.

The first V-phase fuse terminal 643V is connected to the connection wire 625 connecting the circumferentially adjacent V-phase coil 624V1 and W-phase coil 624W1. The second V-phase fuse terminal 643V is connected to the connection wire 625 connecting the circumferentially adjacent V-phase coil 624V2 and W-phase coil 624W2.

The first W-phase fuse terminal 643W is connected to the connection wire 625 connecting the circumferentially adjacent W-phase coil 624W1 and U-phase coil 624U2. The second W-phase fuse terminal 643W is connected to the connection wire 625 connecting the circumferentially adjacent W-phase coil 624W2 and U-phase coil 624U1.

The U-phase short-circuiting member 644U connects (short-circuits) the U-phase power line 642U to each of the first and second U-phase fuse terminals 643U. The U-phase power line 642U is located at one end of the U-phase short-circuiting member 644U. The first U-phase fuse terminal 643U is located at the other end of the U-phase short-circuiting member 644U. The second U-phase fuse terminal 643U is located in a middle portion of the U-phase short-circuiting member 644U.

The V-phase short-circuiting member 644V connects (short-circuits) the V-phase power line 642V to each of the first and second V-phase fuse terminals 643V. The V-phase power line 642V is located at one end of the V-phase short-circuiting member 644V. The first V-phase fuse terminal 643V is located at the other end of the V-phase short-circuiting member 644V. The second V-phase fuse terminal 643V is located in a middle portion of the V-phase short-circuiting member 644V.

The W-phase short-circuiting member 644W connects (short-circuits) the W-phase power line 642W to each of the first and second W-phase fuse terminals 643W. The W-phase power line 642W is located at one end of the W-phase short-circuiting member 644W. The first W-phase fuse terminal 643W is located at the other end of the W-phase short-circuiting member 644W. The second W-phase fuse terminal 643W is located in a middle portion of the W-phase short-circuiting member 644W.

As shown in FIG. 20, a set of the U-phase coil 624U1, the V-phase coil 624V1, and the W-phase coil 624W1 are delta-connected to one another. Another set of the U-phase coil 624U2, the V-phase coil 624V2, and the W-phase coil 624W2 are delta-connected to one another. These delta-connections are arranged in parallel.

When receiving a U-phase drive current, the U-phase power line 642U feeds the U-phase drive current to each of the first and second U-phase fuse terminals 643U through the U-phase short-circuiting member 644U. When one U-phase coil 624U1 is magnetized to the N pole, the other U-phase coil 624U2 is magnetized to the S pole. The V-phase coil 624V1 adjacent to the U-phase coil 624U1 magnetized to the N pole is magnetized to the S pole. The V-phase coil 624V2 adjacent to the U-phase coil 624U2 magnetized to the S pole is magnetized to the N pole.

When receiving a V-phase drive current, the V-phase power line 642V feeds the V-phase drive current to each of the first and second V-phase fuse terminals 643V through the V-phase short-circuiting member 644V. When one V-phase coil 624V1 is magnetized to the N pole, the other V-phase coil 624V2 is magnetized to the S pole. The W-phase coil 624W1 adjacent to the V-phase coil 624V1 magnetized to the N pole is magnetized to the S pole. The W-phase coil 624W2 adjacent to the V-phase coil 624V2 magnetized to the S pole is magnetized to the N pole.

When receiving a W-phase drive current, the W-phase power line 642W feeds the W-phase drive current to each of the first and second W-phase fuse terminals 643W through the W-phase short-circuiting member 644W. When one W-phase coil 624W1 is magnetized to the N pole, the other W-phase coil 624W2 is magnetized to the S pole. The U-phase coil 624U1 adjacent to the W-phase coil 624W1 magnetized to the N pole is magnetized to the S pole. The U-phase coil 624U2 adjacent to the W-phase coil 624W2 magnetized to the S pole is magnetized to the N pole.

The insulating member 641 supporting the short-circuiting members 644, the sensor board 63, and the rear insulator 623 are fastened together with four screws 65.

The insulating member 641 includes an annular body 645, four screw bosses 646, and one support 649. The four screw bosses 646 protrude radially outward from the peripheral edge of the body 645. The support 649 protrudes radially outward from the peripheral edge of the body 645. Each screw boss 646 has an opening 647 for receiving a middle portion of the screw 65. The support 649 supports the power lines 642.

Each screw boss 632 on the sensor board 63 has an opening 635 for receiving the middle portion of the screw 65. The rear insulator 623 has four screw holes 627 on its rear surface. The screw 65 has its distal end engageable with the screw hole 627 with the middle portion being placed through the openings 647 and 635. In the embodiment, the insulating member 641, the sensor board 63, and the rear insulator 623 are fastened with the screws 65 to allow the signal lines 634 and at least parts of the power lines 642 to be aligned with each other circumferentially about the rotation axis AX.

The metal plate 64 including the fuse terminals 643 and the short-circuiting members 644 surrounds the rear bearing 32. As shown in FIGS. 12, 13, and 18, the rear bearing 32 at least partially overlaps the metal plate 64 in the axial direction along the rotation axis AX.

As shown in FIG. 13, the fuse terminals 643 at least partially surround the rear bearing 32. The six fuse terminals 643 are arranged in the circumferential direction of the rear insulator 623. The short-circuiting members 644 at least partially surround the rear bearing 32. The rear bearing 32 is located inside the insulating member 641.

As shown in FIG. 13, the rear bearing 32 at least partially overlaps the fuse terminals 643 in the axial direction along the rotation axis AX. The rear bearing 32 at least partially overlaps the short-circuiting members 644 in the axial direction along the rotation axis AX. The rear bearing 32 at least partially overlaps the insulating member 641 in the axial direction along the rotation axis AX.

The rear bearing 32 is supported by the rear support 311 on the rear cover 3. The rear support 311 is located inside the insulating member 641. The rear support 311 at least partially overlaps the fuse terminals 643 in the axial direction along the rotation axis AX. The rear support 311 at least partially overlaps the short-circuiting members 644 in the axial direction along the rotation axis AX. The rear support 311 at least partially overlaps the insulating member 641.

The peripheral wall 312 of the rear cover 3 is located radially outside the rear support 311. The peripheral wall 312 at least partially overlaps the fuse terminals 643 in the axial direction along the rotation axis AX. The peripheral wall 312 at least partially overlaps the short-circuiting members 644 in the axial direction along the rotation axis AX. The peripheral wall 312 at least partially overlaps the insulating member 641 in the axial direction along the rotation axis AX.

In the embodiment, the rear bearing 32 at least partially overlaps the metal plate 64 in the axial direction along the rotation axis AX. The power tool 1 can thus be smaller in the front-rear direction.

The metal plate 64 at least partially surrounds the rear bearing 32. The rear bearing 32 and the metal plate 64 are concentric with each other to reduce the likelihood of the motor compartment 21 being upsized in the radial direction.

In the embodiment, the short-circuiting members 644 are at least partially supported on the annular insulating member 641. The rear bearing 32 is located inside the insulating member 641. The power tool 1 can thus be smaller in the front-rear direction.

The rear support 311 at least partially overlaps the short-circuiting members 644 and the fuse terminals 643 in the axial direction along the rotation axis AX. The power tool 1 can thus be effectively smaller in the front-rear direction.

The peripheral wall 312 at least partially overlaps the short-circuiting members 644 and the fuse terminals 643 in the axial direction along the rotation axis AX. The power tool 1 can thus be effectively smaller in the front-rear direction.

Fan and Gear Case

As shown in FIGS. 12 to 18, the fan 12 is located frontward from the stator 62 in the motor 6. The fan 12 is fixed to a portion of the rotor shaft 611 frontward from the stator 62. The fan 12 generates an airflow for cooling the motor 6. The fan 12 is fastened to a front portion of the rotor shaft 611 with a bush 33. The fan 12 is located between the rotor core 612 and the front bearing 31. The fan 12 rotates as the rotor 61 rotates. As the rotor shaft 611 rotates, the fan 12 rotates together with the rotor shaft 611. Thus, air outside the housing 2 flows into the internal space of the housing 2 through the inlets 19. Air flowing into the internal space of the housing 2 flows through the internal space of the housing 2 and cools the motor 6. The air then flows out of the housing 2 through the outlets 20.

The fan 12 is a centrifugal fan. The fan 12 includes a cylindrical portion 131, a plate 132, and multiple blades 133. The cylindrical portion 131 surrounds the rotor shaft 611. The plate 132 surrounds the cylindrical portion 131. The plate 132 has its rear surface receiving the blades 133.

The plate 132 has a peripheral edge 134 and a recess 135 on its front surface. The recess 135 is located radially inside the peripheral edge 134. The recess 135 is recessed rearward. The recess 135 has an inner surface that tapers radially inward toward the rear.

The front bearing 31 at least partially overlaps the fan 12 in the axial direction along the rotation axis AX. The front bearing 31 is received at least partially in the recess 135. The front bearing 31 is not in contact with the fan 12.

The bearing holder 41 holds the front bearing 31 and the rear bearing 83. The bearing holder 41 includes the front support 411 and the spindle support 412. The front support 411 supports the front bearing 31. The spindle support 412 supports the rear bearing 83. The front support 411 partially defines a cylindrical inner surface on the bearing holder 41. The spindle support 412 partially defines a cylindrical inner surface on the bearing holder 41. The front support 411 surrounds and supports the front bearing 31. The spindle support 412 surrounds and supports the rear bearing 83. The spindle support 412 has an inner diameter larger than the front support 411. The spindle support 412 is located in front of the front support 411. A step is defined between the front support 411 and the spindle support 412.

The bearing holder 41 is located at the rear of the gear case 4. The bearing holder 41 is at least partially received in the motor compartment 21. The bearing holder 41 in the gear case 4 at least partially overlaps the fan 12 in the axial direction along the rotation axis AX. The front support 411 at least partially overlaps the fan 12 in the axial direction along the rotation axis AX. The front support 411 is at least partially received in the recess 135 on the fan 12. The front support 411 is not in contact with the fan 12.

As shown in FIGS. 8, 12, and 13, the bearing holder 41 in the gear case 4 has a first outer peripheral surface 413, a second outer peripheral surface 414, and a connecting surface 415. The first outer peripheral surface 413 is located inside the motor compartment 21. The second outer peripheral surface 414 is located inside the motor compartment 21 and more outward than the first outer peripheral surface 413 in the radial direction about the rotation axis AX. The connecting surface 415 connects the front end of the first outer peripheral surface 413 and the rear end of the second outer peripheral surface 414.

The first outer peripheral surface 413 is parallel to the rotation axis AX. The second outer peripheral surface 414 is parallel to the rotation axis AX. The second outer peripheral surface 414 is located frontward from the first outer peripheral surface 413. The connecting surface 415 is orthogonal to the rotation axis AX. The connecting surface 415 faces rearward. A step is defined between the first outer peripheral surface 413 and the second outer peripheral surface 414.

As shown in FIGS. 7, 12, and 13, the motor compartment 21 has a first inner peripheral surface 215, a second inner peripheral surface 216, and an opposing surface 217. The first inner peripheral surface 215 is in contact with the first outer peripheral surface 413. The second inner peripheral surface 216 is in contact with the second outer peripheral surface 414. The opposing surface 217 faces the connecting surface 415. The opposing surface 217 faces rearward. The connecting surface 415 is in contact with the opposing surface 217. The opposing surface 217 may be at least partially separate from the connecting surface 415.

In the embodiment, the front bearing 31 at least partially overlaps the fan 12 in the axial direction along the rotation axis AX. The power tool 1 can thus be smaller in the front-rear direction.

The plate 132 in the fan 12 has the recess 135 recessed rearward on the front surface. The front bearing 31 is received at least partially in the recess 135. The front bearing 31 thus at least partially overlaps the fan 12 in the axial direction along the rotation axis AX.

The gear case 4 at least partially overlaps the fan 12 in the axial direction along the rotation axis AX. In the embodiment, the front support 411 in the gear case 4 at least partially overlaps the fan 12. The power tool 1 can thus be smaller in the front-rear direction.

The gear case 4 has the first outer peripheral surface 413, the second outer peripheral surface 414, and the connecting surface 415. The motor compartment 21 has the first inner peripheral surface 215 in contact with the first outer peripheral surface 413, the second inner peripheral surface 216 in contact with the second outer peripheral surface 414, and the opposing surface 217 facing the connecting surface 415. The first outer peripheral surface 413 in contact with the first inner peripheral surface 215 and the second outer peripheral surface 414 in contact with the second inner peripheral surface 216 allow the motor compartment 21 and the gear case 4 to be positioned appropriately with each other in the radial direction about the rotation axis AX. The motor compartment 21 has the first inner peripheral surface 215 and the second inner peripheral surface 216 both in contact with the gear case 4, thus having improved rigidity.

Reduction Mechanism and Impact Mechanism

Figure 21:
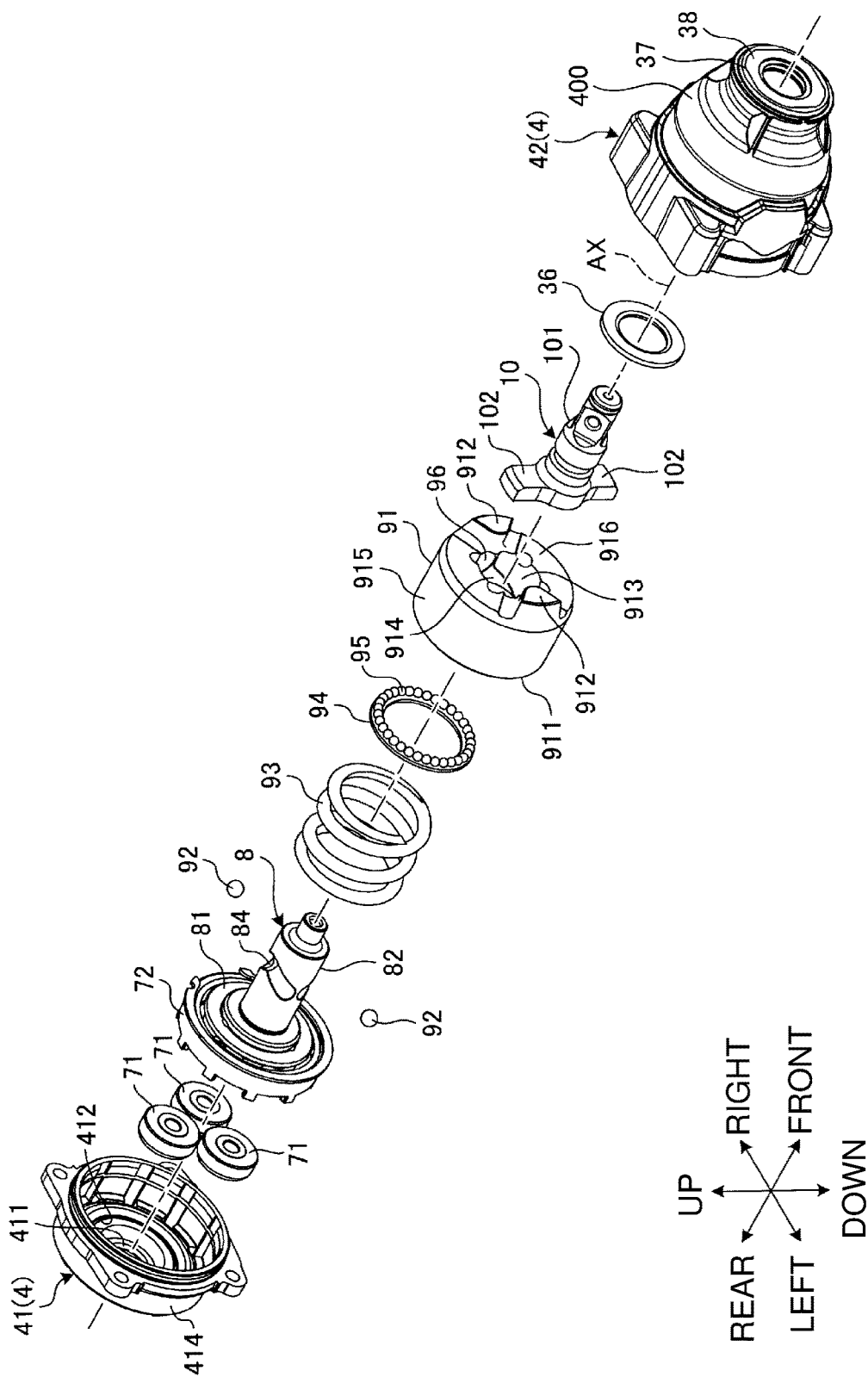
FIG. 21 is an exploded perspective view of a reduction mechanism and an impact mechanism in the embodiment as viewed from the front.

FIG. 21 is an exploded perspective view of the reduction mechanism 7 and the impact mechanism 9 in the embodiment as viewed from the front. As shown in FIGS. 12, 13, and 21, the reduction mechanism 7 is located frontward from the motor 6. The reduction mechanism 7 includes a planetary gear assembly including multiple gears. The reduction mechanism 7 connects the rotor shaft 611 and the spindle 8 together. The reduction mechanism 7 transmits a rotational force generated by the motor 6 to the spindle 8. The rotor 61 rotates to drive the gears in the reduction mechanism 7. The reduction mechanism 7 rotates the spindle 8 at a lower rotational speed than the rotor shaft 611.

The reduction mechanism 7 includes multiple planetary gears 71 and an internal gear 72. The planetary gears 71 surround the pinion gear 70. The internal gear 72 surrounds the planetary gears 71. The reduction mechanism 7 in the embodiment includes three planetary gears 71. Each planetary gear 71 meshes with the pinion gear 70. The planetary gears 71 are rotatably supported by the spindle 8 via a pin 73. The internal gear 72 has internal teeth that mesh with the planetary gears 71. The internal gear 72 is fixed to the bearing holder 41 in the gear case 4. The internal gear 72 is nonrotatable relative to the gear case 4.

When the rotor shaft 611 rotates as driven by the motor 6, the pinion gear 70 rotates, and the planetary gears 71 revolve about the pinion gear 70. The planetary gears 71 revolve while meshing with the internal teeth on the internal gear 72. The revolving planetary gears 71 rotate the spindle 8, connected to the planetary gears 71 via the pin 73, at a lower rotational speed than the rotor shaft 611.

The spindle 8 is located frontward from the motor 6. The spindle 8 is located at least partially frontward from the reduction mechanism 7. The spindle 8 includes the flange 81 and the rod 82. The rod 82 protrudes frontward from the flange 81. The rod 82 extends in the front-rear direction. The planetary gears 71 are rotatably supported by the flange 81 via the pin 73.

The spindle 8 rotates with a rotational force generated by the motor 6. The spindle 8 rotates about the rotation axis AX. The spindle 8 is rotatably supported by the rear bearing 83. The rear bearing 83 is held by the bearing holder 41. The rear bearing 83 supports the rear end of the spindle 8.

The impact mechanism 9 strikes the anvil 10 in the rotation direction in response to rotation of the spindle 8. The impact mechanism 9 includes the hammer 91, the balls 92, the spring 93, and a washer 94. The hammer 91 is supported by the spindle 8 in a manner movable in the front-rear direction and in the rotation direction. The balls 92 are placed between the spindle 8 and the hammer 91. The spring 93 urges the hammer 91 forward. The washer 94 is supported by the hammer 91 with balls 95.

The hammer 91 is located frontward from the reduction mechanism 7. The hammer 91 includes a cylindrical hammer body 911 and hammer protrusions 912. The hammer protrusions 912 are located at the front of the hammer body 911. The hammer body 911 surrounds the rod 82 of the spindle 8. The hammer body 911 has a hole 913 for receiving the rod 82 of the spindle 8. The hammer 91 has two hammer protrusions 912. The hammer protrusions 912 protrude frontward from the front of the hammer body 911.

The hammer 91 is rotatable together with the spindle 8. The hammer 91 is movable relative to the spindle 8 in the front-rear direction and in the rotation direction. The hammer 91 rotates about the rotation axis AX.

The hammer body 911 includes an inner cylinder 914, an outer cylinder 915, and a base 916. The inner cylinder 914 surrounds the rod 82. The inner cylinder 914 has an inner surface in contact with the outer surface of the rod 82. The outer cylinder 915 is located radially outside the inner cylinder 914. The base 916 is connected to the front end of the inner cylinder 914 and to the front end of the outer cylinder 915. The hammer protrusions 912 protrude frontward from the front surface of the base 916.

The inner cylinder 914, the outer cylinder 915, and the base 916 define a recess 917. The recess 917 is recessed frontward from the rear end of the hammer 91. The recess 917 is annular in a plane orthogonal to the rotation axis AX.

The balls 92 are placed between the rod 82 of the spindle 8 and the hammer 91. The balls 92 are formed from a metal such as steel. The spindle 8 has a spindle groove 84 to receive at least parts of the balls 92. The spindle groove 84 is formed on the outer surface of the rod 82. The hammer 91 has a hammer groove 96 to receive at least parts of the balls 92. The hammer groove 96 is formed on the inner surface of the inner cylinder 914 in the hammer 91. The balls 92 are placed between the spindle groove 84 and the hammer groove 96. The balls 92 roll along the spindle groove 84 and the hammer groove 96. The hammer 91 is movable together with the balls 92.

The spindle 8 and the hammer 91 are movable relative to each other in the front-rear direction and in the rotation direction within a movable range defined by the spindle groove 84 and the hammer groove 96. The hammer 91 is supported by the spindle 8 in a manner movable in the front-rear direction and in the rotation direction.

The washer 94 is supported by the hammer 91 with the balls 95. The washer 94 is received in the recess 917. The washer 94 surrounds the inner cylinder 914 in the hammer 91.

The balls 95 are placed between the front surface of the washer 94 and the rear surface of the base 916. The balls 95 surround the rotation axis AX. The rear surface of the base 916 has a recess 918. The recess 918 is semicircular in a cross-section including the rotation axis AX. The recess 918 is annular in a plane orthogonal to the rotation axis AX. The balls 95 are received in the recess 918 to surround the rotation axis AX.

The spring 93 is a coil spring. The spring 93 surrounds the rotation axis AX of the spindle 8. The spring 93 in the embodiment at least partially surrounds the inner cylinder 914 in the hammer 91. The spring 93 at least partially surrounds the rod 82 of the spindle 8. The spring 93 constantly urges the hammer 91 forward. The spring 93 in a compressed state is located between the hammer 91 and the flange 81.

The spring 93 has a front portion received in the recess 917. The front end of the spring 93 is in contact with the rear surface of the washer 94. The rearend of the spring 93 is in contact with the front surface of the flange 81. The spring 93 urges the hammer 91 forward with the washer 94 between them.

The anvil 10 is located at least partially frontward from the hammer 91. The anvil 10 rotates about the rotation axis AX with a rotational force transmitted from the motor 6. The anvil 10 is rotatable together with or relative to the spindle 8. The anvil 10 is rotatable together with or relative to the hammer 91. The anvil 10 is rotatably supported by the front bearing 50. The front bearing 50 is held by the gear case 4 with a sleeve 37 between them. The anvil 10 is struck by the hammer 91 in the rotation direction. A stop ring 38 is located in front of the front bearing 50.

The anvil 10 includes the rod-like anvil body 101 and the anvil protrusions 102 on the rear of the anvil body 101. The anvil body 101 extends in the axial direction. The tip tool is attached to the front end of the anvil body 101. The anvil 10 includes two anvil protrusions 102. The anvil protrusions 102 protrude radially outward from the rear of the anvil body 101. A bush 36 is located between the front surfaces of the anvil protrusions 102 and the front bearing 50.

The anvil 10 has the hole 103 for receiving the front end of the rod 82. The hole 103 is located in the rear end of the anvil 10. The front end of the rod 82 is received in the hole 103. The spindle 8 thus serves as a bearing for the anvil 10 and the anvil 10 serves as a bearing for the spindle 8.

Operation of Power Tool

The operation of the power tool 1 will now be described. For example, to tighten a nut on a workpiece, a tip tool for the work is attached to the distal end of the anvil 10. The operator then grips the grip 22 and operates the trigger switch 14. Thus, power is provided from the battery pack 17 to the motor 6 through the controller 13 to drive the motor 6. As the motor 6 is driven, the rotor shaft 611 rotates. The rotational force of the rotor shaft 611 is then transmitted to the planetary gears 71 via the pinion gear 70. The planetary gears 71 revolve about the pinion gear 70 while rotating and meshing with the internal teeth on the internal gear 72. The planetary gears 71 are rotatably supported by the spindle 8 via the pin 73. The revolving planetary gears 71 rotate the spindle 8 at a lower rotational speed than the rotor shaft 611.

As the spindle 8 rotates, the anvil 10 rotates. The rotation is used to tighten the nut with the tip tool.

When the anvil 10 receives a higher load while tightening the nut, a rotational force generated by the motor 6 alone may be insufficient to rotate the anvil 10, causing the anvil 10 and the hammer to stop rotating. Although the hammer stops rotating, the spindle 8 continues to rotate with the rotational force generated by the motor 6. When the hammer stops rotating and the spindle 8 rotates, the balls 92 and the hammer 91 move backward. The spring 93 generates an elastic force for moving the hammer 91 forward. The hammer 91 at the rear moves forward under an elastic force from the spring 93 when the hammer protrusions 912 move over the anvil protrusions 102. When moving forward, the hammer 91 receives a force in the rotation direction from the balls 92 and thus moves forward while rotating. When the hammer 91 moves forward while rotating, the anvil 10 is struck by the hammer 91 in the rotation direction. The anvil 10 receives the rotational force from the motor 6 and the inertial force from the hammer 91. The anvil 10 thus rotates with high torque about the rotation axis AX. This allows the nut to be tightened with high torque.

Advantageous Effects

As described above, the rear cover 3 and the motor compartment 21 are fastened together with the first screws 110 in the embodiment. The motor compartment 21 and the gear case 4 are fastened together with the second screws 120. The first screws 110 and the second screws 120 are at different positions in a plane orthogonal to the rotation axis AX. This allows smooth assembly of the rear cover 3 and the motor compartment 21, and smooth assembly of the motor compartment 21 and the gear case 4. The first screws 110 and the second screws 120 are at different positions in the circumferential and radial directions about the rotation axis AX, reducing the likelihood of the power tool 1 being upsized.

The rear cover 3 has the first openings 111 each for receiving the middle portion of the first screw 110. The motor compartment 21 has the first screw holes 112 each for receiving the front end of the first screw 110. The motor compartment 21 has the second openings 121 each for receiving the middle portion of the second screw 120. The gear case 4 has the second screw holes 122 each for receiving the front end of the second screw 120. Each first screw 110 is thus placed through the first opening 111 at the rear of the rear cover 3 into the first screw hole 112. Each second screw 120 is placed through the second opening 121 at the rear of the motor compartment 21 into the second screw hole 122. This allows smooth engagement of the first screw 110 with the first screw hole 112, and smooth engagement of the second screw 120 with the second screw hole 122 using a screwdriver without redirecting the screwdriver.

The motor compartment 21 and the gear case 4 are fastened together with the second screws 120 having the threaded portions 120B engaged with the gear case 4. This structure allows the second screws 120 to receive high torque applied to the gear case 4 during work using the power tool 1.

The motor compartment 21 includes the body 210 and the screw bosses 211 protruding from the outer surface of the body 210 radially outward about the rotation axis AX. The second openings 121 are in the screw bosses 211. The rear cover 3 has, on the outer surface, the first recesses 34 extending in the axial direction along the rotation axis AX. The body 210 has, on the outer surface, the second recesses 214 extending in the axial direction along the rotation axis AX. The screw bosses 211 are located in front of the second recesses 214. The first recesses 34, the second recesses 214, and the second openings 121 are aligned with one another in a plane orthogonal to the rotation axis AX. To engage each second screw 120 with the second screw hole 122 using a screwdriver, the above structure allows the second screw 120 to be rotated with the shaft of the screwdriver received in the first and second recesses 34 and 214. This facilitates smooth engagement of the second screw 120 with the second screw hole 122.

The motor compartment 21 has the left portion 21L (left side surface) located on the left of the rotation axis AX and the right portion 21R (right side surface) located on the right of the rotation axis AX. The first screws 110 are at positions other than the left portion 21L and the right portion 21R in the circumferential direction about the rotation axis AX. Similarly, the second screws 120 are at positions other than the left portion 21L and the right portion 21R in the circumferential direction about the rotation axis AX. More specifically, the first screws 110 and the second screws 120 are located above and below the side surfaces (right and left side surfaces) of the motor compartment 21. This reduces the likelihood of the motor compartment 21 and the gear case 4 being upsized in the lateral direction. The first screws 110 and the second screws 120 are arranged at the positions other than the left portion 21L and the right portion 21R of the motor compartment 21. This provides a space for appropriate placement of a logotype or a label on the surface of the left portion 21L and the surface of the right portion 21R of the motor compartment 21.

The first screws 110 and the second screws 120 are at substantially equal positions in the vertical direction. This facilitates smooth engagement of the first screws 110 with the first screw holes 112, and smooth engagement of the second screws 120 with the second screw holes 122. The first screws 110 and the second screws 120 may be at different positions in the vertical direction.

The first screws 110 and the second screws 120 are located below the upper end 21T of the motor compartment 21. This reduces the likelihood of the rear cover 3, motor compartment 21, and the gear case 4 being upsized in the vertical direction. The screw bosses 211 and the screw bosses 401 do not protrude upward from the upper end 21T of the motor compartment 21. The operator can thus smoothly work with the power tool 1.

The distance R2 between each of the second screws 120 and the rotation axis AX is longer than the distance R1 between each of the first screws 110 and the rotation axis AX in the radial direction about the rotation axis AX. This allows smooth assembly of the rear cover 3 and the motor compartment 21, and smooth assembly of the motor compartment 21 and the gear case 4. Also, the distance R2 longer than the distance R1 can reduce a reaction force acting on the rear cover 3. The second screws 120 can accommodate a greater reaction force than the first screws 110.

The first screws 110 and the second screws 120 are parallel to each other. This allows smooth assembly of the rear cover 3 and the motor compartment 21, and smooth assembly of the motor compartment 21 and the gear case 4 while reducing the likelihood of the power tool 1 being upsized.

The first screws 110 and the second screws 120 are parallel to the rotation axis AX. This allows smooth assembly of the rear cover 3 and the motor compartment 21, and smooth assembly of the motor compartment 21 and the gear case 4 while reducing the likelihood of the power tool 1 being upsized.

The first screws 110 surround the rotation axis AX. This allows stable fastening between the rear cover 3 and the motor compartment 21 with improved workability. In the embodiment, the rear cover 3 and the motor compartment 21 are fastened together with the four first screws 110. This allows stable fastening between the rear cover 3 and the motor compartment 21 with improved workability.

The four first screws 110 are parallel to one another. This allows each of the four first screws 110 to be smoothly engaged with the first screw hole 112 while reducing the likelihood of the power tool 1 being upsized.

The second screws 120 surround the rotation axis AX. This allows stable fastening between the motor compartment 21 and the gear case 4 with improved workability. In the embodiment, the motor compartment 21 and the gear case 4 are fastened together with the four second screws 120. This allows stable fastening between the motor compartment 21 and the gear case 4 with improved workability.

The four second screws 120 are parallel to one another. This allows each of the four second screws 120 to be smoothly engaged with the second screw hole 122 while reducing the likelihood of the power tool 1 being upsized.

The first screws 110 are at equal distances R1 from the rotation axis AX in the radial direction about the rotation axis AX. This allows stable fastening between the rear cover 3 and the motor compartment 21 with improved workability.

The second screws 120 are at equal distances R2 from the rotation axis AX in the radial direction about the rotation axis AX. This allows stable fastening between the motor compartment 21 and the gear case 4 with improved workability.

The two first screws 1101 are located above the rotation axis AX and the two first screws 1102 are located below the rotation axis AX. This allows stable fastening between the rear cover 3 and the motor compartment 21 with improved workability.

The two second screws 1201 are located above the rotation axis AX and the two second screws 1202 are located below the rotation axis AX. This allows stable fastening between the motor compartment 21 and the gear case 4 with improved workability.

The fan 12 is located frontward from the stator 62. In other words, the fan 12 is not located between the rear cover 3 and the motor compartment 21. This reduces the constraints on the shape and the dimensions of the rear cover 3. Thus, for example, the rear cover 3 can be smaller in the front-rear direction. The power tool 1 can thus be smaller in the front-rear direction.

First Modification

A motor according to a first modification will now be described. The same or corresponding components as those in the above embodiment are given the same reference numerals herein, and will be described briefly or will not be described.

Figure 22:
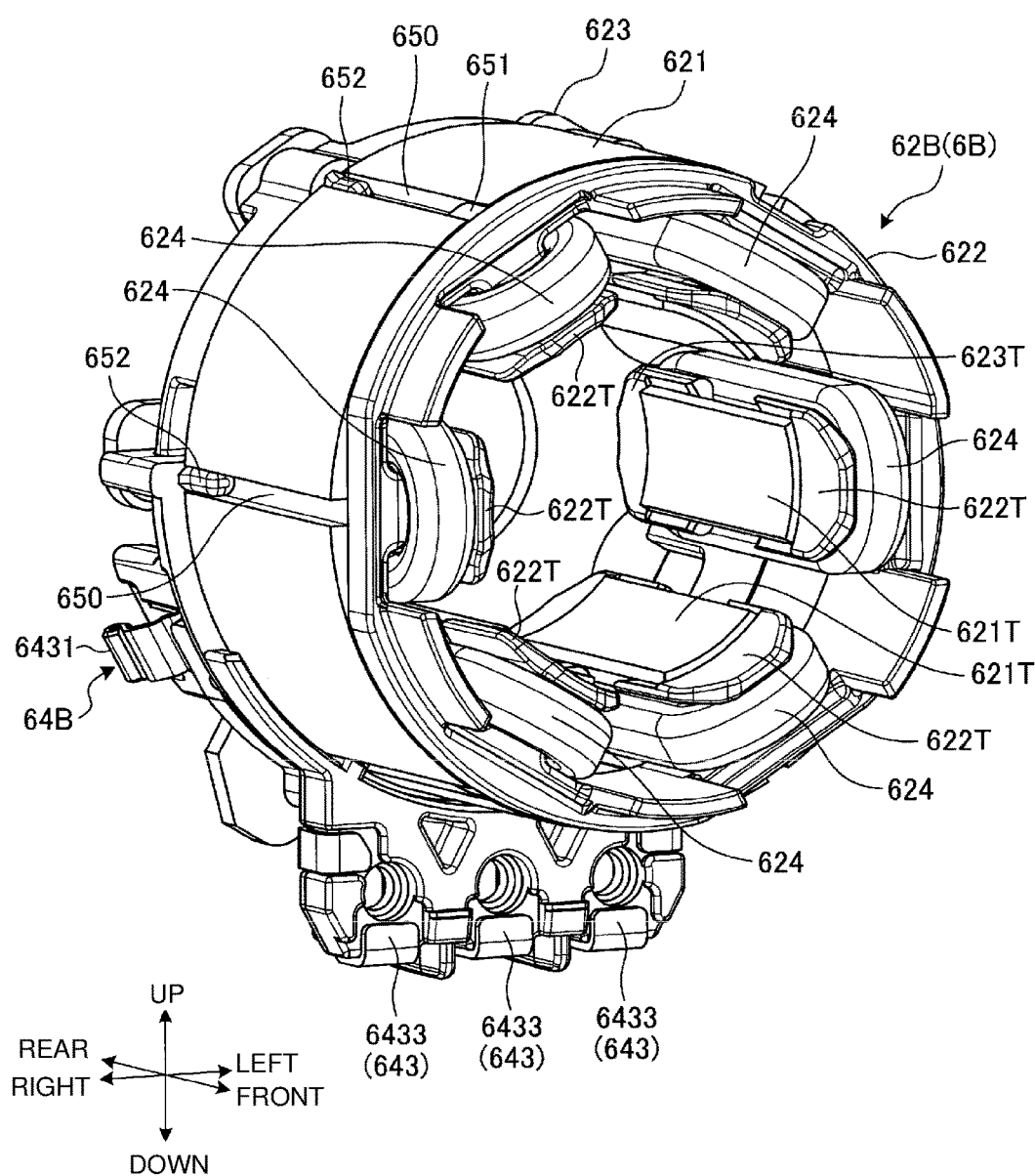
FIG. 22 is a front perspective view of a motor in a first modification.
Figure 23:
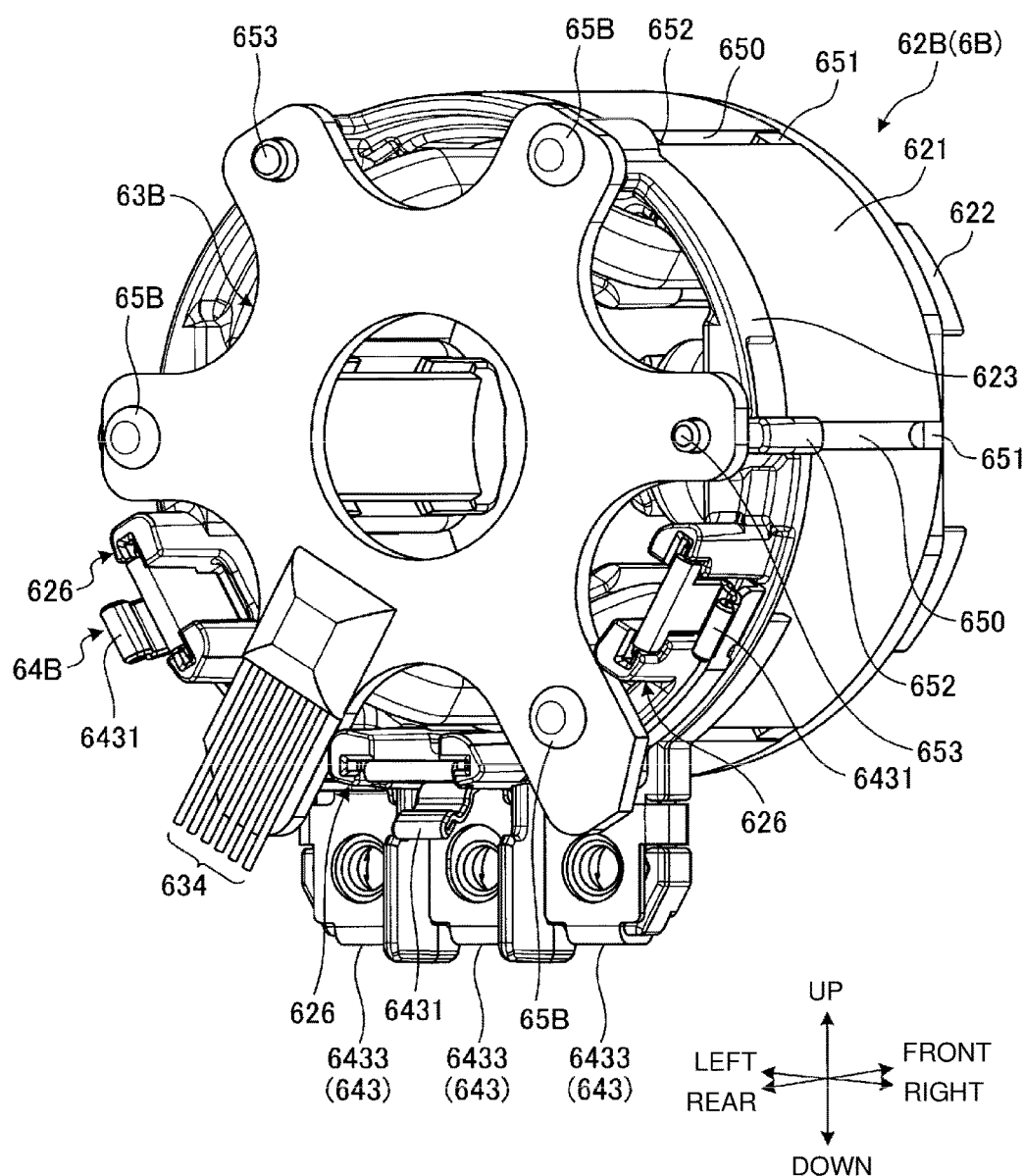
FIG. 23 is a rear perspective view of the motor in the first modification.
Figure 24:
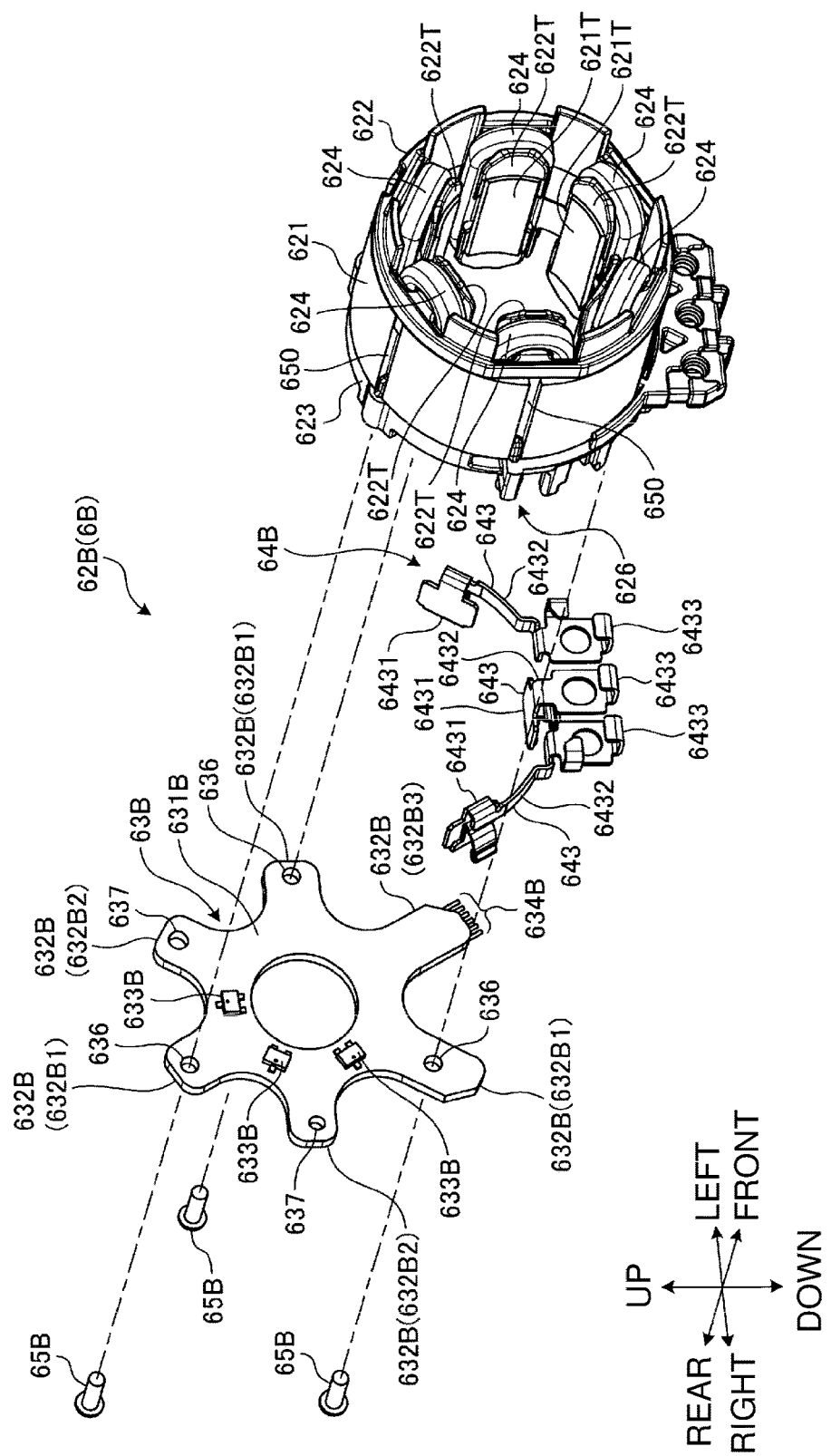
FIG. 24 is an exploded perspective view of the motor in the first modification as viewed from the front.
Figure 25:
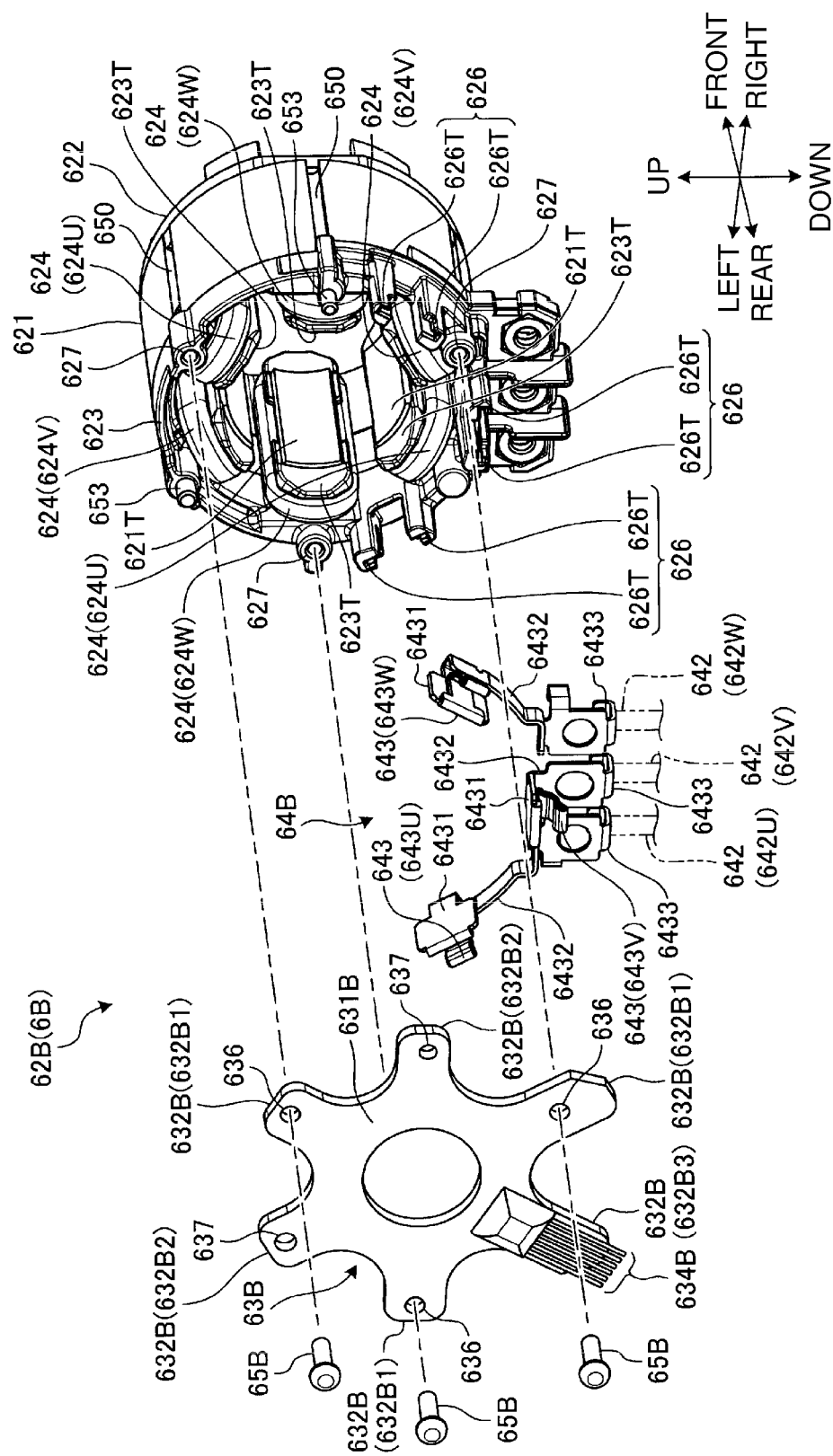
FIG. 25 is an exploded perspective view of the motor in the first modification as viewed from the rear.
Figure 27:
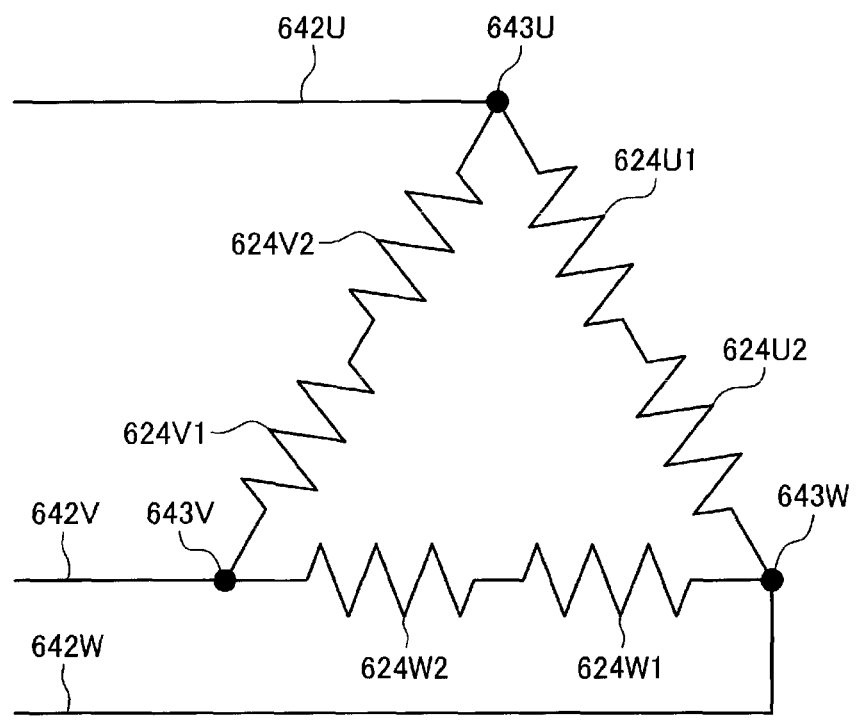
FIG. 27 is a schematic diagram of coils in the first modification, describing connections between them.

FIG. 22 is a front perspective view of a motor 6B in the first modification. FIG. 23 is a rear perspective view of the motor 6B in the first modification. FIG. 24 is an exploded perspective view of the motor 6B in the first modification as viewed from the front. FIG. 25 is an exploded perspective view of the motor 6B in the first modification as viewed from the rear. FIGS. 26A and 26B are schematic diagrams of a stator 62B in the first modification. FIG. 27 is a schematic diagram of the coils 624 in the first modification, describing connections between them. FIGS. 22 to 25 show the stator 62B in the motor 6B. The rotor in the motor 6B is the same as the rotor 61 described in the above embodiment, and thus is not shown in the figures.

The stator 62B includes the stator core 621, the front insulator 622, the rear insulator 623, and the multiple coils 624. The stator core 621 has the teeth 621T. The front insulator 622 has the protrusions 622T. The rear insulator 623 has the protrusions 623T. The coils 624 are attached to the stator core 621 with the front insulator 622 and the rear insulator 623 between them. The stator 62B includes six coils 624. Each coil 624 surrounds the tooth 621T, the protrusion 622T, and the protrusion 623T.

The stator core 621 has grooves 650 on its outer periphery. The grooves 650 extend in the axial direction. Six grooves 650 are located circumferentially at intervals. The front insulator 622 has projections 651 fittable in the grooves 650. The rear insulator 623 has projections 652 fittable in the grooves 650. The projections 651 fitted in the grooves 650 allow fastening between the front insulator 622 and the stator core 621. The projections 652 fitted in the grooves 650 allow fastening between the rear insulator 623 and the stator core 621.

The stator 62B further includes a sensor board 63B and a metal plate 64B. The metal plate 64B includes the fuse terminals 643.

The sensor board 63B is located behind the rear insulator 623. The sensor board 63B faces the rear insulator 623. The sensor board 63B includes an annular plate 631B, protrusions 632B, three sensors 633B, and signal lines 634B. The protrusions 632B protrude radially outward from the peripheral edge of the plate 631B. The three sensors 633B are supported on the plate 631B. The signal lines 634B receive detection signals output from the sensors 633B.

The sensor board 63B has six protrusions 632B. The protrusions 632B include protrusions 632B1 each having an opening 636, protrusions 632B2 each having an opening 637, and a protrusion 632B3. The protrusions 632B include three protrusions 632B1 and two protrusions 632B2. The rear insulator 623 has three screw holes 627. The rear insulator 623 includes two pins 653 protruding rearward. Screws 65B are placed into the openings 636 at the rear of the sensor board 63B. Each screw 65B has its distal end placed into the screw hole 627 with the middle portion of each screw 65B placed through the opening 636 in the protrusion 632B1. The pins 653 are placed into the openings 637 in the protrusions 632B2. The sensor board 63B and the rear insulator 623 are fastened together with three screws 65B.

The fuse terminals 643 surround the rotation axis AX. The fuse terminals 643 in the first modification are fewer than the coils 624. The metal plate 64B includes three fuse terminals 643. The fuse terminals 643 are located frontward from the sensor board 63B.

The fuse terminals 643 include fusing portions 6431 connectable to the coils 624, connectors 6433 connectable to the power lines 642, and joints 6432 connecting the fusing portions 6431 and the connectors 6433.

The metal plate 64B in the first modification includes three fuse terminals 643. In other words, the metal plate 64B includes three fusing portions 6431. As shown in FIG. 25, the three fusing portions 6431 are arranged within a range of 180 degrees or less about the rotation axis AX.

The fusing portions 6431 are supported on the rear insulator 623. The rear insulator 623 includes the supports 626 for supporting the fusing portions 6431. Three supports 626 are located circumferentially at intervals about the rotation axis AX. As shown in FIG. 25, each support 626 has the pair of protrusions 626T protruding rearward from the rear surface of the rear insulator 623. Each fusing portion 6431 is held between the pair of protrusions 626T and is thus supported by the support 626.

The fusing portion 6431 is connected to the connection wire 625 protruding from the coil 624 while being held between the pair of protrusions 626T. The fuse terminals 643 are connected to the coils 624 through the connection wire 625.

FIGS. 26A and 26B are schematic diagrams of the stator 62B in the first modification. FIG. 26A is a rear view of the stator 62B (showing the rear insulator 623). FIG. 26B is a front view of the stator 62B (showing the front insulator 622). FIG. 27 is a schematic diagram of the coils 624 in the first modification, describing connections between them.

As shown in FIGS. 25 to 27, the power lines 642 include the U-phase power line 642U for receiving a U-phase drive current, the V-phase power line 642V for receiving a V-phase drive current, and the W-phase power line 642W for receiving a W-phase drive current.

The fuse terminals 643 include a single U-phase fuse terminal 643U connectable to the U-phase power line 642U, a single V-phase fuse terminal 643V connectable to the V-phase power line 642V, and a single W-phase fuse terminal 643W connectable to the W-phase power line 642W.

The six coils 624 are connected as U (U-V) phase, V (V-W) phase, and W (W-U) phase. A pair of coils 624 are assigned to each of the U, V, and W phases.

The six coils 624 include the pair of U-phase coils 624U assigned to the U-phase, the pair of V-phase coils 624V assigned to the V-phase, and the pair of W-phase coils 624W assigned to the W-phase.

The paired U-phase coil 624U1 and the U-phase coil 624U2 face each other in the radial direction. The paired V-phase coil 624V 1 and the V-phase coil 624V2 face each other in the radial direction. The paired W-phase coil 624W1 and the W-phase coil 624W2 face each other in the radial direction.

The V-phase coil 624V1 is located circumferentially adjacent to the U-phase coil 624U1. The W-phase coil 624W1 is located adjacent to the V-phase coil 624V1. The U-phase coil 624U2 is located adjacent to the W-phase coil 624W1. The V-phase coil 624V2 is located adjacent to the U-phase coil 624U2. The W-phase coil 624W2 is located adjacent to the V-phase coil 624V2.

In the first modification, the paired U-phase coils 624U are connected to each other with a connecting wire 628U. The paired V-phase coils 624V are connected to each other with a connecting wire 628V. The paired W-phase coils 624W are connected to each other with a connecting wire 628W. The connecting wires 628U, 628V, and 628W are supported on the front insulator 622.

The U-phase fuse terminal 643U is connected to the connection wire 625 connecting the circumferentially adjacent U-phase coil 624U1 and V-phase coil 624V1. The V-phase fuse terminal 643V is connected to the connection wire 625 connecting the circumferentially adjacent V-phase coil 624V1 and W-phase coil 624W1. The W-phase fuse terminal 643W is connected to the connection wire 625 connecting the circumferentially adjacent W-phase coil 624W1 and U-phase coil 624U2. The connection wire 625 is supported on the rear insulator 623.

Each coil 624 includes a wound single wire. As shown in FIGS. 26A and 26B, the wire starts being wound around a first tooth 621T1 at the winding start 625S. The wire is wound around the first tooth 621T1 to form the U-phase coil 624U1.

After forming the U-phase coil 624U1 around the first tooth 621T1, the wire is routed, as a connecting wire 628U1, on the front insulator 622. The connecting wire 628U1 is routed from the first tooth 621T 1 toward a fourth tooth 621T4, which faces the first tooth 621T1. The wire is then wound around the fourth tooth 621T4, forming the U-phase coil 624U2.

After forming the U-phase coil 624U2 around the fourth tooth 621T4, the wire is routed, as the connection wire 625, on the rear insulator 623. The connection wire 625 is routed from the fourth tooth 621T4 toward a third tooth 621T3, which is adjacent to the fourth tooth 621T4. The wire is then wound around the third tooth 621T3, forming the W-phase coil 624W1.

After forming the W-phase coil 624W1 around the third tooth 621T3, the wire is routed, as a connecting wire 628W1, on the front insulator 622. The connecting wire 628W1 is routed from the third tooth 621T3 toward a sixth tooth 621T6, which faces the third tooth 621T3. The wire is then wound around the sixth tooth 621T6, forming the W-phase coil 624W2.

After forming the W-phase coil 624W2 around the sixth tooth 621T6, the wire is routed, as a connecting wire 628W2, on the front insulator 622. The connecting wire 628W2 is routed from the sixth tooth 621T6 toward the rear insulator 623 through the third tooth 621T3. The wire is routed on the rear insulator 623, as the connection wire 625, from the third tooth 621T3 toward a second tooth 621T2, which is adjacent to the third tooth 621T3. The wire is then wound around the second tooth 621T2, forming the V-phase coil 624V1.

After forming the V-phase coil 624V1 around the second tooth 621T2, the wire is routed, as a connecting wire 628V1, on the front insulator 622. The connecting wire 628V1 is routed from the second tooth 621T2 toward a fifth tooth 621T5, which faces the second tooth 621T2. The wire is then wound around the fifth tooth 621T5, forming the V-phase coil 624V2.

After forming the V-phase coil 624V2 around the fifth tooth 621T5, the wire is routed, as a connecting wire 628V2, on the front insulator 622. The connecting wire 628V2 is routed from the fifth tooth 621T5 toward the rear insulator 623 through the second tooth 621T2. The wire is routed on the rear insulator 623, as the connection wire 625, from the second tooth 621T2 toward the first tooth 621T1, which is adjacent to the second tooth 621T2 and reaches the winding end 625E.

As shown in FIG. 27, the pair of U-phase coils 624U (624U1 and 624U2), the pair of V-phase coils 624V (624V1 and 624V2), and the pair of W-phase coils 624W (624W1 and 624W2) are delta-connected to one another.

With the U-phase fuse terminal 643U receiving a U-phase drive current, one U-phase coil 624U1 may be magnetized to the N pole and the other U-phase coil 624U2 may be magnetized to the S pole. The V-phase coil 624V1 is magnetized to the S pole, and the V-phase coil 624V2 is magnetized to the N pole.

With the V-phase fuse terminal 643V receiving a V-phase drive current, one V-phase coil 624V1 may be magnetized to the N pole and the other V-phase coil 624V2 may be magnetized to the S pole. The W-phase coil 624W2 is magnetized to the S pole, and the W-phase coil 624W1 is magnetized to the N pole.

With the W-phase fuse terminal 643W receiving a W-phase drive current, one W-phase coil 624W1 may be magnetized to the N pole and the other W-phase coil 624W2 may be magnetized to the S pole. The U-phase coil 624U2 is magnetized to the S pole and the U-phase coil 624U1 is magnetized to the N pole.

The sensor board 63B in the modification is located rearward from the metal plate 64B including the fuse terminals 643. The fuse terminals 643 are located between the sensor board 63B and the rear insulator 623.

Figure 28:
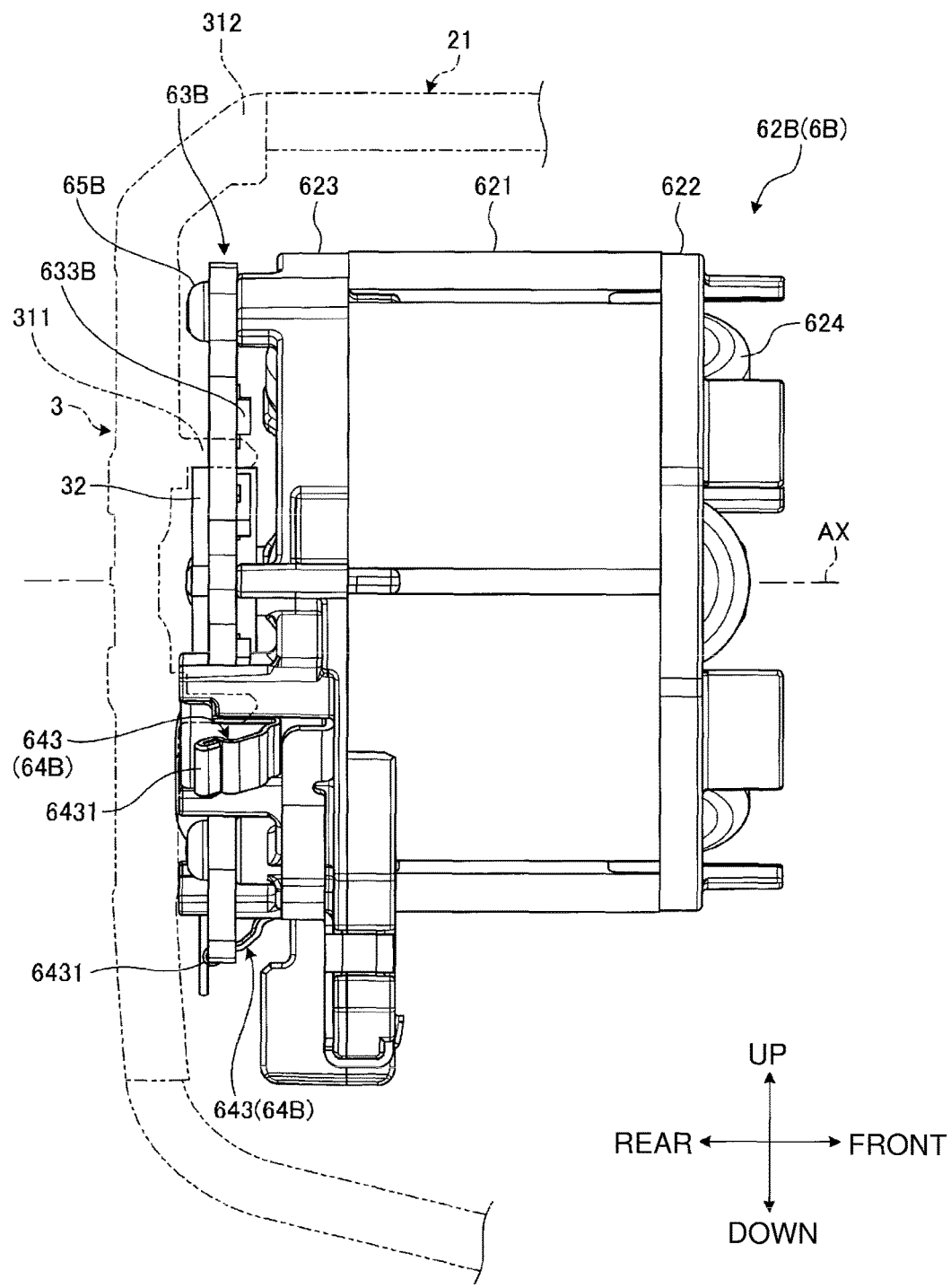
FIG. 28 is a side view of the motor and a rear bearing in the first modification, showing their relationship.

FIG. 28 is a side view of the motor 6B and the rear bearing 32 in the first modification, showing their relationship. As shown in FIG. 28, the rear bearing 32 at least partially overlaps the fuse terminals 643, which are on the metal plate 64B, in the axial direction along the rotation axis AX. In the example shown in FIG. 28, the rear bearing 32 at least partially overlaps the fusing portions 6431. The rear bearing 32 also overlaps the sensor board 63B in the axial direction along the rotation axis AX. The rear bearing 32 also overlaps the sensors 633B in the axial direction along the rotation axis AX. The rear bearing 32 is located inside the sensor board 63B.

Second Modification

A motor according to a second modification will now be described. The same or corresponding components as those in the above embodiment are given the same reference numerals herein, and will be described briefly or will not be described.

Figure 29:
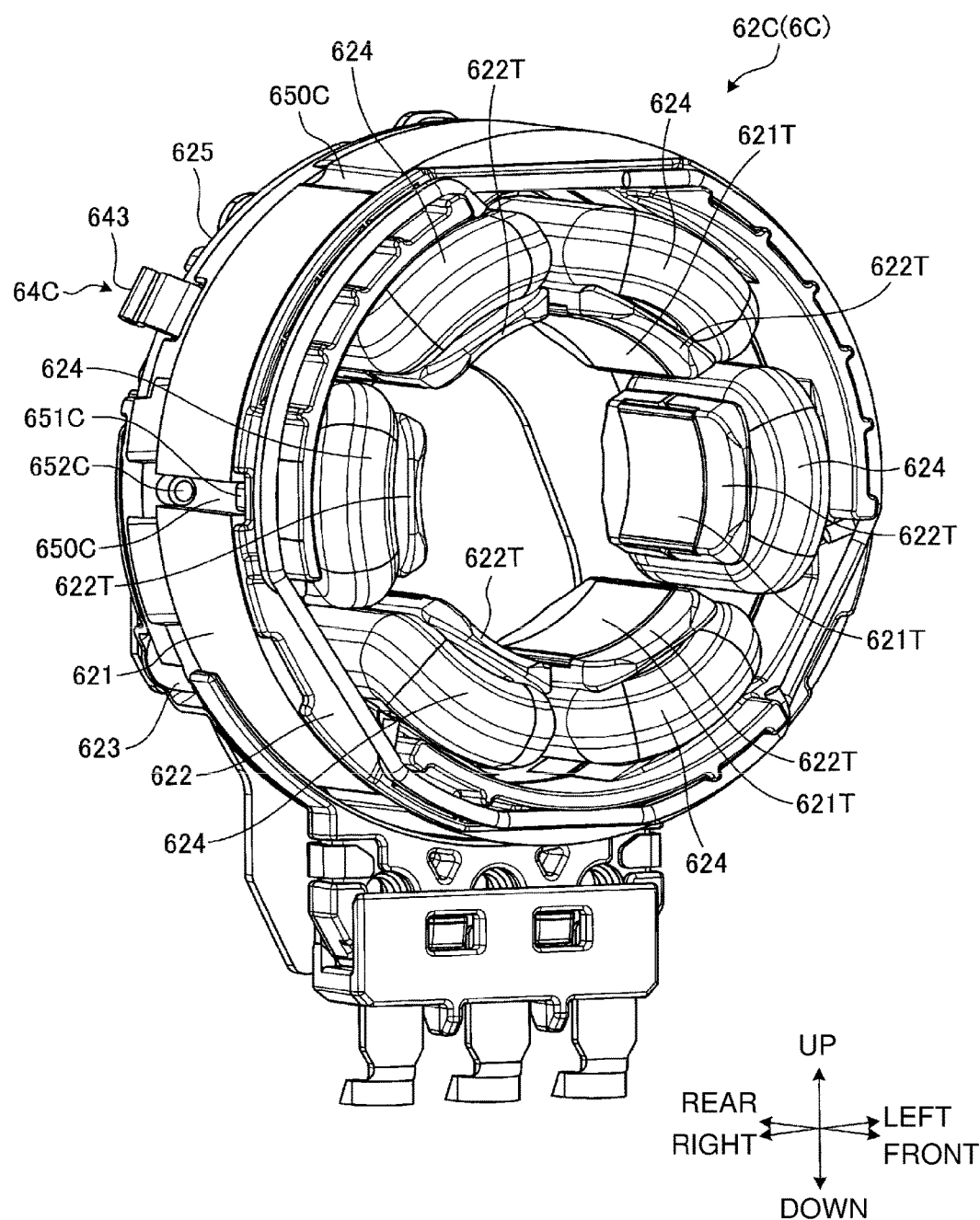
FIG. 29 is a front perspective view of a motor in a second modification.
Figure 30:
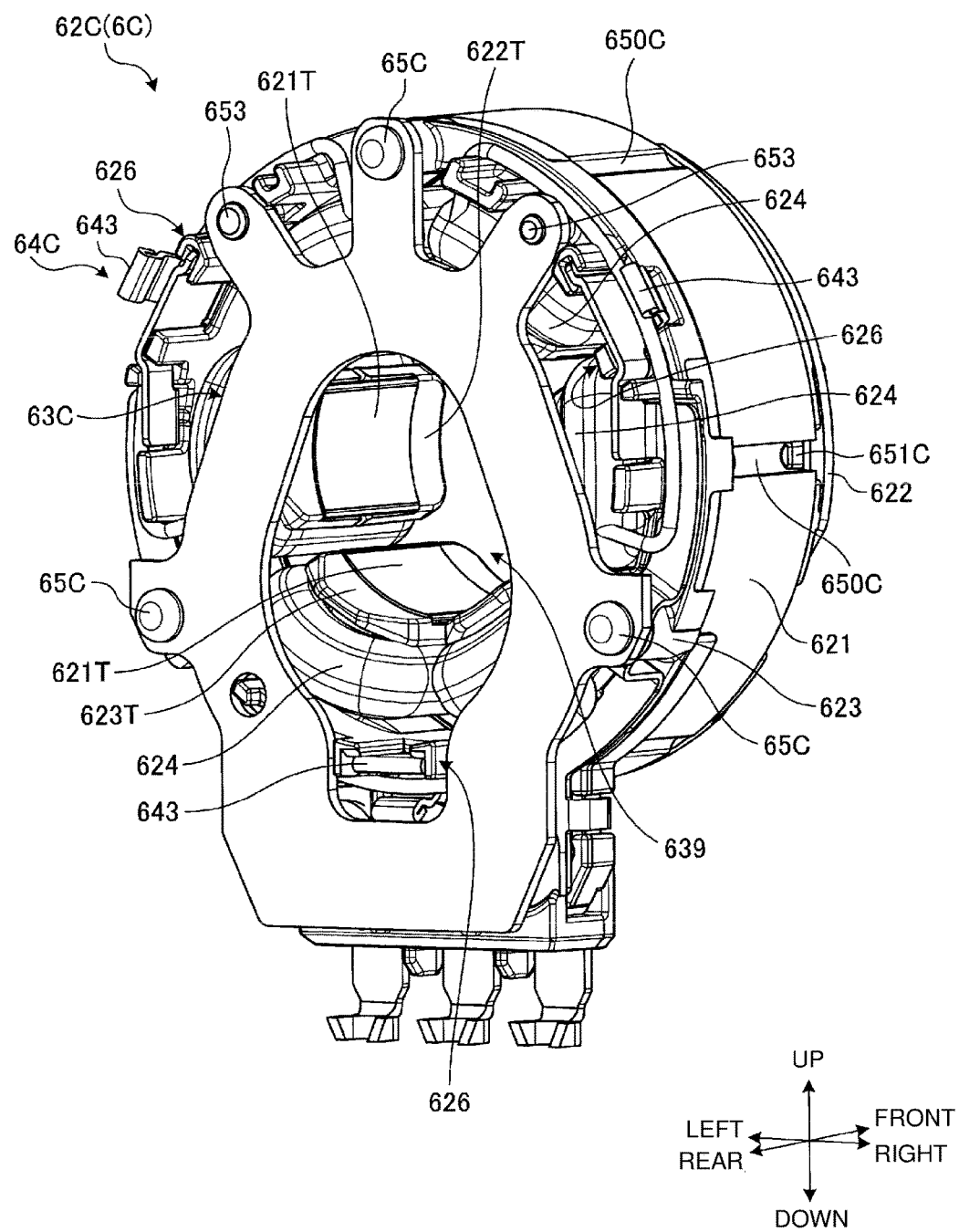
FIG. 30 is a rear perspective view of the motor in the second modification.
Figure 31:
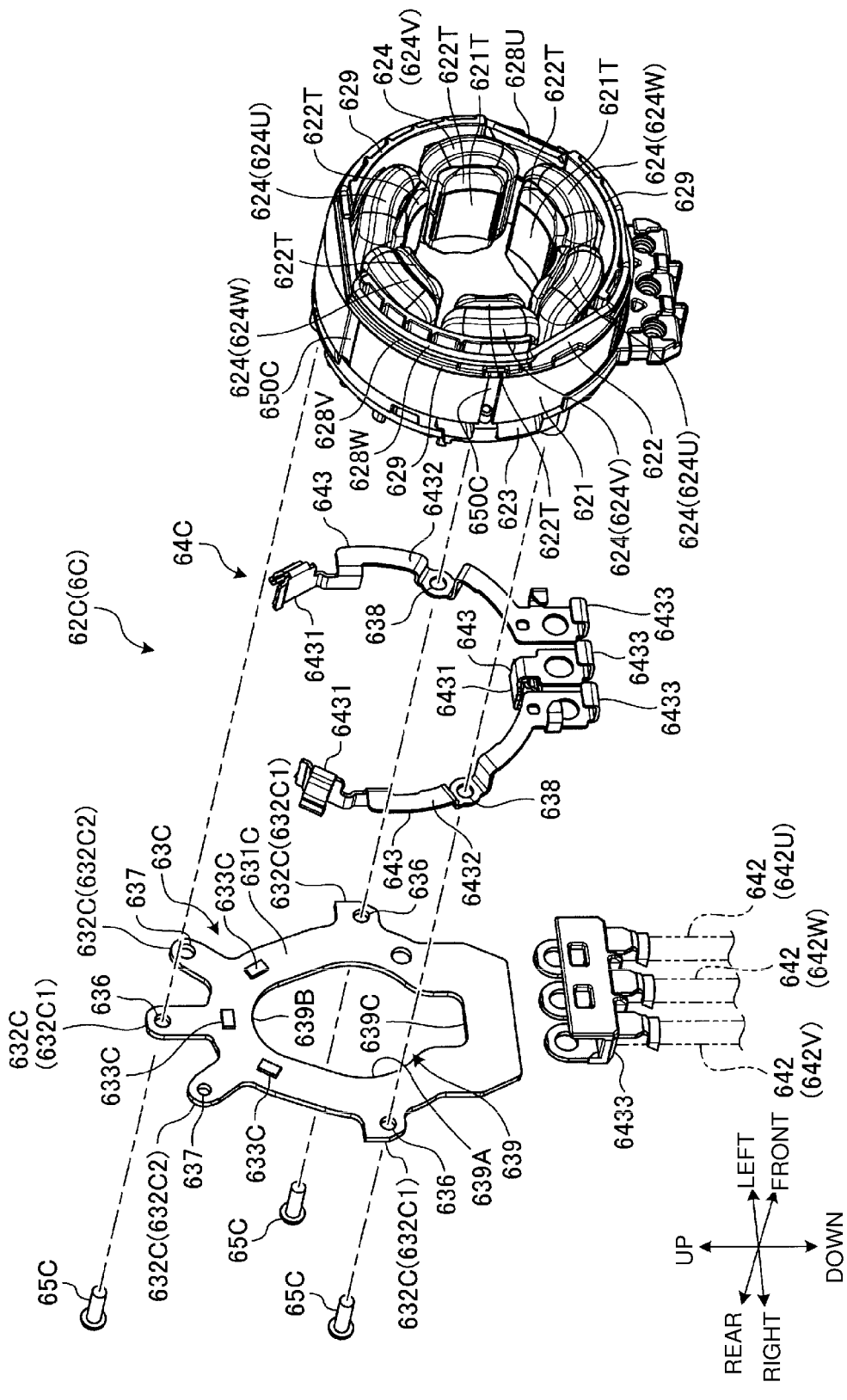
FIG. 31 is an exploded perspective view of the motor in the second modification as viewed from the front.
Figure 32:
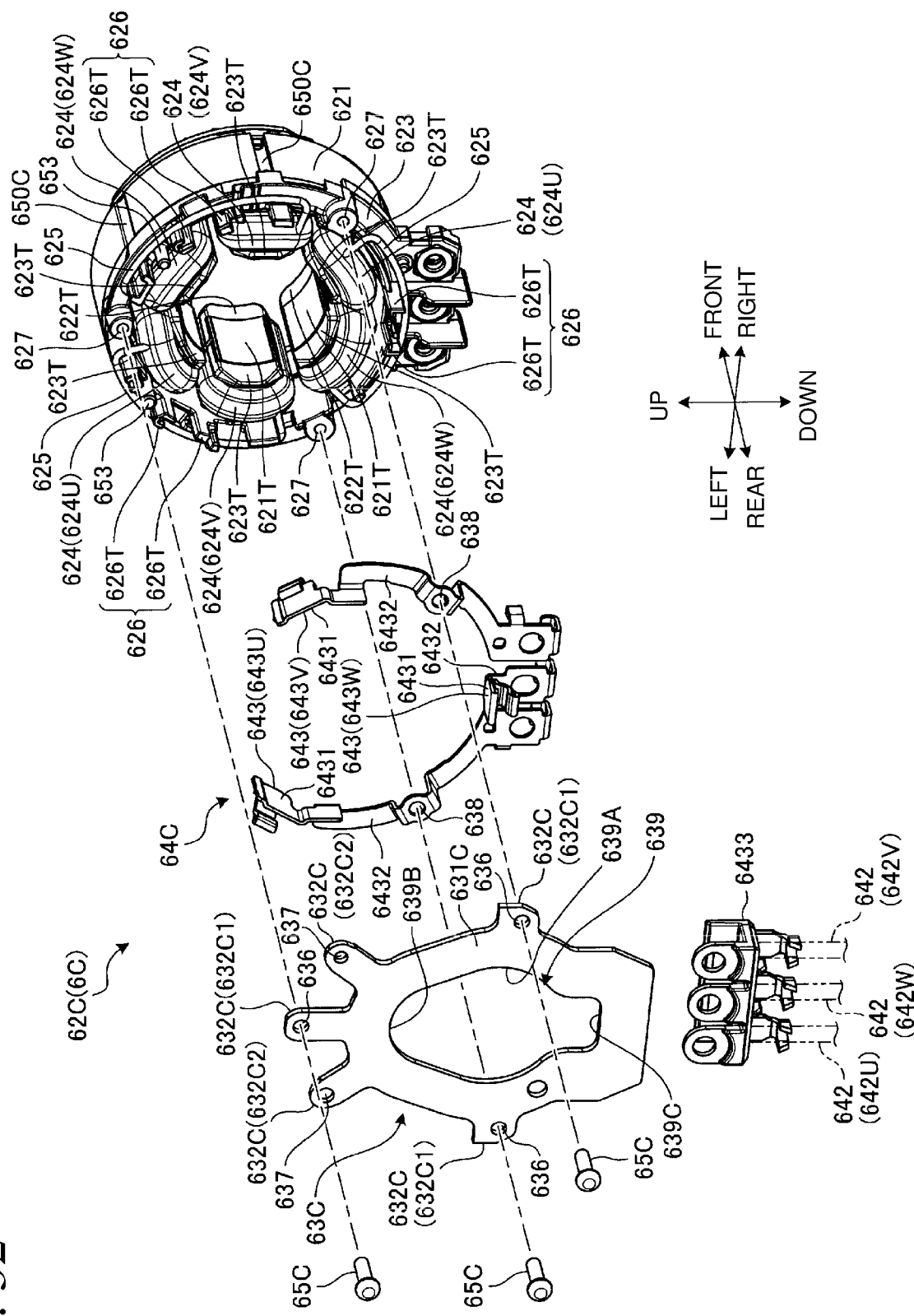
FIG. 32 is an exploded perspective view of the motor in the second modification as viewed from the rear.

FIG. 29 is a front perspective view of a motor 6C in the second modification. FIG. 30 is a rear perspective view of the motor 6C in the second modification. FIG. 31 is an exploded perspective view of the motor 6C in the second modification as viewed from the front. FIG. 32 is an exploded perspective view of the motor 6C in the second modification as viewed from the rear. FIGS. 29 to 32 show a stator 62C in the motor 6C. The rotor in the motor 6C is the same as the rotor 61 described in the above embodiment, and thus is not shown in the figures.

The stator 62C includes the stator core 621, the front insulator 622, the rear insulator 623, and the multiple coils 624. The stator core 621 has the teeth 621T. The front insulator 622 has the protrusions 622T. The rear insulator 623 has the protrusions 623T. The coils 624 are attached to the stator core 621 with the front insulator 622 and the rear insulator 623 between them. The stator 62C includes six coils 624. Each coil 624 surrounds the tooth 621T, the protrusion 622T, and the protrusion 623T.

The stator core 621 has grooves 650C on its outer periphery. The grooves 650C extend in the axial direction. The front insulator 622 has projections 651C fittable in the grooves 650C. The rear insulator 623 has projections 652C fittable in the grooves 650C. The projections 651C fitted in the grooves 650C allow fastening between the front insulator 622 and the stator core 621. The projections 652C fitted in the grooves 650C allow fastening between the rear insulator 623 and the stator core 621.

The stator 62C further includes a sensor board 63C and a metal plate 64C. The metal plate 64C includes the fuse terminals 643.

The fuse terminals 643 surround the rotation axis AX. The metal plate 64C in the second modification includes three fuse terminals 643. The fuse terminals 643 are located frontward from the sensor board 63C.

The sensor board 63C is located behind the rear insulator 623. The sensor board 63C faces the rear insulator 623. The sensor board 63C includes an annular plate 631C, protrusions 632C, and three sensors 633C. The protrusions 632C protrude radially outward from the peripheral edge of the plate 631C. The three sensors 633C are supported on the plate 631C.

In the second modification, the plate 631C has, in its center portion, an opening 639 elongated in the vertical direction. As shown in FIGS. 31 and 32, the opening 639 has a larger-diameter portion 639A, a smaller-diameter portion 639B, and a square opening 639C. The larger-diameter portion 639A receives the rear bearing 32. The smaller-diameter portion 639B is located upward from the larger-diameter portion 639A. The square opening 639C is located downward from the larger-diameter portion 639A. The larger-diameter portion 639A has an inner diameter larger than the outer diameter of the rear bearing 32. The smaller-diameter portion 639B has an inner diameter smaller than the outer diameter of the rear bearing 32. The square opening 639C is rectangular.

The sensor board 63C has five protrusions 632C. The protrusions 632C include protrusions 632C1 each having an opening 636 and protrusions 632C2 each having an opening 637. The protrusions 632C include three protrusions 632C1 and two protrusions 632C2. The rear insulator 623 has three screw holes 627. The two fuse terminals 643 each have an opening 638. The opening 638 is located in the joint 6432 in the fuse terminal 643. The rear insulator 623 includes two pins 653 protruding rearward. Screws 65C are placed into the openings 636 at the rear of the sensor board 63C. Two of the three screws 65C are placed into the openings 638 in the fuse terminals 643. Each screw 65C has its distal end placed into the screw hole 627 with the middle portion of each screw 65C placed through the opening 636 in the protrusion 632C1. The pins 653 are placed into the openings 637 in the protrusions 632C2. The sensor board 63C and the rear insulator 623 are fastened together with three screws 65C.

The fusing portions 6431 of the fuse terminals 643 are supported on the rear insulator 623. The rear insulator 623 includes the supports 626 for supporting the fuse terminals 643. As shown in FIG. 32, each support 626 has protrusions 626T protruding rearward from the rear surface of the rear insulator 623. The fusing portions 6431 are supported on the protrusions 626T.

The metal plate 64C in the second modification includes the three fuse terminals 643. In other words, the metal plate 64C includes the three fusing portions 6431. As shown in FIG. 31, the three fusing portions 6431 are arranged at intervals of 120 degrees about the rotation axis AX.

The connection wire 625 is supported by the supports 626. The connection wire 625 is supported on the radially outer surface of each protrusion 626T. Each fusing portion 6431 is connected to the connection wire 625 protruding from the coil 624 while being held on the support 626. The fuse terminals 643 are connected to the coils 624 through the connection wire 625.

As in the first modification described above, the six coils 624 include the pair of U-phase coils 624U, the pair of V-phase coils 624V, and the pair of W-phase coils 624W. As shown in FIG. 32, each fuse terminal 643 includes a single U-phase fuse terminal 643U, a single V-phase fuse terminal 643V, and a single W-phase fuse terminal 643W. The U-phase fuse terminal 643U is connected to the connection wire 625 connecting the adjacent U-phase coil 624U and V-phase coil 624V. The V-phase fuse terminal 643V is connected to the connection wire 625 connecting the adjacent V-phase coil 624V and W-phase coil 624W. The W-phase fuse terminal 643W is connected to the connection wire 625 connecting the adjacent W-phase coil 624W and U-phase coil 624U. The connection wire 625 is supported on the rear insulator 623.

As shown in FIG. 31, the paired U-phase coils 624U are connected to each other with the connecting wire 628U. The paired V-phase coils 624V are connected to each other with the connecting wire 628V. The paired W-phase coils 624W are connected to each other with the connecting wire 628W. The connecting wires 628 (628U, 628V, and 628W) are supported on the front insulator 622. The front insulator 622 includes guide ribs 629 for supporting the connecting wires 628. The guide ribs 629 protrude frontward from the front surface of the front insulator 622.

Figure 33:
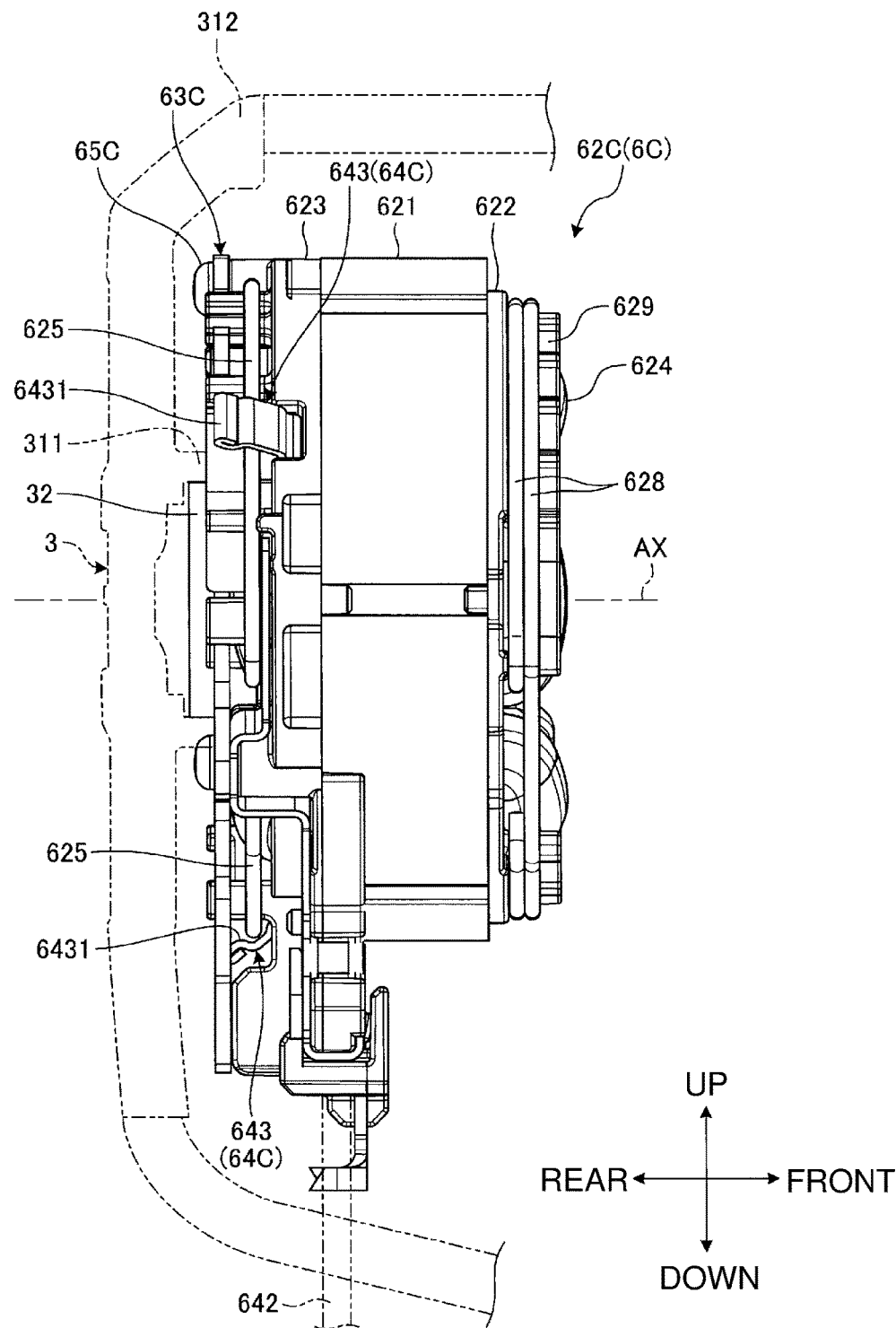
FIG. 33 is a side view of the motor and a rear bearing in the second modification, showing their relationship.

FIG. 33 is a side view of the motor 6C and the rear bearing 32 in the second modification, showing their relationship. As shown in FIG. 33, the rear bearing 32 at least partially overlaps the fuse terminals 643, which are on the metal plate 64C, in the axial direction along the rotation axis AX. In the example shown in FIG. 33, the rear bearing 32 at least partially overlaps the fusing portions 6431. The rear bearing 32 also overlaps the sensor board 63C in the axial direction along the rotation axis AX.

Other Embodiments

In the embodiments described above, the power tool 1 is an impact wrench that is an impact tool. The power tool may be an impact driver. The anvil in an impact driver includes an insertion hole for receiving a tip tool and a chuck assembly for holding the tip tool.

In the above embodiments, the power tool 1 is powered by the battery pack 17 mounted on the battery mount 5. The power tool 1 may use utility power (alternating-current power supply).

In the above embodiments, the power tool 1 is an impact tool. The power tool 1 may be a driver drill, a vibration driver drill, or a hammer drill.

In the above embodiments, the motor is a brushless inner-rotor motor. The motor may be an outer-rotor motor or a brushed motor. The components described in the above embodiments can be included in a motor having a rear cover that holds the bearings of the rotor.

REFERENCE SIGNS LIST 1 power tool
2 housing
2L left housing
2R right housing
3 rear cover
4 gear case
5 battery mount
6 motor
6B motor
6C motor
7 reduction mechanism
8 spindle
9 impact mechanism
10 anvil
11 screw
12 fan
13 controller
14 trigger switch
15 forward-reverse switch lever
16 operation panel
17 battery pack
18 lamp
19 inlet
20 outlet
21 motor compartment
21L left portion
21R right portion
21T upper end
22 grip
23 controller compartment
31 front bearing
32 rear bearing
33 bush
34 first recess
35 sleeve
36 bush
37 sleeve
38 stop ring
41 bearing holder
42 hammer case
50 front bearing
61 rotor
62 stator
62B stator
62C stator
63 sensor board
63B sensor board
63C sensor board
64 metal plate
64B metal plate
64C metal plate
65 screw
65B screw
65C screw
70 pinion gear
71 planetary gear
72 internal gear
73 pin
81 flange
82 rod
83 rear bearing
84 spindle groove
91 hammer
92 ball
93 spring
94 washer
95 ball
96 hammer groove
101 anvil body
102 anvil protrusion
103 hole
110 first screw
110A head
110B threaded portion
111 first opening
112 first screw hole
113 opening
120 second screw
120A head
120B threaded portion
121 second opening
122 second screw hole
130 controller case
131 cylindrical portion 132 plate
133 blade
134 peripheral edge
135 recess
141 trigger
142 switch body
160 operation button
200 cover
201 first protrusion
202 second protrusion
203 third protrusion
210 body
211 screw boss
212 bulge
214 second recess
215 first inner peripheral surface
216 second inner peripheral surface
217 opposing surface
231 opening
300 cover
311 rear support
312 peripheral wall
313 base plate
400 cover
401 screw boss
410 body
411 front support
412 spindle support
413 first outer peripheral surface
414 second outer peripheral surface
415 connecting surface
611 rotor shaft
612 rotor core
613 rotor magnet
621 stator core
621T tooth
621T1 first tooth
621T2 second tooth
621T3 third tooth
621T4 fourth tooth
621T5 fifth tooth
621T6 sixth tooth
622 front insulator
622T protrusion
623 rear insulator
623T protrusion
624 coil
624U U-phase coil
624U1 U-phase coil
624U2 U-phase coil
624V V-phase coil
624V1 V-phase coil
624V2 V-phase coil
624W W-phase coil
624W1 W-phase coil
624W2 W-phase coil
625 connection wire
625E winding end
625S winding start
626 support
626T protrusion
627 screw hole
628 connecting wire
628U connecting wire
628U1 connecting wire
628V connecting wire
628V1 connecting wire
628V2 connecting wire
628W connecting wire
628W1 connecting wire
628W2 connecting wire
629 guide rib
631 plate
631B plate
631C plate
632 screw boss
632B protrusion
632B1 protrusion
632B2 protrusion
632B3 protrusion
632C protrusion
632C1 protrusion
632C2 protrusion
633 sensor
633B sensor
633C sensor
634 signal line
634B signal line
635 opening
636 opening
637 opening
638 opening
639 opening
639A larger-diameter portion
639B smaller-diameter portion
639C square opening
641 insulating member
642 power line
642U U-phase power line
642V V-phase power line
642W W-phase power line
643 fuse terminal
643U U-phase fuse terminal
643V V-phase fuse terminal
643W W-phase fuse terminal
644 short-circuiting member
644U U-phase short-circuiting member
644V V-phase short-circuiting member
644W W-phase short-circuiting member
645 body
646 screw boss
647 opening
648 opening
649 support
650 groove
650C groove
651 projection
651C projection
652 projection
652C projection
653 pin
911 hammer body
912 hammer protrusion
913 hole
914 inner cylinder
915 outer cylinder
916 base
917 recess
918 recess
1101 first screw
1102 first screw
1201 second screw
1202 second screw
4011 screw boss 4012 screw boss
6431 fusing portion
6432 joint
6433 connector
AX rotation axis
CX1 center axis
CX2 center axis
DL1 distance
DR1 distance
DL2 distance
DR2 distance
DL3 distance
DR3 distance
DL4 distance
DR4 distance
M center line
R1 distance
R2 distance

What is claimed is:

1. An impact tool, comprising:
a motor including a stator and a rotor relative to the stator about a rotation axis;
a gear drivable in response to rotation of the rotor;
a hammer drivable in response to rotation of the gear;
an anvil configured to be struck by the hammer in a rotation direction;
a motor compartment accommodating the motor;
a rear cover covering a rear opening in the motor compartment;
a hammer case accommodating the hammer;
a first screw fastening the rear cover and the motor compartment together, the first screw being screwed from a rear of the motor compartment, the first screw having a first screw head at a proximal end; and
a second screw fastening the motor compartment and the hammer case together, the second screw being screwed from the rear of the motor compartment, the second screw having a second screw head at a proximal end,
wherein the first screw head is entirely viewable as viewed from the rear, and
the second screw head is at least partially viewable as viewed from the rear.

2. The impact tool according to claim 1, wherein the second screw head is entirely viewable as viewed from the rear.

3. The impact tool according to claim 1, wherein each of the first screw and the second screw includes,
a distal end that is threaded at an end opposite the proximal end, and
a middle portion between the proximal end and the distal end,
the rear cover has a first opening receiving the first middle portion of the first screw,
the motor compartment has
a first screw hole receiving the first distal end of the first screw, and
a second opening receiving the second middle portion of the second screw,
the hammer case has a second screw hole receiving the second distal end of the second screw.

4. The impact tool according to claim 1, wherein the first screw is above or below a side surface of the motor compartment.

5. The impact tool according to claim 4, wherein the first screw and the second screw are at substantially equal positions in a vertical direction.

6. The impact tool according to claim 4, wherein the first screw and the second screw are below an upper end of the motor compartment.

7. The impact tool according to claim 1, wherein the first screw and the second screw are parallel to each other.

8. The impact tool according to claim 7, wherein the first screw and the second screw are parallel to the rotation axis.

9. The impact tool according to claim 1, wherein a plurality of the second screws surround the rotation axis.

10. The impact tool according to claim 1, wherein the first screw head is in contact with the rear cover, and the second screw head is in contact with the motor compartment.

11. The impact tool according to claim 2, wherein each of the first screw and the second screw includes,
a distal end that is threaded at an end opposite the proximal end, and
a middle portion between the proximal end and the distal end,
the rear cover has a first opening receiving the first middle portion of the first screw,
the motor compartment has
a first screw hole receiving the first distal end of the first screw, and
a second opening receiving the second middle portion of the second screw,
the hammer case has a second screw hole receiving the second distal end of the second screw.

12. The impact tool according to claim 2, wherein the first screw is above or below a side surface of the motor compartment.

13. The impact tool according to claim 3, wherein the first screw is above or below a side surface of the motor compartment.

14. The impact tool according to claim 2, wherein the first screw and the second screw are parallel to each other.

15. The impact tool according to claim 3, wherein the first screw and the second screw are parallel to each other.

16. The impact tool according to claim 4, wherein the first screw and the second screw are parallel to each other.

17. The impact tool according to claim 5, wherein the first screw and the second screw are parallel to each other.

18. The impact tool according to claim 6, wherein the first screw and the second screw are parallel to each other.

19. The impact tool according to claim 2, wherein a plurality of the second screws surround the rotation axis.

20. The impact tool according to claim 3, wherein a plurality of the second screws surround the rotation axis.

* * * * *